(12) United States Patent
Kintner

(10) Patent No.: US 9,152,019 B2
(45) Date of Patent: Oct. 6, 2015

(54) 360 DEGREE CAMERA MOUNT AND RELATED PHOTOGRAPHIC AND VIDEO SYSTEM

(71) Applicant: 360 Heros, Inc., Olean, NY (US)

(72) Inventor: Michael J. Kintner, Olean, NY (US)

(*) Notice: Subject to any disclaimer, the term of this patent is extended or adjusted under 35 U.S.C. 154(b) by 173 days.

(21) Appl. No.: 14/072,656

(22) Filed: Nov. 5, 2013

(65) Prior Publication Data

US 2014/0153916 A1 Jun. 5, 2014

Related U.S. Application Data

(60) Provisional application No. 61/722,497, filed on Nov. 5, 2012, provisional application No. 61/750,491, filed on Jan. 9, 2013.

(51) Int. Cl.

| G03B 17/56 | (2006.01) |
|---|---|
| H04N 5/225 | (2006.01) |
| H04N 5/232 | (2006.01) |
| H04N 13/02 | (2006.01) |

(52) U.S. Cl.
CPC ............ *G03B 17/561* (2013.01); *H04N 5/2251* (2013.01); *H04N 5/2258* (2013.01); *H04N 5/23238* (2013.01); *H04N 13/0242* (2013.01); *H04N 2213/001* (2013.01)

(58) Field of Classification Search
USPC ............. 396/419, 424, 427, 9, 322, 325, 333, 396/334; 348/143, 373, 48
See application file for complete search history.

(56) References Cited

U.S. PATENT DOCUMENTS

| 2,942,516 A | 6/1960 | Disney et al. |
|---|---|---|
| 2,976,791 A | 3/1961 | Larsson |
| 3,118,340 A | 1/1964 | Iwerks |
| 3,550,519 A | 12/1970 | Lewis |
| 3,698,803 A | 10/1972 | Watanuki |
| 3,740,126 A | 6/1973 | Goto |
| 4,062,045 A | 12/1977 | Iwane |
| 4,272,177 A | 6/1981 | Ottenheimer |
| 4,475,798 A | 10/1984 | Smith et al. |
| 4,630,913 A | 12/1986 | Lo |

(Continued)

FOREIGN PATENT DOCUMENTS

KR   10-2006-0062011   6/2006

OTHER PUBLICATIONS

International Search Report/Written Opinion for PCT/US2013/068579; dated Feb. 28, 2014 (11 pages).

(Continued)

*Primary Examiner* — Rochelle-Ann J Blackman
(74) *Attorney, Agent, or Firm* — Barclay Damon, LLP

(57) ABSTRACT

A camera holding assembly that is configured to hold a plurality of cameras in a predetermined orientation includes a support having a plurality of receptacles. Each of the receptacles include at least one feature enabling a camera to be releasably retained therein as well as at least one and preferably at least three attachment features configured for enabling the camera holding assembly to be secured to another object. The receptacles are oriented about the support so that each camera, when loaded into the defined receptacles, is aimed in a different angular orientation. Images obtained from each retained camera can be stitched to create either a composite 360 degree×180 degree full spherical image or a composite 360 degree composite image of a scene of interest.

37 Claims, 43 Drawing Sheets

(56) References Cited

U.S. PATENT DOCUMENTS

| | | |
|---|---|---|
| 4,641,918 A | 2/1987 | Moffatt et al. |
| 5,499,146 A | 3/1996 | Donahue et al. |
| 5,619,255 A | 4/1997 | Booth |
| 5,657,073 A | 8/1997 | Henley |
| 5,877,821 A | 3/1999 | Newlin et al. |
| 6,023,588 A | 2/2000 | Ray et al. |
| 6,128,143 A | 10/2000 | Nalwa |
| 6,241,610 B1 | 6/2001 | Miyamoto et al. |
| 6,244,959 B1 | 6/2001 | Miyamoto et al. |
| 6,346,046 B2 | 2/2002 | Miyamoto et al. |
| 6,478,432 B1 | 11/2002 | Dyner |
| 6,483,949 B1 | 11/2002 | Yokoyama et al. |
| 6,560,413 B1 | 5/2003 | Lee |
| 6,603,503 B1 | 8/2003 | Ribera et al. |
| 6,665,003 B1 | 12/2003 | Peleg et al. |
| 6,788,333 B1 | 9/2004 | Uyttendaele et al. |
| 6,809,887 B1 | 10/2004 | Gao et al. |
| 6,947,059 B2 | 9/2005 | Pierce et al. |
| 6,991,384 B1 | 1/2006 | Davis |
| 7,012,637 B1 | 3/2006 | Blume et al. |
| 7,183,549 B2 | 2/2007 | Teich et al. |
| 7,298,392 B2 | 11/2007 | Cutler |
| 7,429,997 B2 | 9/2008 | Givon |
| 7,463,280 B2 | 12/2008 | Steuart, III |
| 7,583,288 B2 | 9/2009 | Uyttendaele et al. |
| 7,646,404 B2 | 1/2010 | Liu et al. |
| 7,658,556 B2 | 2/2010 | Johnson |
| 7,710,463 B2 | 5/2010 | Foote |
| 7,768,545 B2 | 8/2010 | Glatt |
| 8,004,558 B2 | 8/2011 | Prechtl et al. |
| 8,106,936 B2 | 1/2012 | Strzempko et al. |
| 8,243,123 B1 | 8/2012 | Geshwind et al. |
| 2001/0008847 A1 | 7/2001 | Miyamoto et al. |
| 2002/0080268 A1 | 6/2002 | Willis |
| 2002/0154691 A1 | 10/2002 | Kost et al. |
| 2003/0071896 A1 | 4/2003 | Hunter |
| 2003/0081940 A1 | 5/2003 | Lin et al. |
| 2003/0220971 A1 | 11/2003 | Kressin |
| 2004/0001091 A1 | 1/2004 | Kressin |
| 2004/0017517 A1 | 1/2004 | Alvarez |
| 2004/0100443 A1 | 5/2004 | Mandelbaum et al. |
| 2004/0169724 A1 | 9/2004 | Ekpar |
| 2004/0195471 A1 | 10/2004 | Sachen, Jr. |
| 2004/0218626 A1 | 11/2004 | Tyldesley et al. |
| 2004/0233274 A1 | 11/2004 | Uyttendaele et al. |
| 2004/0263611 A1 | 12/2004 | Cutler |
| 2005/0187831 A1 | 8/2005 | Gershburg et al. |
| 2005/0207487 A1 | 9/2005 | Monroe |
| 2006/0054189 A1 | 3/2006 | Luke et al. |
| 2006/0054202 A1 | 3/2006 | Luke et al. |
| 2006/0077293 A1 | 4/2006 | Willis |
| 2006/0139475 A1 | 6/2006 | Esch et al. |
| 2006/0273227 A1 | 12/2006 | Smith |
| 2007/0008409 A1 | 1/2007 | Yoo |
| 2007/0060345 A1 | 3/2007 | Edwards |
| 2007/0070190 A1 | 3/2007 | Yin et al. |
| 2007/0097206 A1 | 5/2007 | Houvener et al. |
| 2007/0103543 A1 | 5/2007 | Anderson et al. |
| 2007/0161853 A1 | 7/2007 | Yagi et al. |
| 2007/0182819 A1 | 8/2007 | Monroe |
| 2007/0193768 A1 | 8/2007 | Howe |
| 2007/0206945 A1 | 9/2007 | DeLorme et al. |
| 2007/0299912 A1 | 12/2007 | Sharma et al. |
| 2008/0076556 A1 | 3/2008 | Icart |
| 2008/0088797 A1 | 4/2008 | Salacuse |
| 2008/0182620 A1 | 7/2008 | Lors |
| 2008/0218587 A1 | 9/2008 | Glatt |
| 2008/0225123 A1 | 9/2008 | Osann et al. |
| 2008/0297593 A1 | 12/2008 | Debevec et al. |
| 2009/0058988 A1 | 3/2009 | Strzempko et al. |
| 2009/0073256 A1 | 3/2009 | Steuart, III |
| 2009/0153650 A1 | 6/2009 | Misawa et al. |
| 2009/0202102 A1 | 8/2009 | Miranda et al. |
| 2009/0219387 A1 | 9/2009 | Marman et al. |
| 2009/0273664 A1 | 11/2009 | Pishdadian et al. |
| 2010/0026788 A1 | 2/2010 | Ishikawa et al. |
| 2010/0149372 A1 | 6/2010 | Silverstein |
| 2010/0182398 A1 | 7/2010 | Mazzilli |
| 2010/0225738 A1 | 9/2010 | Webster |
| 2010/0231687 A1 | 9/2010 | Amory et al. |
| 2011/0069148 A1 | 3/2011 | Jones et al. |
| 2011/0129210 A1 | 6/2011 | McGucken |
| 2011/0218661 A1 | 9/2011 | Van Well et al. |
| 2011/0249168 A1 | 10/2011 | Osann, Jr. et al. |
| 2012/0060101 A1 | 3/2012 | Vonog et al. |
| 2012/0081503 A1 | 4/2012 | Leow et al. |
| 2012/0081676 A1 | 4/2012 | Hirata et al. |
| 2012/0093364 A1 | 4/2012 | Sato |
| 2012/0154521 A1 | 6/2012 | Townsend et al. |
| 2012/0169842 A1 | 7/2012 | Chuang et al. |
| 2012/0212491 A1 | 8/2012 | Hager |
| 2012/0229596 A1 | 9/2012 | Rose et al. |
| 2012/0242788 A1 | 9/2012 | Chuang et al. |
| 2012/0277914 A1 | 11/2012 | Crow et al. |
| 2012/0299323 A1 | 11/2012 | Li |
| 2013/0201296 A1* | 8/2013 | Weiss et al. .................. 348/48 |

OTHER PUBLICATIONS

Joergen Geerds, 360 RIG Presentation at the IVRPA Conference in NYC, all pages, Mar. 3, 2013, Freedom360, http://freedom360.us/360-rig-presentation-at-the-ivrpa-conference-in-nyc/.

Carlos Chegado, Joergen Geerds—The Future of Array Video Cameras, all pages, May 1, 2012, NYC2012.org, http://www.nyc2012.org/2012/05/joergen-geerds-the-future-of-array-video-cameras/.

* cited by examiner

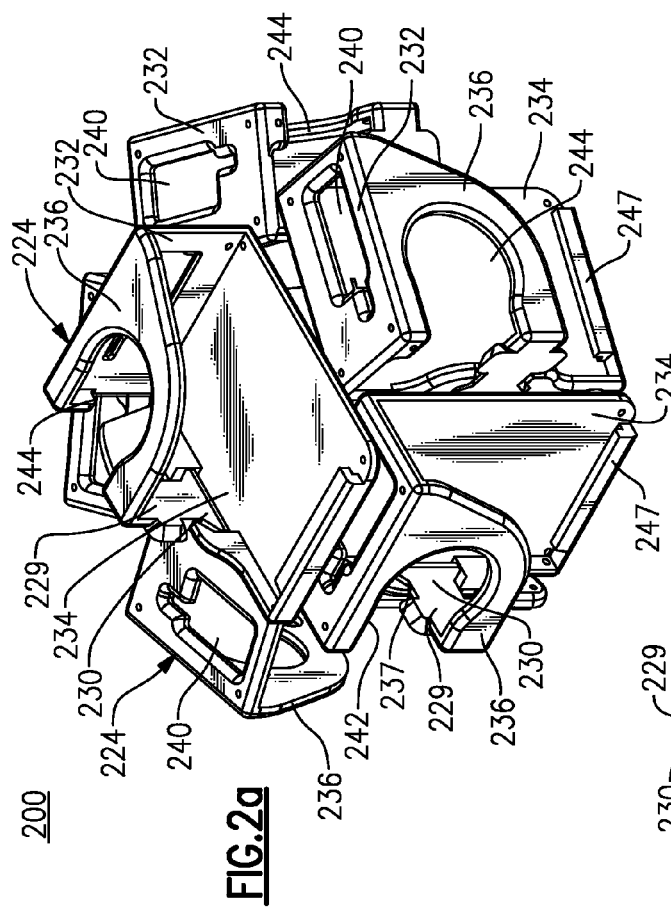
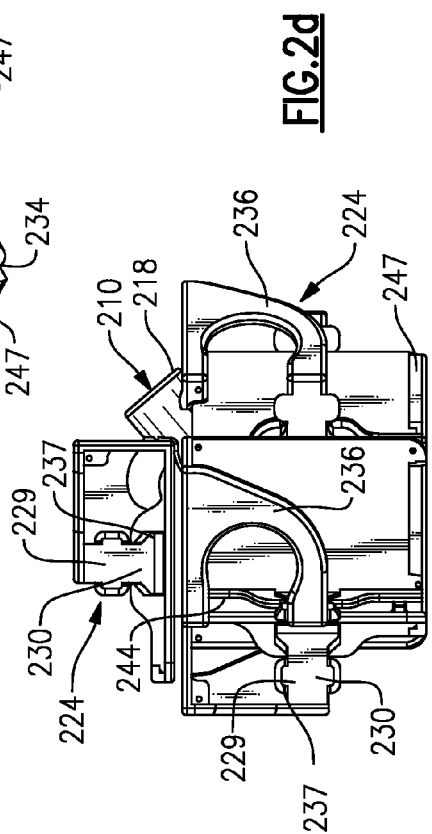
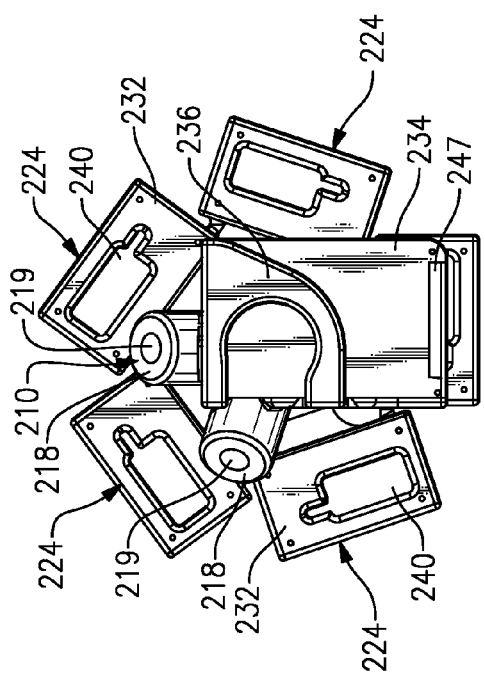
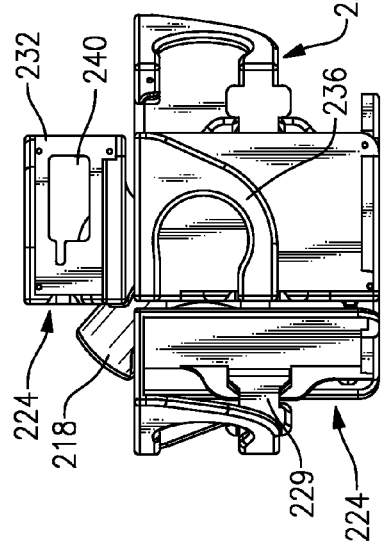
FIG.2a
FIG.2b
FIG.2c
FIG.2d

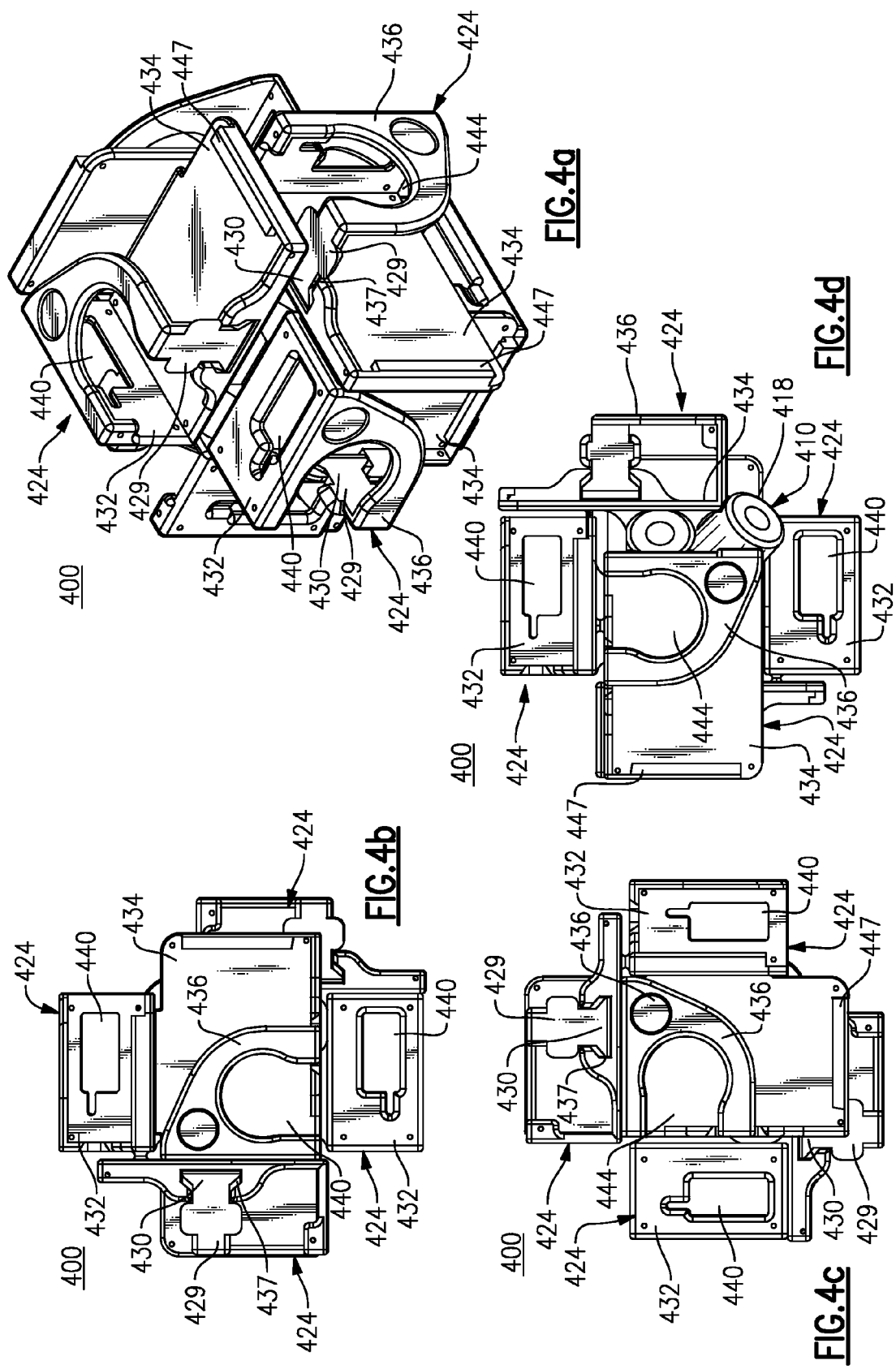

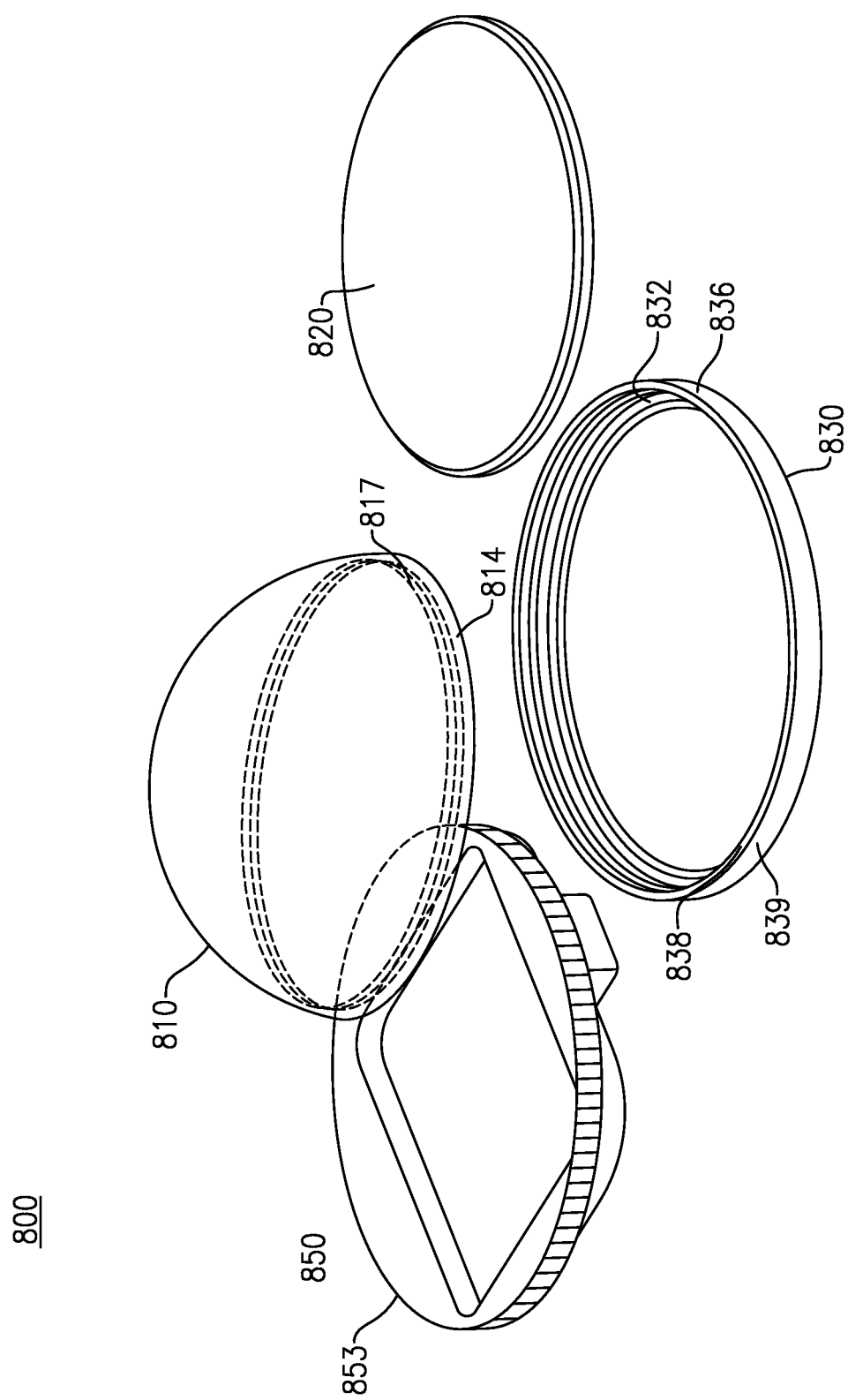

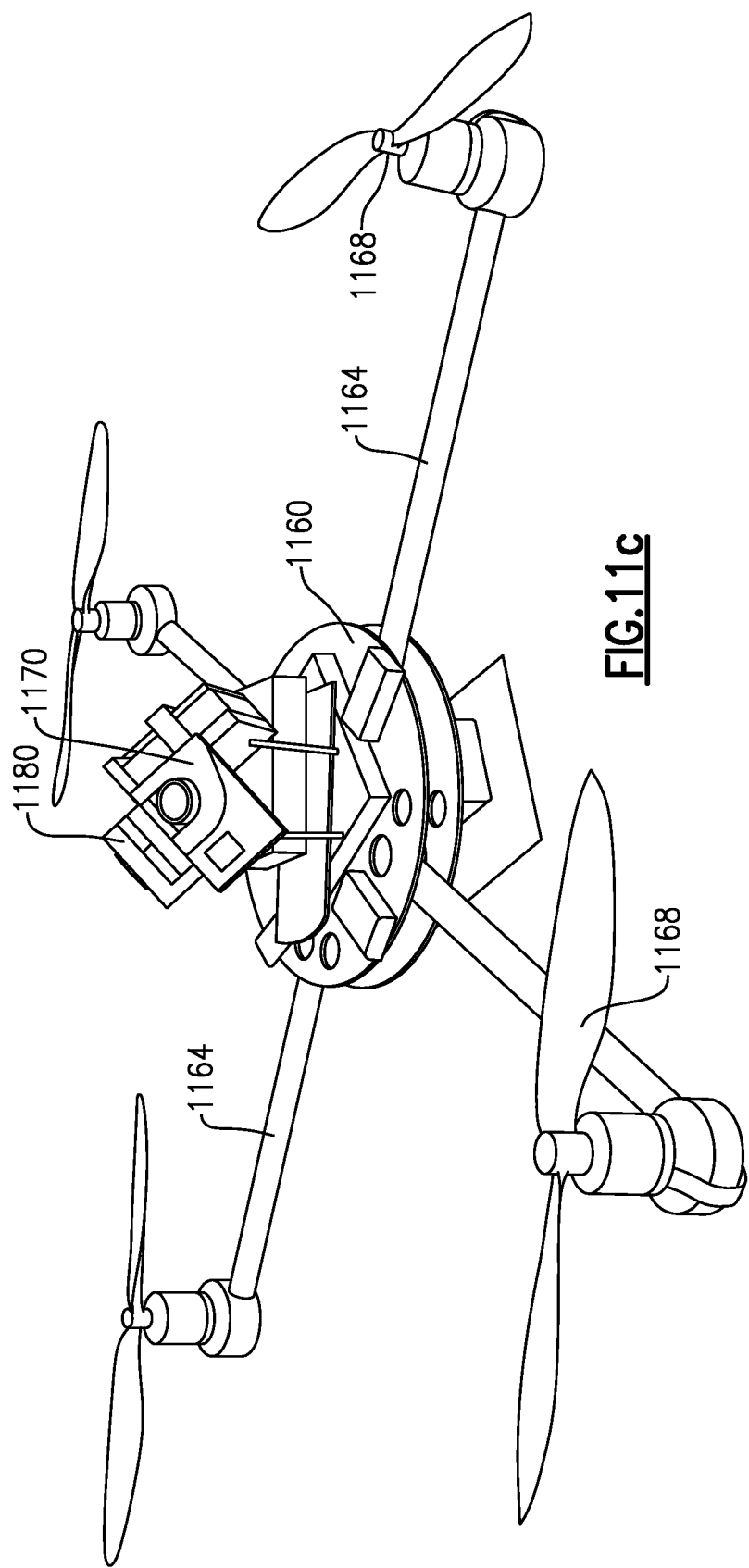

360 DEGREE CAMERA MOUNT AND RELATED PHOTOGRAPHIC AND VIDEO SYSTEM

CROSS REFERENCE TO RELATED APPLICATIONS

This application claims priority under relevant portions of 35 U.S.C. §119 to U.S. Ser. No. 61/722,497, entitled: A holder that supports six cameras in special configuration to allow the ability to shoot 360 degree video and photos, filed Nov. 5, 2012 and U.S. Ser. No. 61/750,491, entitled Dome Converter, filed on Jan. 9, 2013, the entire contents of each of the above-listed applications being incorporated by reference herein in their entirety.

TECHNICAL FIELD

The present invention generally relates to the field of photographic and video systems and more specifically to a holding assembly and related method for enabling spherical or cubical 360 degree still photographs and/or moving video using a supported plurality of conventional photographic cameras that are independently supported and maintained by the holding assembly and in which images can be captured in a variety of different environments for processing a plurality of image formats.

BACKGROUND

It is known that 360 degree (e.g., spherical or cubical) still photographs or moving videos of a scene of interest can be obtained using very sophisticated equipment. Such equipment is prohibitively expensive and clearly not within the budget of average consumers or even small companies that are desirous of obtaining 360 degree images.

There is an ongoing and pervasive need to provide a more versatile and user friendly system that adaptively retains a plurality of conventional photographic cameras in order to permit 360 (spherical or cubical) degree still photographs or moving videos to be obtained, through compositely created images and in a plurality of image formats, such as HD and 3-dimensional, among others. It is a further desire to provide providing increased functionality and versatility for such a system, providing adaptability depending on the application or desires of a particular user, including functionality in a varied number of environments.

BRIEF DESCRIPTION

Therefore and according to one aspect, there is provided a holding assembly configured to releasably retain a plurality of cameras in a predetermined orientation, the holding assembly comprising a support and a plurality of camera receptacles disposed in a spaced arrangement covering a 360 degree field of view, the camera receptacles including being configured for supporting a camera and including at least one feature that enables a camera to be releasably secured. The system further is configured to synchronize each of the outputs of the supported cameras, in order to create either a 360 degree by 180 degree full spherical composite image or a 360 degree composite image, which can be either still (photograph) or moving (video) utilizing a plug and play configuration that permits removal of the cameras as well as access thereto, if needed.

According to at least one version, the frame can include at least four (4) camera receptacles, the at least four receptacles being disposed along a common plane of the holding assembly and defining a retaining cavity that is sized to retain a camera. Each of the camera receptacles further include at least one feature that permits securement and release of a retained camera, as needed, for replacement or repair. In one version, the camera receptacles include a latch that is configured to open and close to secure a camera within the holding assembly.

The holding assembly further comprises at least one and preferably three attachment features for enabling the holding assembly to be secured to another object, such as a connecting rod, a tripod, or other mounting apparatus.

In another version, a plurality of camera receptacles can be disposed along the common plane as well as above and/or below the defined plane, thereby enabling greater versatility of resulting images of at least one scene of interest. Still further and according to at least one version, the camera receptacles of the holding assembly can be selectively adjusted in terms of their relative position. For example, the camera receptacles can be attached to the ends of arms that are extendable from a center supporting structure of the holding assembly. According to another version, the extending arms can be pivotally attached to a supporting structure.

In at least one preferred version, images captured by the plurality of retained cameras are combined to create a composite 360 image using image stitching techniques, whether as a still image or as a video. The herein described holding fixture can be further configured to permit operation in a plurality of different environments, such as for aquatic and aerial scenes of interest, among others.

According to another aspect, there is provided a method for enabling a 360 degree by 180 degrees full spherical image of a scene of interest, the method comprising the steps of providing a holding assembly comprising a plurality of camera receptacles, each receptacles being configured for retaining a camera wherein the cameras are configured to provide a composite field of view of spherical 360 degrees.

In brief, the herein described apparatus differs from what currently exists. Other known devices require six (6) or more cameras in which the cameras are at least partially disassembled to be fitted within the confines of a defined enclosure in a fixed orientation. Moreover, the cameras are fixed into the assembly, not in a plug and play configuration. They are extremely expensive and their cameras cannot be removed and used for other purposes without tearing down the enclosure and reconstructing the cameras to allow serviceability.

The present holding assembly on the other hand is configured to retain a plurality of medium or small cameras, which are removable, thereby making the fixture and cameras more versatile in terms of their functionality and portability. The holding assembly also has multiple holding or attachment points located on the device, such as along edges, sides or corners to allow the device to be fixed in multiple positions to take either the best video or photo depending, upon the particular mode in which the cameras have been programmed. Providing multiple positions and opportunities for multiple holding or attachment positions permits the operator to be hidden at different distances in the eventual (final) photograph or video due to camera viewing parallax.

Various embodiments are herein discussed. Commonly, each of these embodiment as discussed herein, preferably include the following features:
1. A plurality (preferably 6 or more) of small to medium photographic cameras.
2. A holder assembly;
3. a wired or wireless connection that connects each device via a remote control or actuable element in which each camera is synched for common operation by an operator; and 4. Various mounting positions for the holding assembly in order to enable different orientations.

In brief, the plurality of retained cameras snap into various receptacles that are defined in the holder assembly that accommodate each camera based on an interference or snap fit, enabling easy removal. Preferably, the receptacles are defined by a moldable plastic or other suitable material having adequate flexibility to permit a secure fit when the camera is attached. One preferred material is a flexible nylon. Each receptacle according to this embodiment accommodates the camera and includes a portal that further accesses the lensing portion of the attached camera, allowing for an unobstructed view of a scene/environment to be photographed or videotaped. A button on a remote control of the wireless connection is configured to synch with and power/control features of all of the retained cameras on and/or off at the same time. Alternatively, the cameras can be similarly controlled by means of cabling (not shown) interlinking each of the retained cameras.

The holding assembly allows the retained cameras to be positioned in a cubical or spherical manner so they can take video and photos facing in a plurality of different angled orientations depending on the number of cameras supported. By way of example, six, seven, ten and twelve cameras can be suitably retained. In at least one version, stereographic (3D) images can be realized. The wireless connection allows the device to turn on or off via a mechanical switch or remote control device separate from the wireless connection. The holder ensures that the cameras are positioned in the proper location.

It should be noted that the present design is exemplary. For example, the arms of the holding assembly can be designed to permit the length of the arms to extend. For example, a plurality of extending arms can be configured to extend proportionally in all directions simultaneously.

Each of the above noted holding assemblies are configured to retain a predetermined number of photographic cameras in a cubical or spherical fashion to allow the cameras to take video and/or photos simultaneously. The holding fixture as described herein in accordance with each of the prior described embodiments allows each of the retained photographic cameras to be releasably disposed into a repeatable position along with wireless remote control connection to operate each camera at the same time.

An advantage provided is that of providing an affordable apparatus that permits the use of a plurality of conventional photographic cameras in order to create 360 degree images, whether still photographs or moving video.

Other advantages that are realized are that the herein described apparatus is reliable, durable, adaptable for use in a variety of environments and is easy to assemble and use.

Yet another advantage realized is that the herein described assembly easily permits the inclusion of updated or replacement cameras and/or imaging software, as needed, and on the fly.

The holding assembly also can provide a number of accessible areas that permit easy access to attach data, video or power cabling as well as data cards, without having to remove the cameras from the assembly.

In addition, the herein described holding assembly provides a plug and play configuration that permits an operator to change cameras easily and without requiring external tools, such as a screwdriver.

The herein described holding assemblies can also be suitably used for purposes of underwater and aerial environments. In an underwater environment, a plurality of cameras can be suitably retained, each including the use of an adaptive dome converter, in order to permit a suitable field of view to be maintained in spite of the refractive effects created by water and enable full spherical images to be produced.

In an aerial environment, the herein described holding assemblies can be provided in at least one version as part of an assembly that is capable of flight akin to a helicopter and having a set of rotors that permits hovering. In at least one version and due to "blind" spots in an array of retained 360 degree spherical cameras, the resulting spherical or full 360 degree×180 degree full spherical image will appear without interference from the rotor assemblies, which are specifically disposed within the blind spots of the assembly. As a result, the resulting images, such as moving 360 degree spherical video, advantageously appear as though the apparatus is "floating" or levitating in air.

According to yet another version, a three-dimensional viewing effect can be created using holding assemblies that mount cameras in tandem (side by side) to produce a stereoscopic effect as to resulting images and create a depth of field with regard to each of the tandem camera lenses, which act in concert to produce the desired effect.

These and other features and advantages will be readily apparent from the following Detailed Description, which should be read in conjunction with the accompanying drawings.

BRIEF DESCRIPTION OF THE DRAWINGS

FIG. 2(a) is a front perspective view of a camera holding assembly in accordance with another exemplary embodiment;

FIG. 2(b) is a top plan view of the camera holding assembly of FIG. 2(a);

FIGS. 2(c) and 2(d) are side elevational views of the camera holding assembly of FIGS. 2(a) and 2(b);

FIG. 4(a) is a front perspective view of a camera holding assembly in accordance with yet another exemplary embodiment;

FIG. 4(b) is a top plan view of the camera holding assembly of FIG. 4(a);

FIGS. 4(c) and 4(d) are side elevational views of the camera holding assembly of FIGS. 4(a) and 4(b);

FIG. 8(c) is a exploded assembly view of various components of the dome converter of FIGS. 8(a) and 8(b);

FIGS. 11(b) and 11(c) are perspective views of other aerial apparatus including multiple photographic camera holding assemblies;

DETAILED DESCRIPTION

The following describes various exemplary embodiments of a system employing a holding assembly that can be used to support a plurality of photographic cameras in order to obtain spherical 360 degree still photographs or moving video of a scene of interest, as well as contemplated modes involving same. Because the embodiments are exemplary in nature, it will be readily apparent to one of sufficient skill that certain variations and modifications will be possible employing the inventive concepts discussed herein. In addition and throughout the course of discussion, several terms are used in order to provide a suitable frame of reference with regard to the accompanying drawings. These terms, which can include "upper", "lower", "top", "bottom", "inner" "outer", "above", and "below" among others are therefore not intended to be limiting of the invention, except where so specifically and clearly indicated otherwise. The drawings are also provided to illustrate salient features of the present invention, but are not necessarily to scale for purposes of interpretation. Examples of dimensions that are noted in this disclosure are also intended to be merely exemplary as to the concepts discussed throughout and with regard to the appended claims.

Figure 1A:
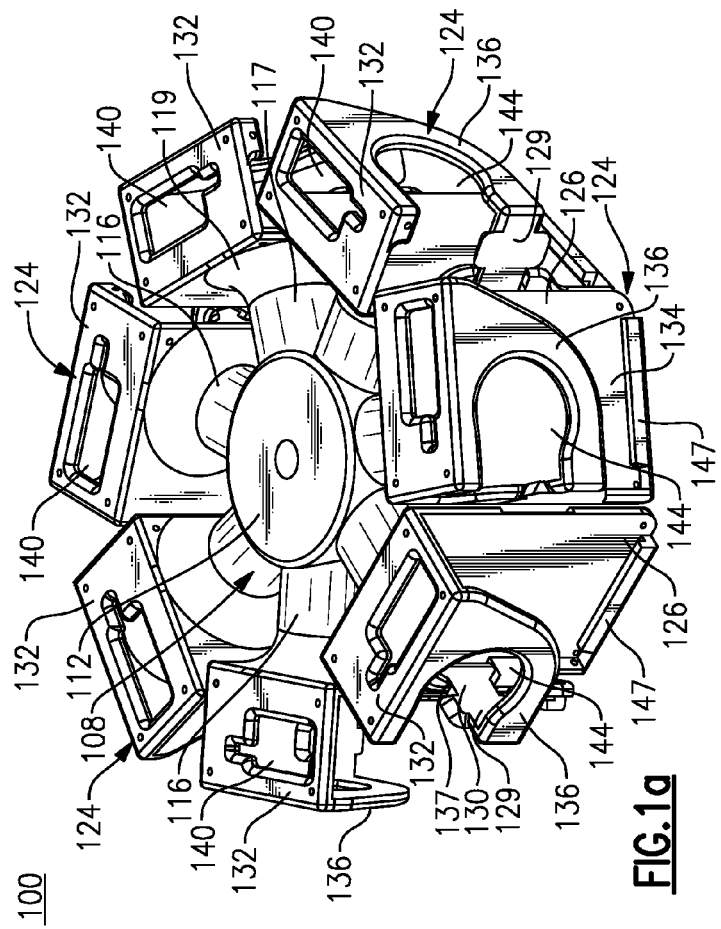
FIG. 1(a) is a front perspective view of a camera holding assembly for a 360 degree imaging apparatus that is made in accordance with an exemplary embodiment.
Figure 1B:
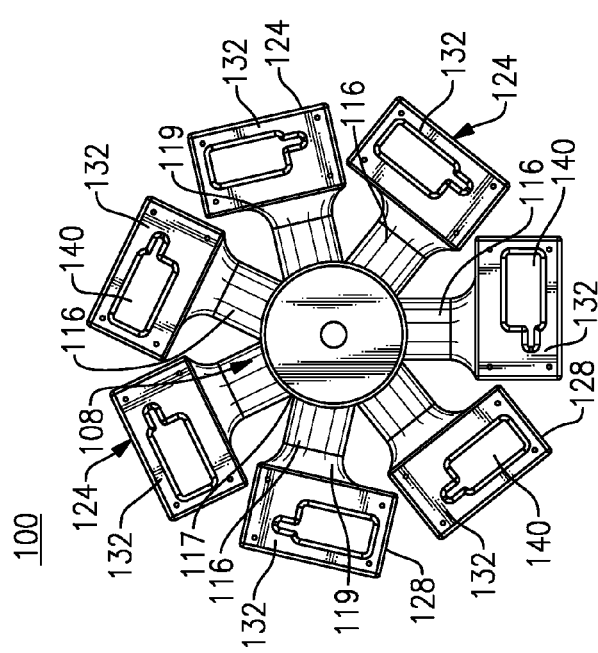
FIG. 1(b) is a top plan view of the camera holding assembly of FIG. 1(a)
Figure 1D:
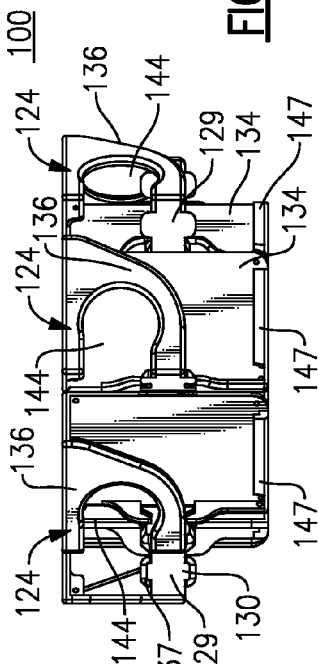
FIGS. 1(c) and 1(d) are side elevational views of the camera holding assembly of FIGS. 1(a) and 1(b)
Figure 1C:
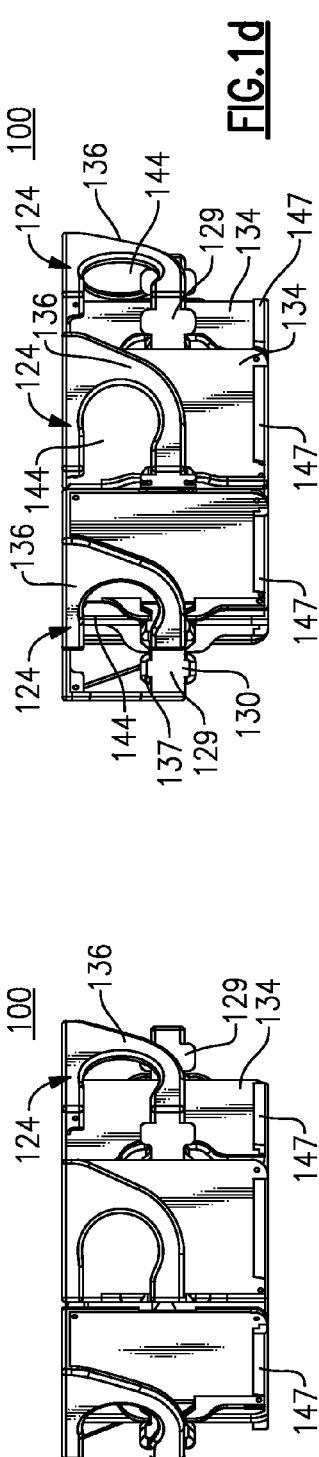
Figure 1E:
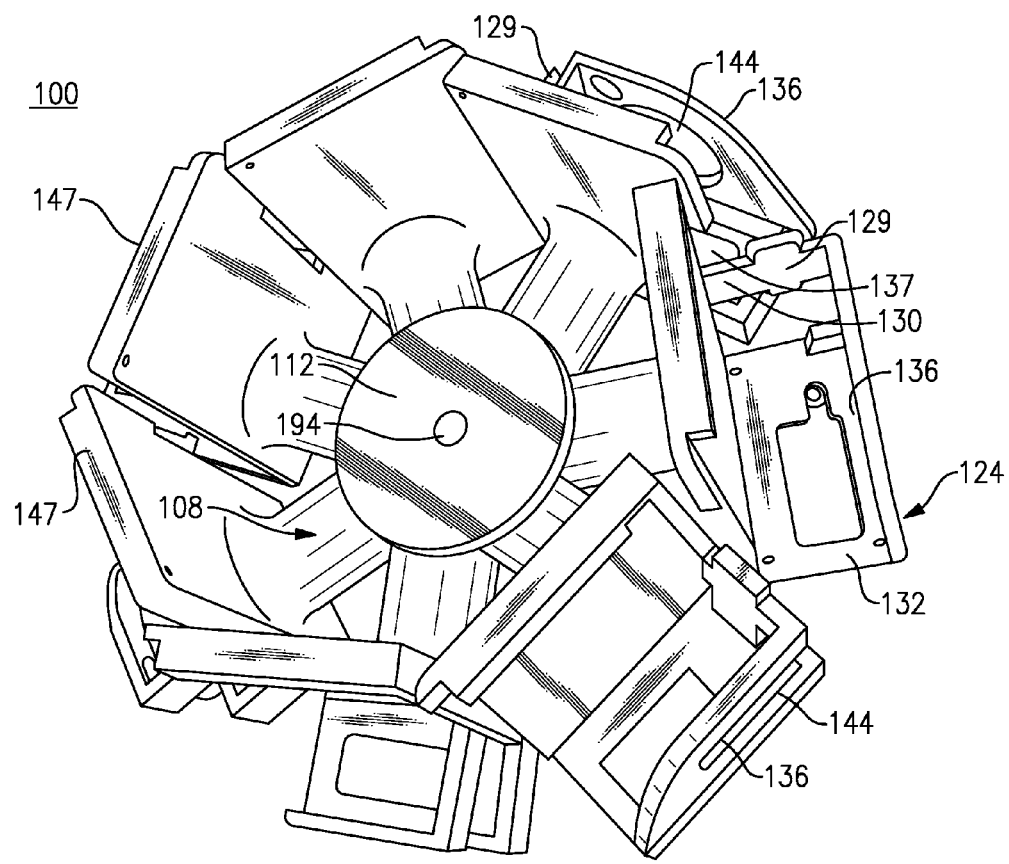
FIG. 1(e) is a bottom perspective view of the camera holding assembly of FIGS. 1(a)-1(d)
Figure 1F:
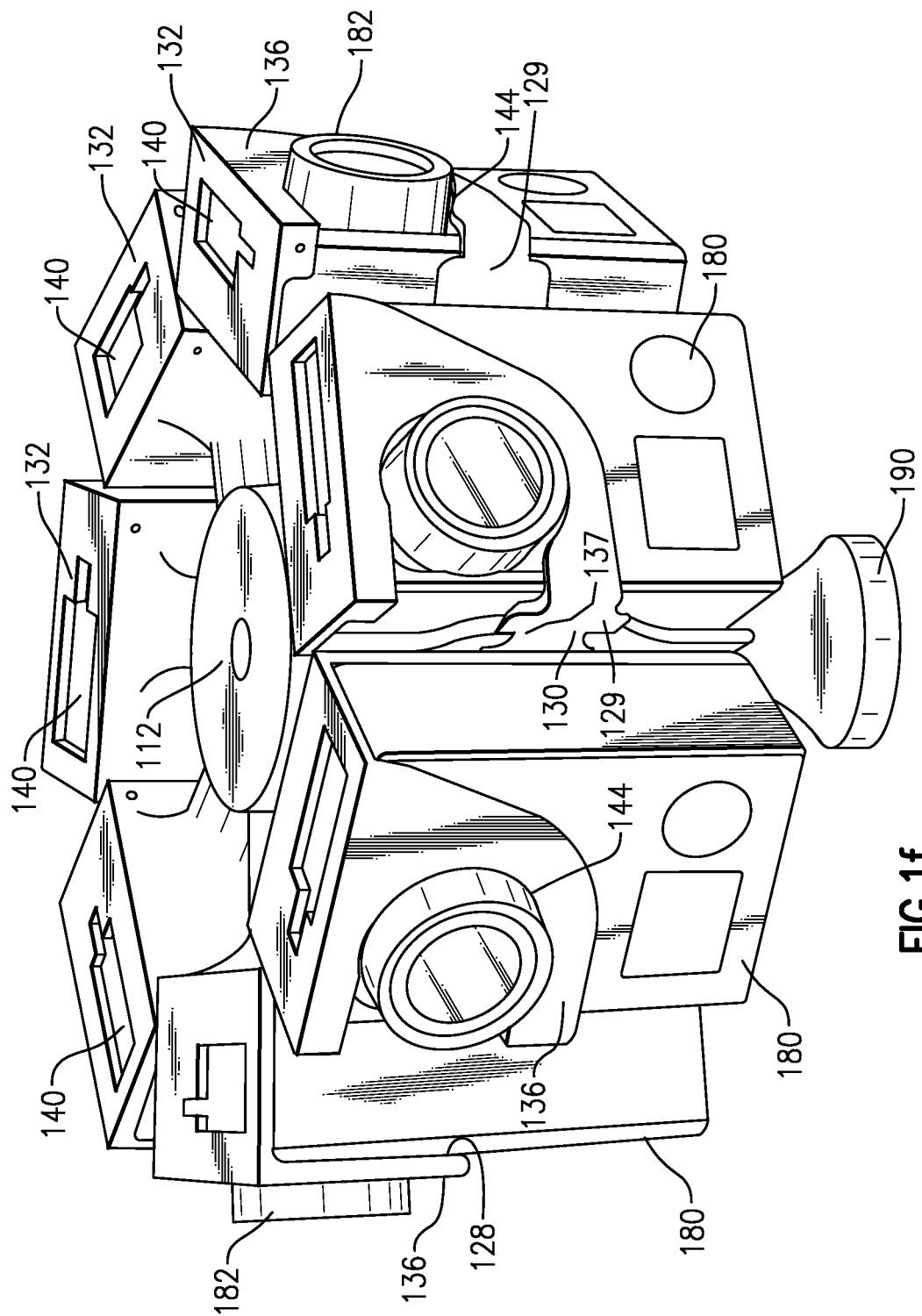
FIG. 1(f) is a perspective view of the camera holding assembly of FIGS. 1(a)-1(e) having cameras loaded therein.

According to a first exemplary embodiment and with reference to FIGS. 1(a)-1(f), a holding assembly 100 is defined by a supporting fixture or member 108. FIGS. 1(a)-1(e) depict the holding assembly 100 alone, while FIG. 1(f) depicts the holding assembly 100 having a plurality of individually retained photographic cameras 180.

The supporting fixture 108 of the herein described holding assembly 100 is defined by a center axial column 112 having a plurality of radial arms 116 extending outwardly from the center column 112. According to this specific embodiment, a total of seven (7) radially extending arms 116 are provided, each of the arms 116 including a proximal end 117 that is integrated with the center column 112 and a distal end 119 that is integrated with a camera receptacle 124. A corresponding number of camera receptacles 124 are provided, each arranged circumferentially about the center column 112. Alternatively, the arms 116 could be connected by fasteners or other means to the center column 112 as discussed in greater detail in other embodiments. The shape and configuration of the radially extending arms 116 can also be suitably varied, provided the camera receptacles 124 are stably supported. For example and according to this embodiment, the extending arms 116 are each commonly defined by a substantially cylindrical configuration.

In this specific embodiment, the holding assembly 100 is entirely made from a durable lightweight material such as nylon or other flexible thermoplastic polymer, having sufficient stiffness for enabling stable retention of a plurality of cameras as discussed in greater detail infra. In at least one version, the supporting fixture 108 and receptacles 124 can be manufactured using a suitable molding process, as a one-piece assembly, such as shown more specifically in FIG. 1(e). It will be readily apparent, however, from the discussion that follows that other suitable materials could alternatively be utilized for manufacturing either the entire holding assembly 100 and/or portions thereof.

According to this embodiment, each camera receptacle 124 is transversely disposed relative to the major axis of each corresponding radially extending arm 116 and circumferentially disposed within a single (horizontal) plane. The specific features of a camera receptacle 124 are herein described which includes an enclosure having an interior that is sized to receive a photographic camera 180, FIG. 1(e). One specific camera that can be specifically used herein is a GoPro™ Hero3™ camera sold by Woodman Labs, Inc, which is capable of capturing still photographs or video and in which the camera's operation can be controlled remotely, including wirelessly. The camera receptacle 124 is defined by an open end 126, a top wall 132, an inner side wall 134 and an outer side wall 136 that is substantially parallel to the inner side wall 134. Opposite the top wall 132 and disposed against the inner side wall 134 is an edge protrusion or stop 147. In passing, it should be noted that the terms "top", "inner" and "outer" are for purposes of this embodiment and in accordance with the views as they appear in FIGS. 1(a)-1(e). Depending on a specific mounting scheme, for example, the herein described holding fixture 100 could be inverted wherein the "top" walls effectively become "bottom" walls, etc. To that end, these relative terms are maintained throughout the disclosure when referring to various types of receptacles and/or portions of a holding assembly.

An integral engagement latch 129 depends laterally and inwardly from the end of the outer side wall 136 opposite the open end 126 of the camera receptacle 124. This latch 129 includes a depending tab portion 130 having an outwardly tapering configuration at one end that releasably engages a slot 137 provided adjacent the inner side wall 134.

Referring to FIGS. 1(a)-1(f), the outer side wall 136, according to this embodiment, is a partial wall section extending over only a portion of the length of the inner side wall which further includes an opening 144. The top wall 132 also includes a through opening 140.

According to this exemplary embodiment and as shown in FIG. 1(f), each photographic camera 180 is inserted, as shown, into the open end 126 of a camera receptacle 124 of the herein described holding assembly 100 by disengaging the tab portion 130 of the releasable engagement latch 129 from the slot 137 in order to hingably open a flap-like portion of the camera receptacle 124 that includes the outer side wall 136 and the depending engagement latch 129. The back side of the camera 180 is placed against the inner side wall 134 wherein the camera 180 is placed between the top wall 132 and the edge protrusion 147. When properly situated within the receptacle 124, the outer side wall 136 is flexibly engaged against the top surface of the camera 180 and the tapering tab portion 130 of the engagement latch 129 is secured within the slot 137, to create a closed enclosure. The defined opening 144 in the outer side wall 136 is sized to receive the extending cylindrical lens barrel 182 of the photographic camera 180 such that the lens barrel 184 extends outwardly through the opening 144 when the receptacle 124 is closed. When assembled to the holding assembly 100, the opening 140 in the top wall 132 permits access to the connection ports of each retained camera 180, as needed to permit cabling (not shown), access to batteries and data cards and without having to remove the camera from the receptacle 124. In this orientation, the cameras 180 and more specifically the lens barrel 182 of each camera 180 are oriented at a predetermined angular position relative to the center column 112 in a circular fashion along a common horizontal plane and in which each retained camera 180 has a field of view of about 170 degrees that overlaps a portion of an adjacently retained camera 180 along the defined plane. Each camera 180 can be removed or replaced by disengaging the tab portion 130 of the engagement latch 129 from the slot 137 and bending the outer side wall 136 upwardly toward the top wall 132. The camera 180 can then be released from the opened receptacle 124 for replacement and/or upgrade.

Referring to FIGS. 1(e) and 1(f), the herein described holding assembly 100 can include at least one feature that permits attachment to an object, such as a tripod or connecting rod or support 190, FIG. 1(f) through use of suitable fasteners (not shown) via a threaded opening 194 provided at the bottom side of the center axial column 112, FIG. 1(e). Examples of other suitable objects and applications are discussed in a later section. The cameras, as retained by the individual receptacles 124 can be linked, such as through cabling (not shown) through the openings 140 to one another or preferably by wireless control in which each of the cameras can be coordinated to operate simultaneously and remotely. The retained cameras are disposed, according to this embodiment, so as to provide a suitable field of view about the defined plane and in which resulting images obtained through the data cards of the cameras can be stitched to create a composite 360 degree spherical image.

Figure 5A:
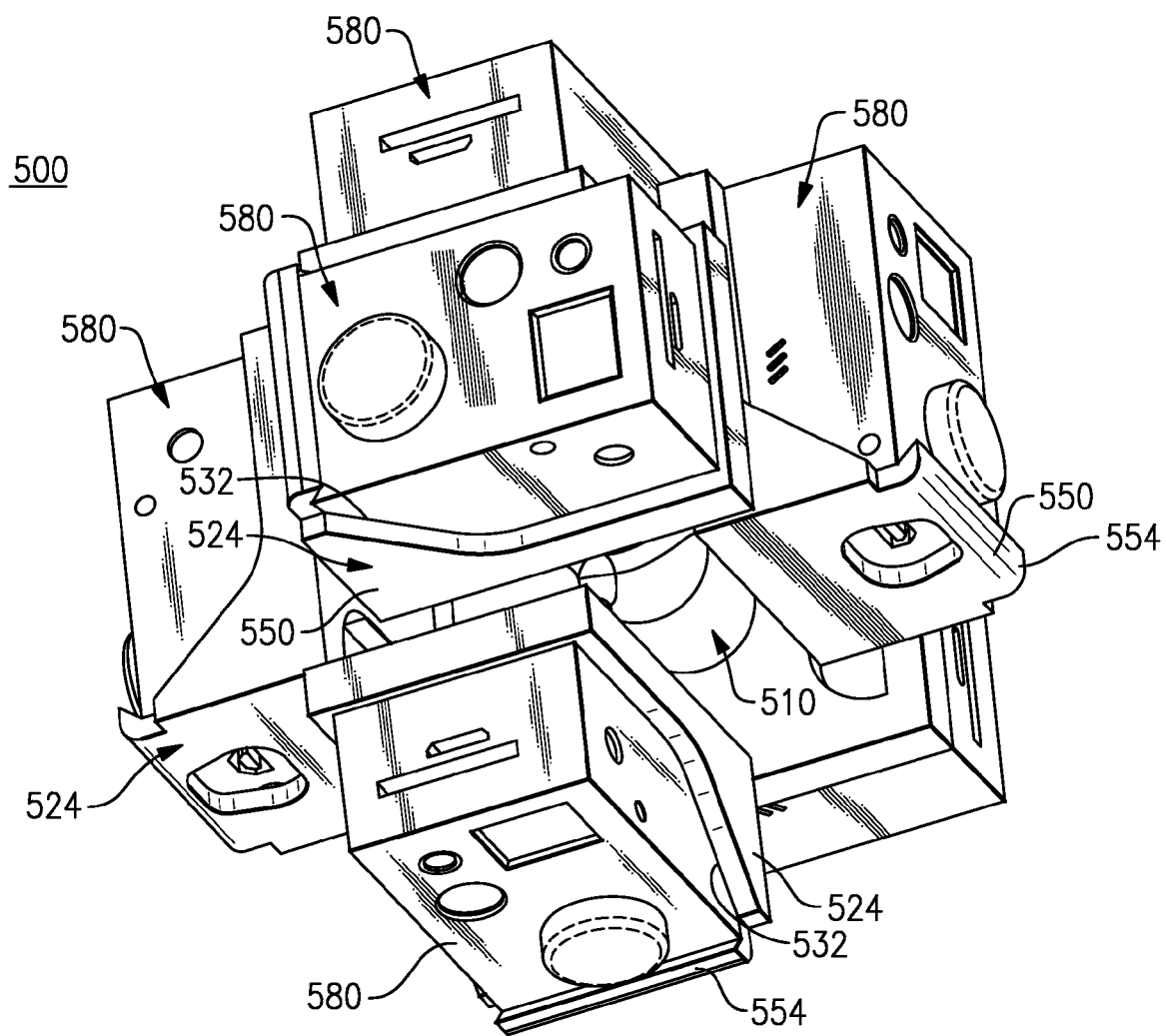
FIG. 5(a) is a perspective view of a camera holding assembly in accordance with another exemplary embodiment having a plurality of photographic cameras retained thereon.
Figure 5B:
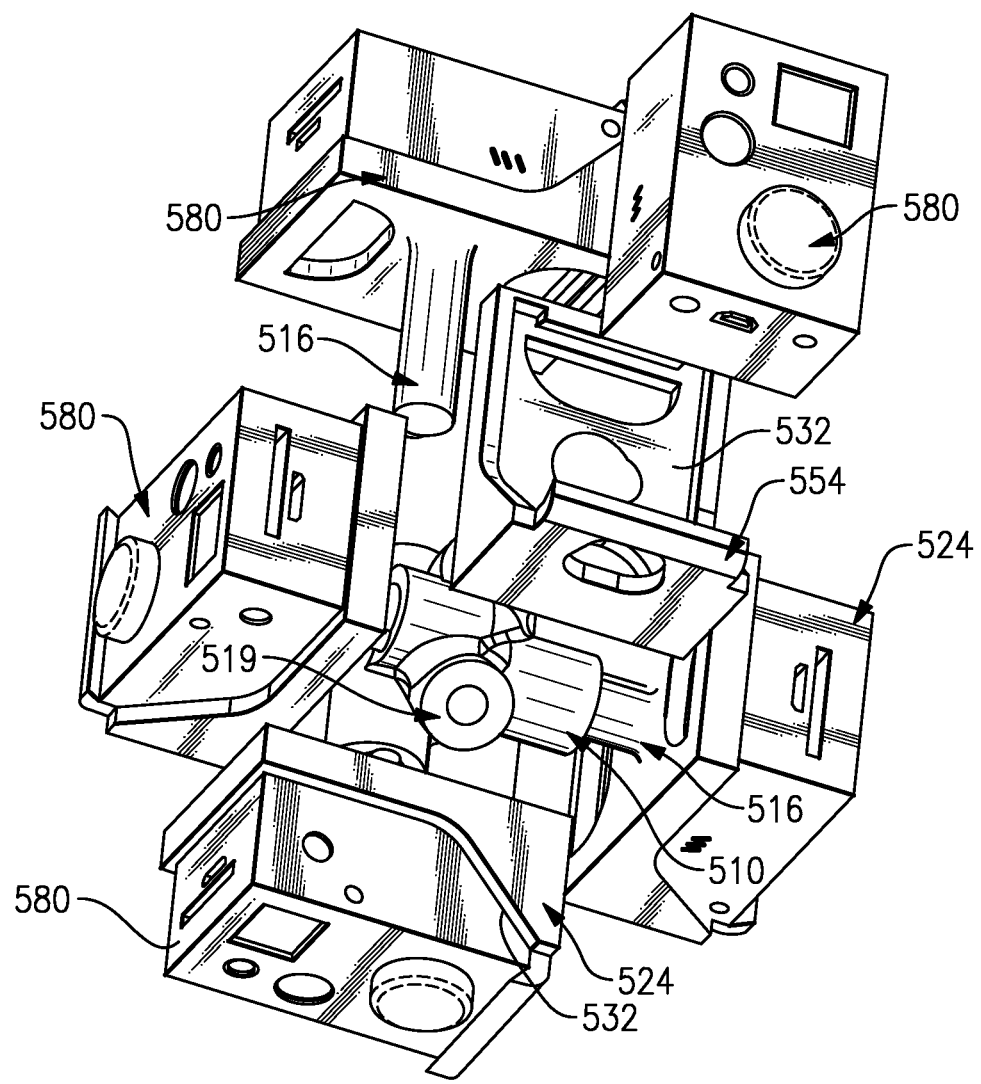
FIG. 5(b) is a rotated perspective view of the camera holding assembly of FIG. 5(a), illustrating the removal of at least one photographic camera.
Figure 5C:
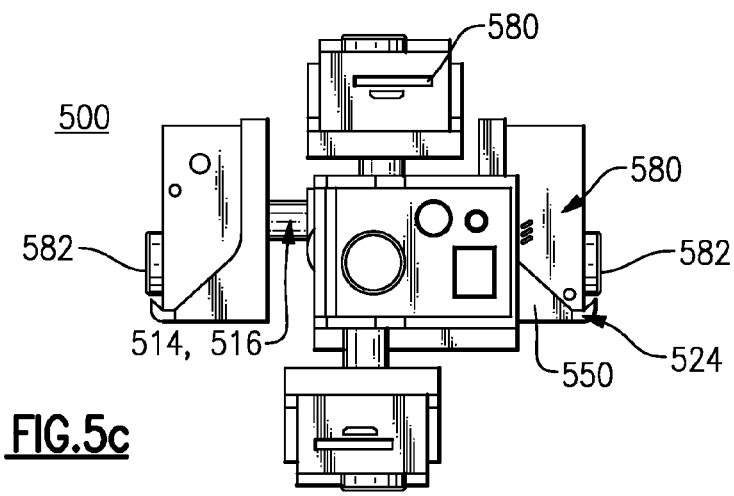
FIGS. 5(c), 5(d) and 5(e) depict various side views of the camera holding assembly of FIGS. 5(a) and 5(b), including a plurality of retained cameras in preferred orientations.
Figure 5D:
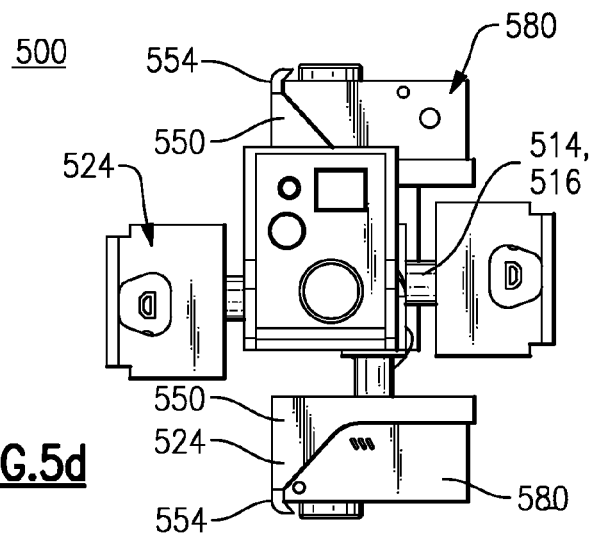
Figure 5E:
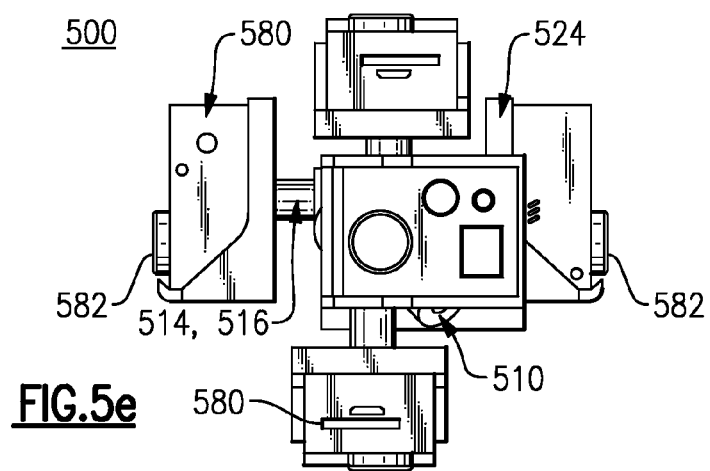
Figure 5F:
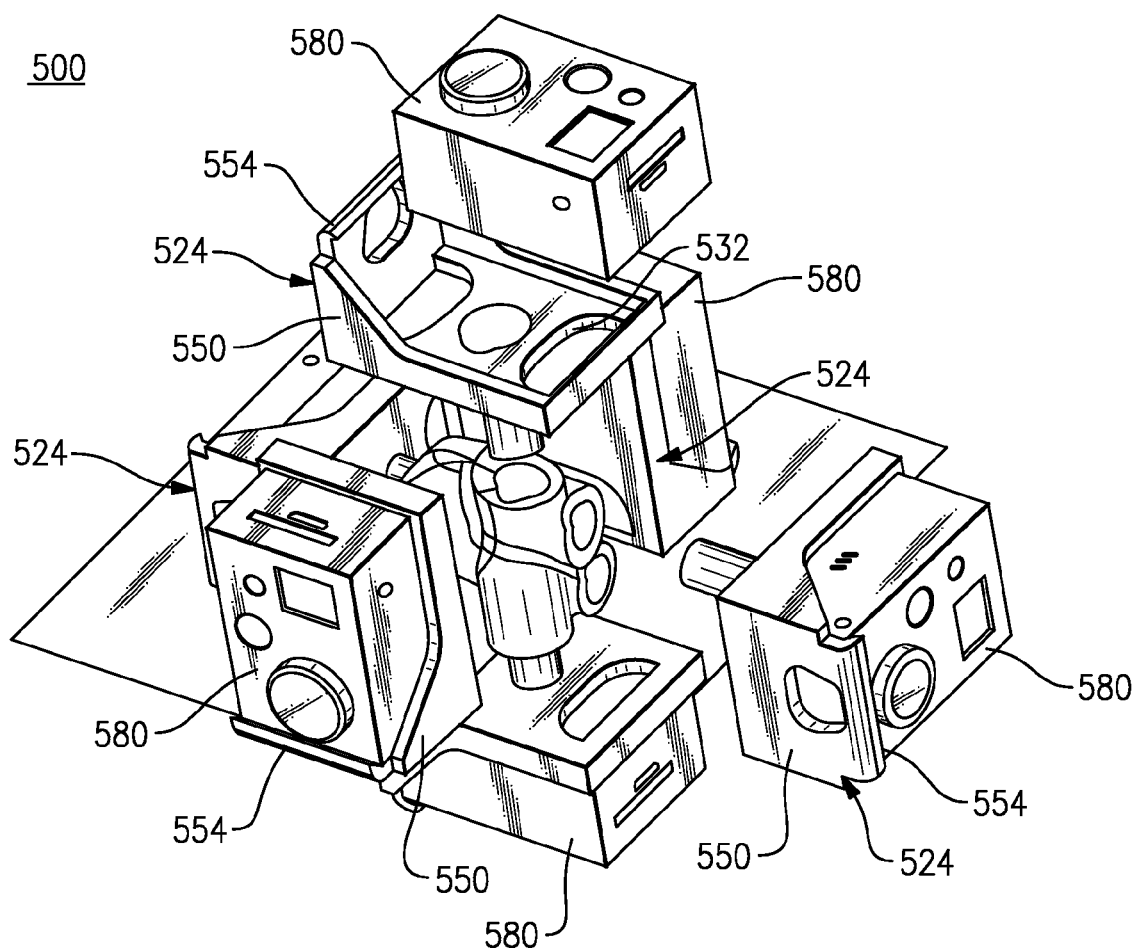
FIG. 5(f) is a rotated perspective view of the camera holding assembly of FIGS. 5(a)-5(e), in a partially assembled condition.
Figure 5G:
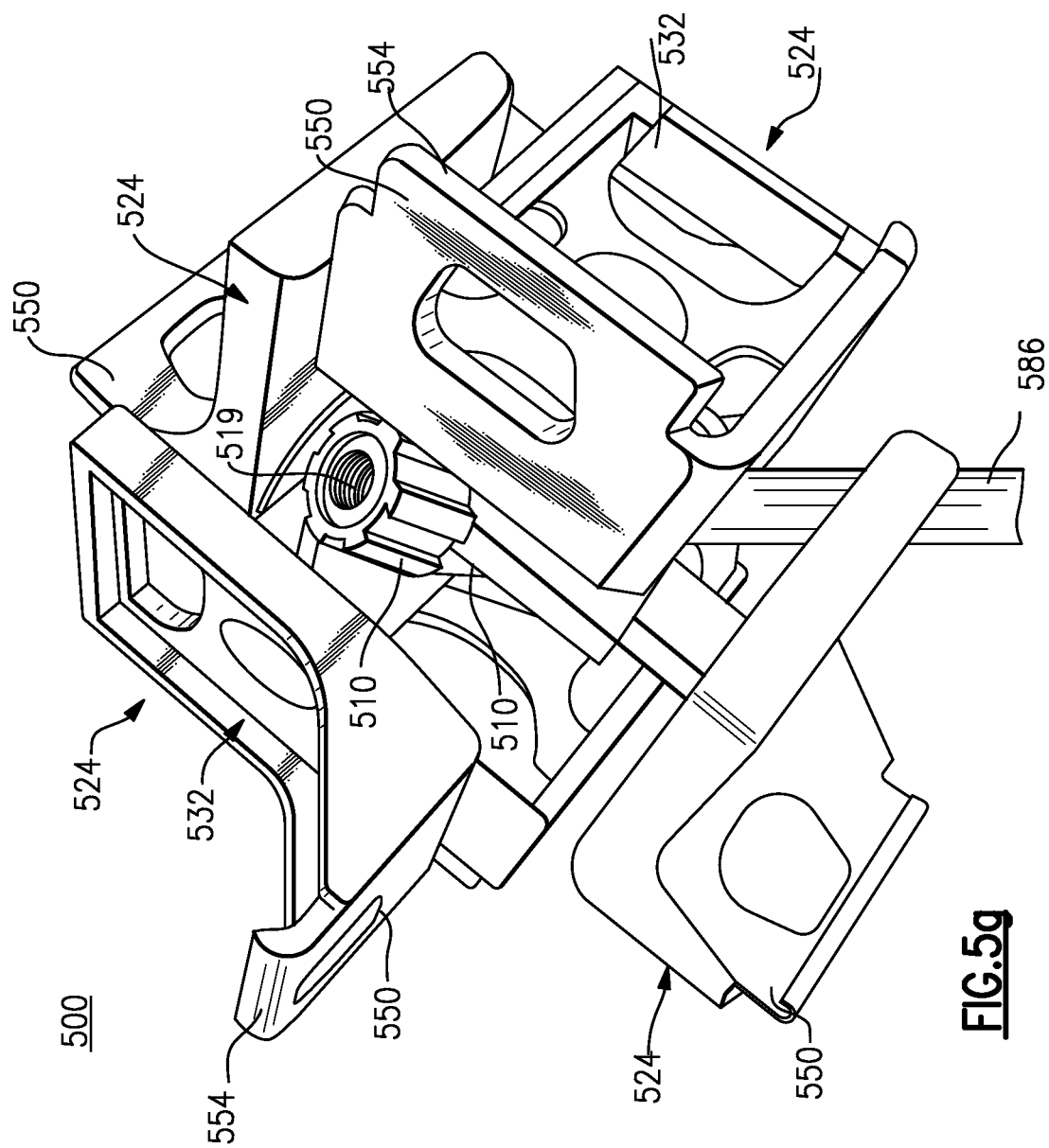
FIG. 5(g) is a perspective view of the camera holding assembly of FIGS. 5(a)-5(f)
Figure 5H:
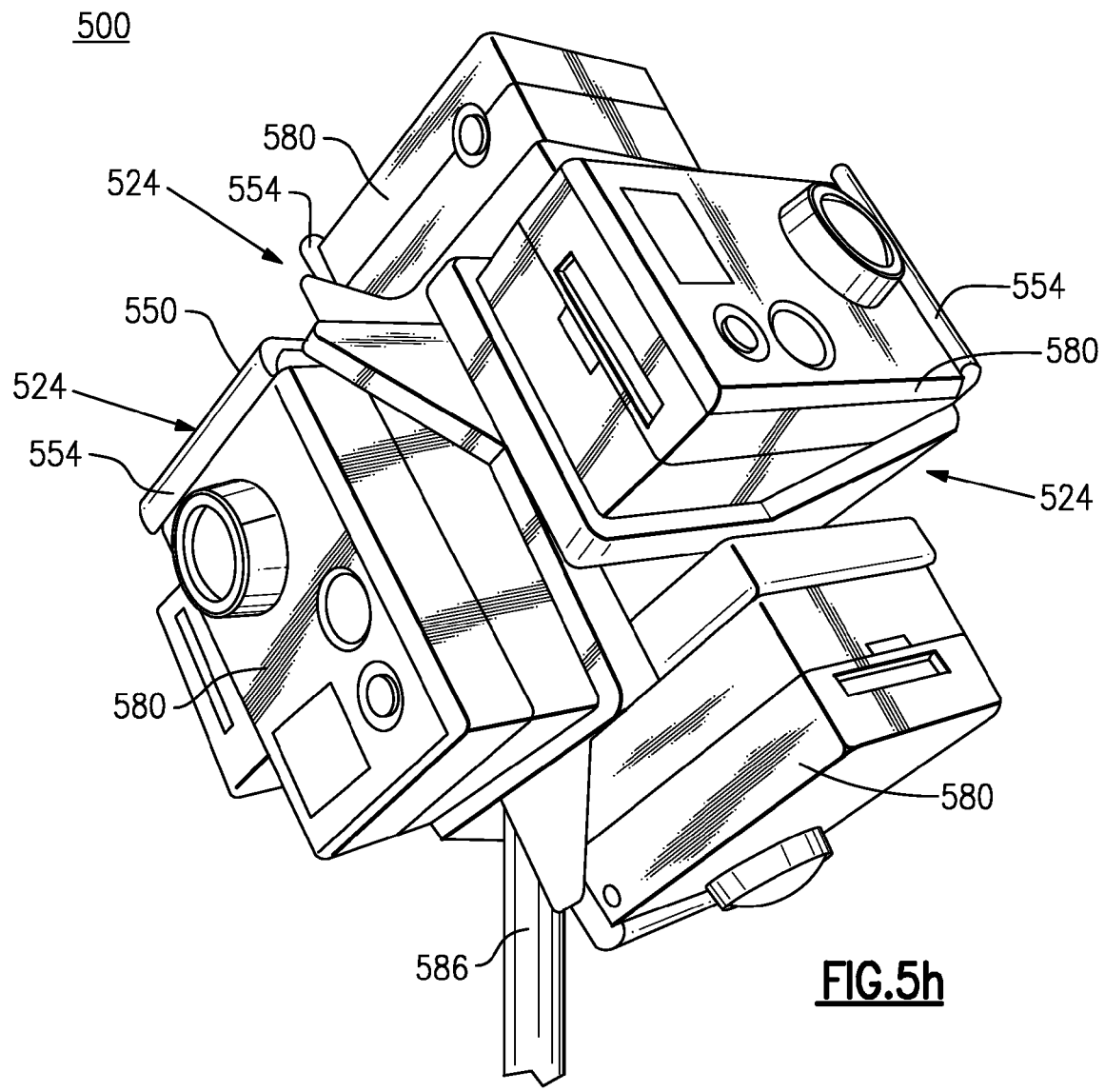
FIG. 5(h) is the perspective view of the camera holding assembly of FIG. 5(g) with a plurality of photographic cameras attached thereto.
Figure 6A:
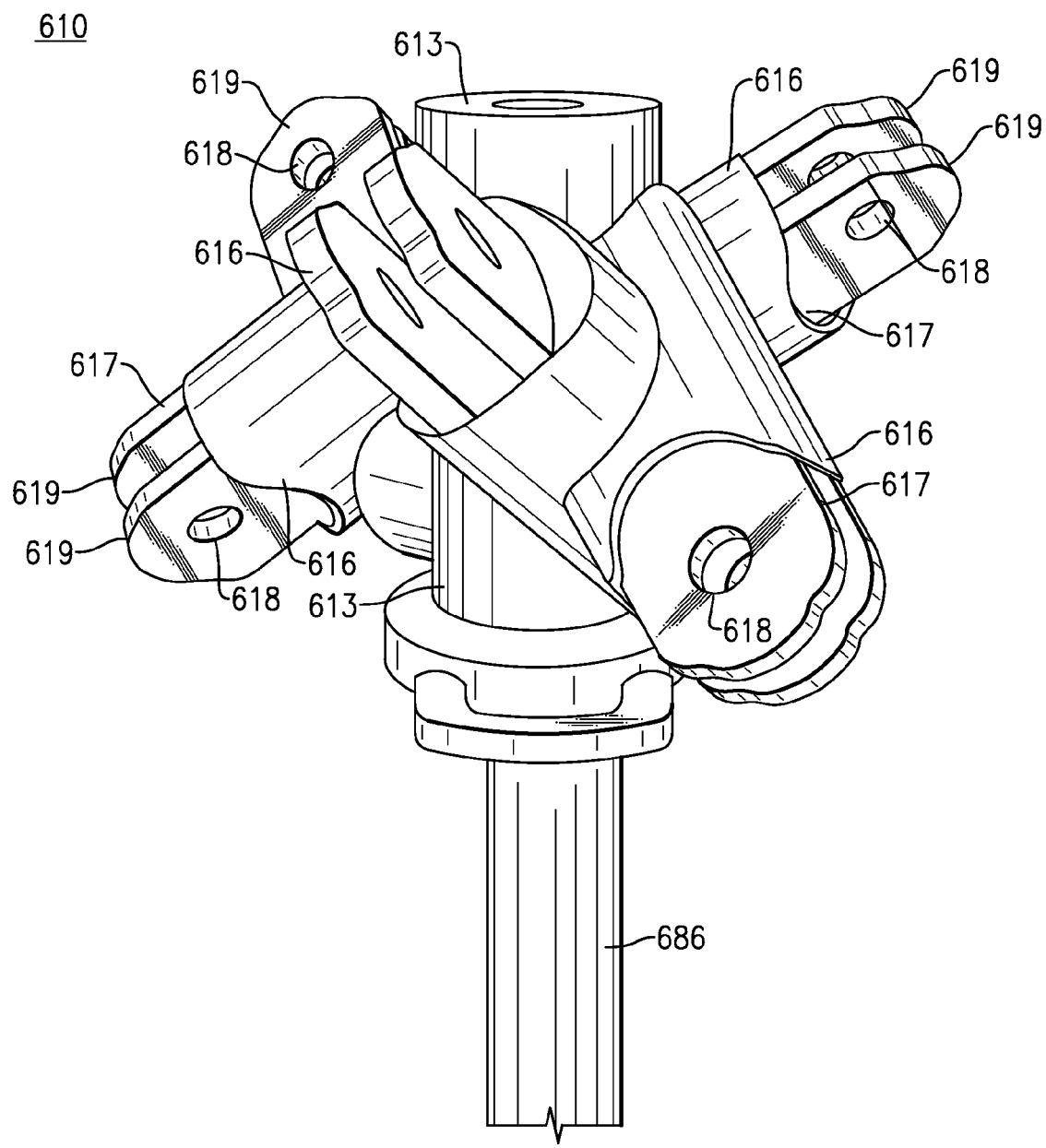
FIG. 6(a) is a portion of a support for a camera holding assembly made in accordance with another exemplary embodiment.
Figure 6B:
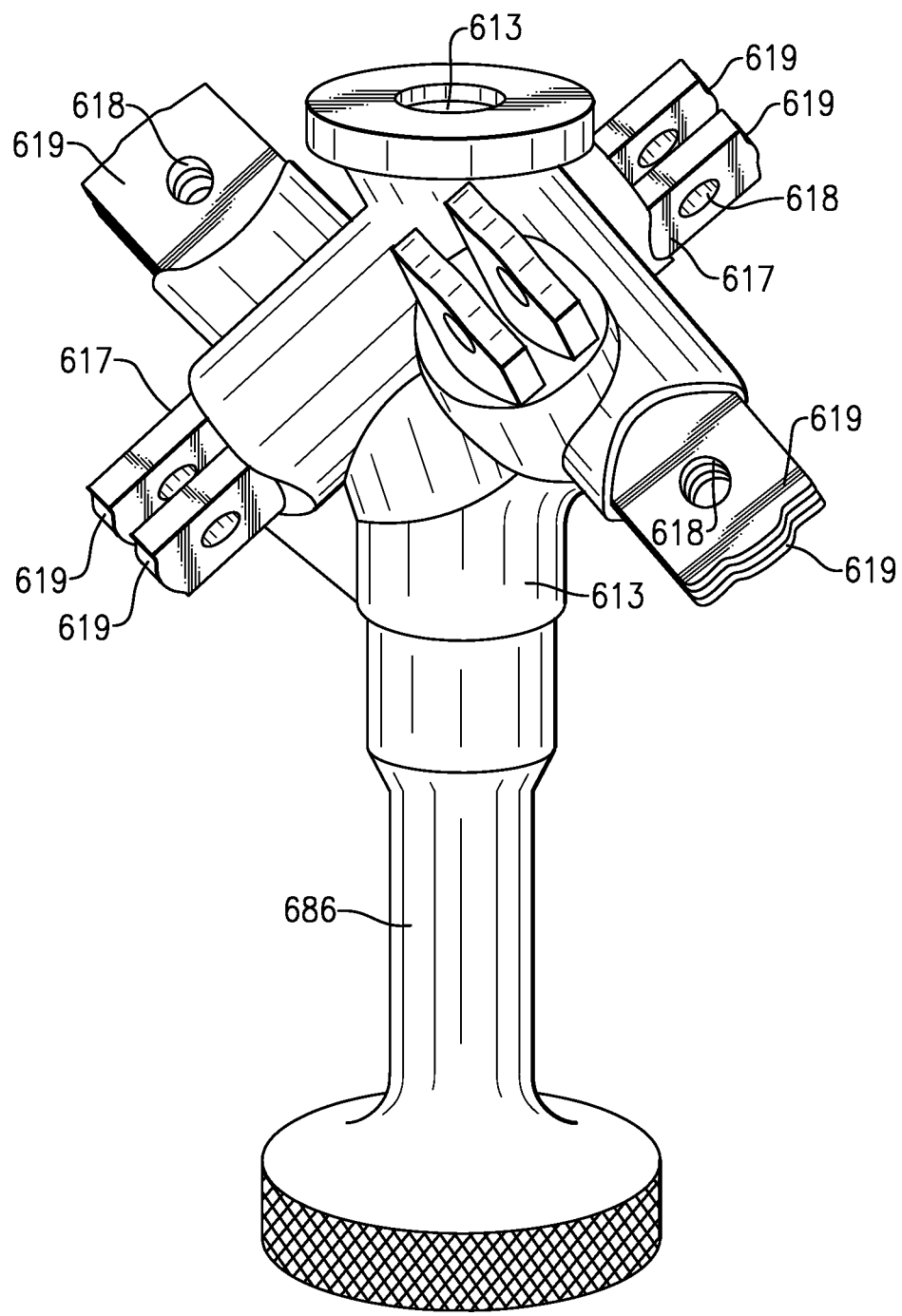
FIG. 6(b) is a portion of an alternative design of a support for a camera holding assembly.
Figure 6C:
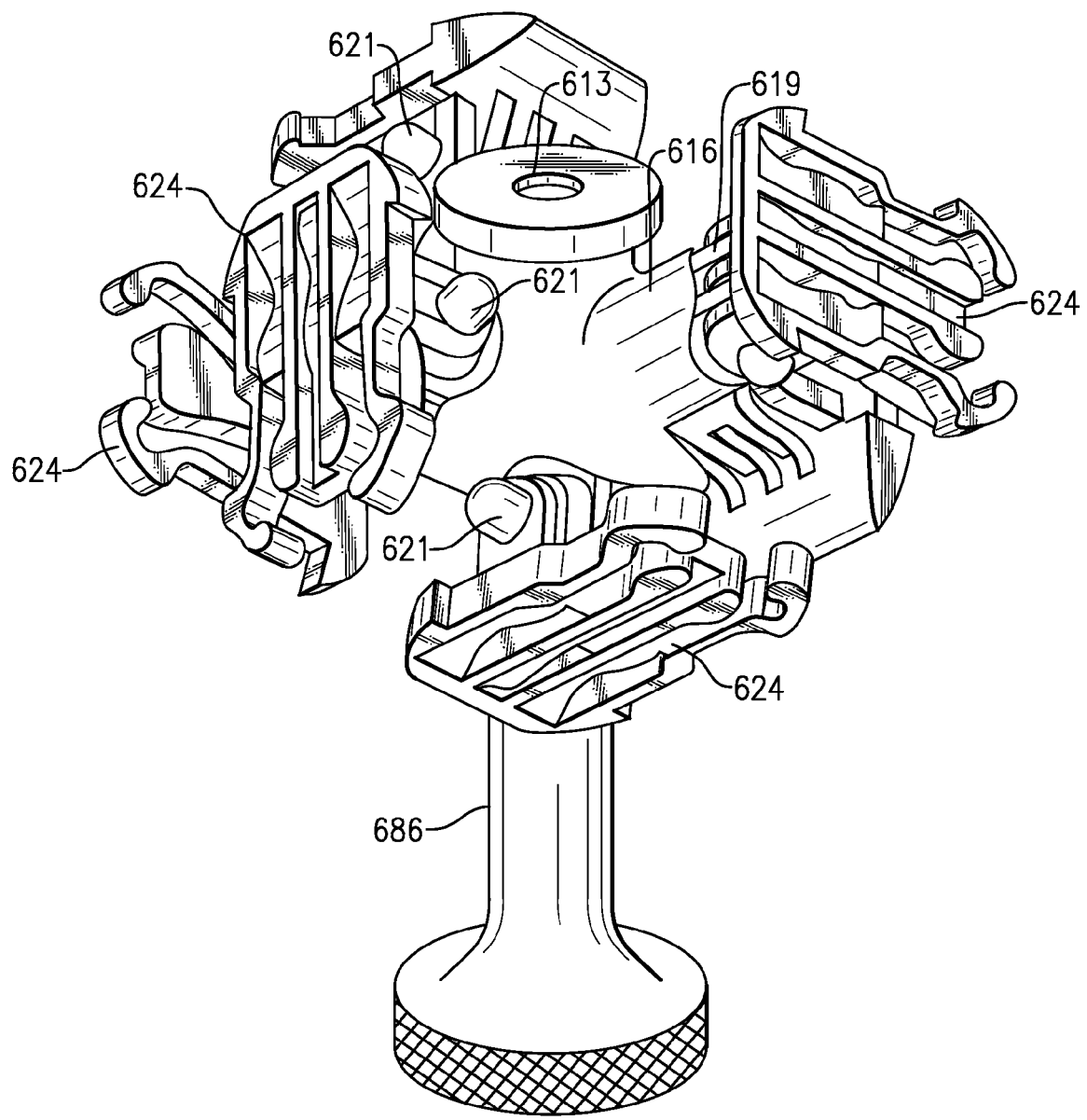
FIG. 6(c) depicts the attachment of receptacles to the support of FIG. 6(b)

A holding assembly 200 made in accordance with a second exemplary embodiment is shown with reference to FIGS. 2(a)-2(d). As in the preceding, a center supporting fixture 210 (only partially shown) retains a plurality of camera receptacles 224 in a predetermined configuration wherein each camera receptacle 224 is attached to the distal end of a radial arm (not shown) projecting outwardly from a center supporting fixture (only partially shown in FIGS. 2(b), 2(c) and 2(d). More specifically and according to this exemplary embodiment, five (5) camera receptacles 224 are circumferentially disposed along a common (horizontal as shown herein) plane. It will be readily apparent that the number of camera receptacles 224 can easily be varied. The construction of the camera receptacles 224 is identical to that described in the prior embodiment in which the supporting fixture and the receptacles 224 can each be made from a durable and flexible material, such as nylon or a thermoplastic polymer and also wherein the holding assembly 200 can be entirely manufactured as a one-piece assembly using a molding process. Alternatively, the supporting fixture 210 can be constructed according to a design such as shown in FIG. 5(a), in which each of the receptacles 224 can be separately attached or otherwise secured, as shown, for example, in FIGS. 6(a) and 7(a).

More specifically, each camera receptacle 224 is made from a durable and flexible material according to this exemplary embodiment and defined by an open end 226 and an opposing engagement latch 229 that is further connected to a top wall 232 and an outer side wall 236 that combine to define an enclosure along with an inner side wall 234. As in the preceding embodiment, the engagement latch 229 depends inwardly from the end of the outer side wall 236 that is opposite the open end 226 and is defined by a depending tab portion 230 having an outward taper that releasably engages a corresponding slot 237 adjacent the inner side wall 236. Also and as previously described, the outer side wall 236 includes an opening 244 that is sized to receive the lens barrel (not shown) of a retained photographic camera (not shown) and the top wall 232 also includes an opening 240 enabling access to connecting ports or to the data card of the retained camera and/or for cabling (not shown).

According to this version, another camera receptacle 224 having similar features is provided at the distal end of the supporting fixture 210 and above the defined horizontal plane, wherein each of the six camera receptacles 224 is configured to retain a corresponding photographic camera at a common radial distance relative to the center of the supporting fixture 210. In terms of operation, a camera can be releasably secured within a camera receptacle 224 by releasing the engagement latch 229 and more specifically the tab portion 230 from the slot 237 and bending the flexible flap-like section including the outer side wall 236 outwardly. A camera, such as a GoPro Hero, Hero2, Hero3 or other suitable camera can then be positioned by aligning the back side of the camera with the inner side wall 234 between the top wall 232 and a lower edge protrusion 247. Once positioned, the outer side wall 236 can be placed over the top surface of the camera with the lens barrel of the camera extending through the defined opening 244 and in which the engagement latch 229 can be reengaged with the slot 237 in order to secure the receptacle 224.

Finally, the supporting fixture 210 according to this version further includes a plurality of attachment posts 218, FIG. 2(b), that enable attachment of the holding assembly 200 to an object such as a tripod, a connecting rod or other mounting apparatus (not shown), the attachment posts 218 including a center opening 219 to facilitate attachment. These posts 218 can extend angularly between the camera receptacles 224.

In use, the five (5) cameras disposed along the common plane (horizontal per the receptacles of FIG. 2(a)) each provide a field of view of 170 degrees, which are combined to cover a 360 degree field of view. The remaining camera disposed out of the common plane provides an additional 170 degree field of view across the top of the holding assembly 200 and thereby increases the range of the overall composite spherical image.

A holding assembly 300 according to a third exemplary embodiment is shown in FIGS. 3(a)-3(d). This holding assembly 300 is similarly provided with an attachment portion or frame 310 that includes a center axial column 312, FIG. 3(e), as well as a plurality of radially extending arms 316, FIG. 3(e), and in which the supporting frame 310 can further include a plurality of attachment posts 318 having center openings 320 that are configured to attach the holding assembly 300 to a connecting rod or other support, 386, FIG. 3(e). According to this version, a total of seven (7) radially extending arms 316, are provided, five of which are disposed along a common horizontal plane with two additional arms oppositely disposed above and below the defined plane. Alternative designs changing the number of camera supports can easily be realized. For example and referring to FIG. 3(e), a holder assembly 300B includes seven (7) supporting arms 316 disposed about a common (horizontal) plane with single opposed arms being disposed above and below the common plane, thereby permitting nine (9) total cameras to be supported. According to yet another alternative version shown in FIG. 3(f), a holding assembly 300A can include seven (7) extending arms along the common plane with two (2) additional arms extending below the plane and a single arm extending above the plane, enabling 10 cameras to be supported. In each embodiment, the extending arms 316 include proximal ends 317, FIG. 3(e), attached to the axial column 312 and distal ends 319, FIG. 3(e), that support a camera receptacle 324. According to this version, the camera receptacles 324 are integral elements of the supporting fixture 310, which can be made from a durable material such as flexible nylon or a thermoplastic polymer.

The construction of each of the camera receptacles according to this embodiment and the above-noted alternatives is similar to that previously described in the prior embodiments. More specifically, each camera receptacle 324 is made from a durable and flexible material according to this exemplary embodiment and defined by an open end 326 and an opposing engagement latch 329 that is further connected to a top wall 332 and an outer side wall 336 that combine to define an enclosure along with an inner side wall 334. As in the preceding embodiment, the engagement latch 329 depends inwardly from the end of the outer side wall 336 that is opposite the open end 326 and is defined by a depending tab portion 330 that releasably engages a slot 337 adjacent the inner side wall 336. Also and as previously described, the outer side wall 336 includes an opening 344 that is sized to receive the lens barrel 382, FIG. 3(e) of a retained photographic camera 380, FIG. 3(e) and the top wall 332 also includes an opening 340 enabling access to connecting ports or to the data card of the retained camera 380.

A photographic camera 380 can be releasably secured within a camera receptacle 324 by releasing the engagement latch 329 and more specifically the tapered tab portion 330 from the slot 337 and bending the flexible flap-like section, including the outer side wall 336, outwardly. The camera 380 can then be positioned by aligning the back side of the camera 380 with the inner side wall 334 between the top wall 332 and a lower edge protrusion 347. Once positioned, the outer side wall 336 can be placed over the top surface of the camera 380 with the lens barrel 382 of the camera 380 extending through the defined opening 344 and in which the engagement latch 329 can be reattached to the slot 337 in order to secure the receptacle 324.

Figure 3A:
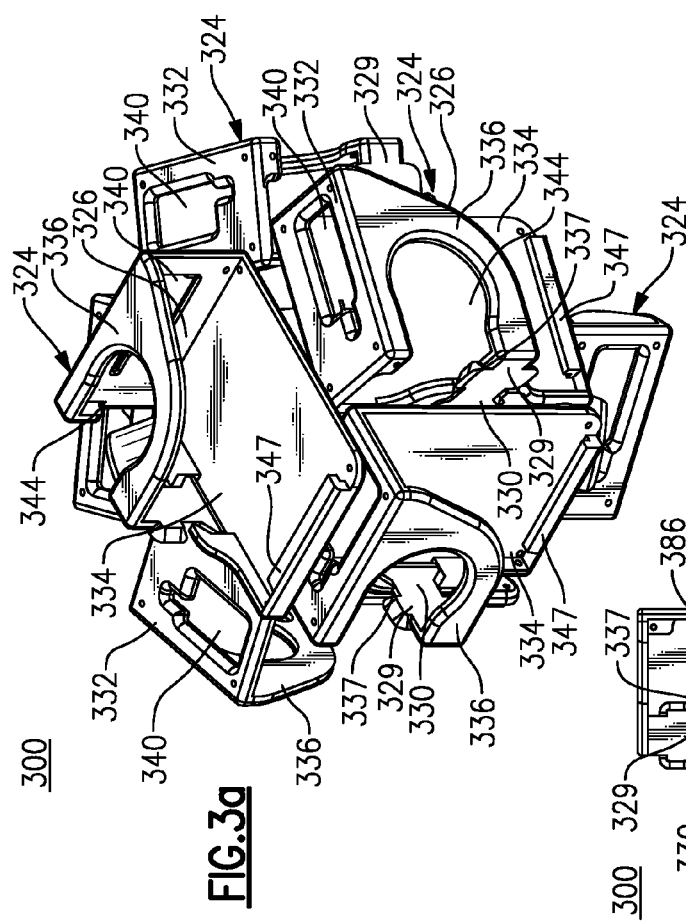
FIG. 3(a) is a front perspective view of a camera holding assembly in accordance with another exemplary embodiment.
Figure 3D:
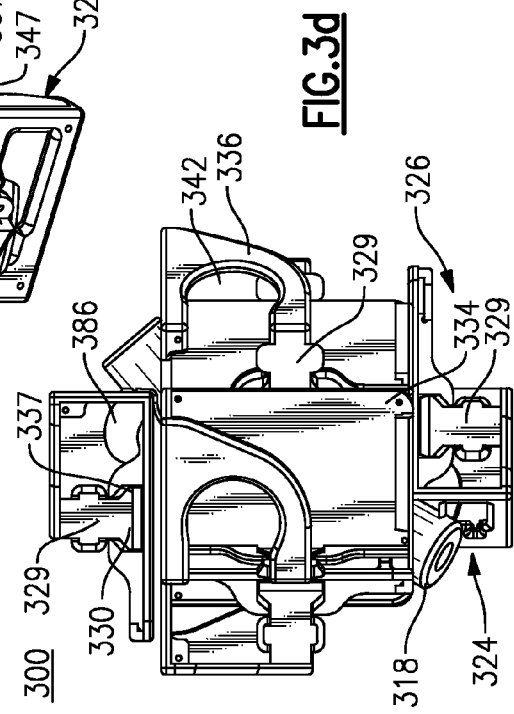
FIGS. 3(c) and 3(d) are side elevational views of the camera holding assembly of FIGS. 3(a) and 3(b)
Figure 3B:
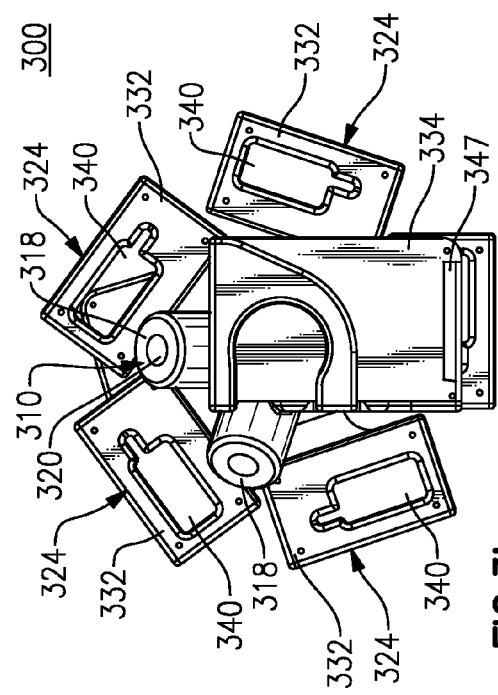
FIG. 3(b) is a top plan view of the camera holding assembly of FIG. 3(a)
Figure 3C:
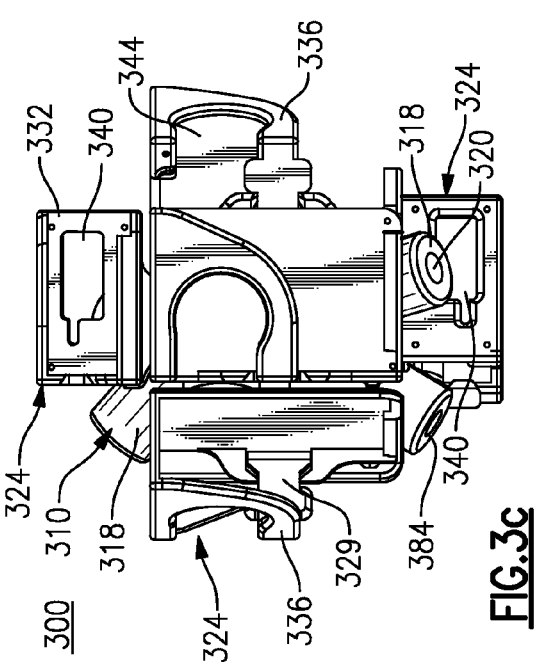
Figure 3E:
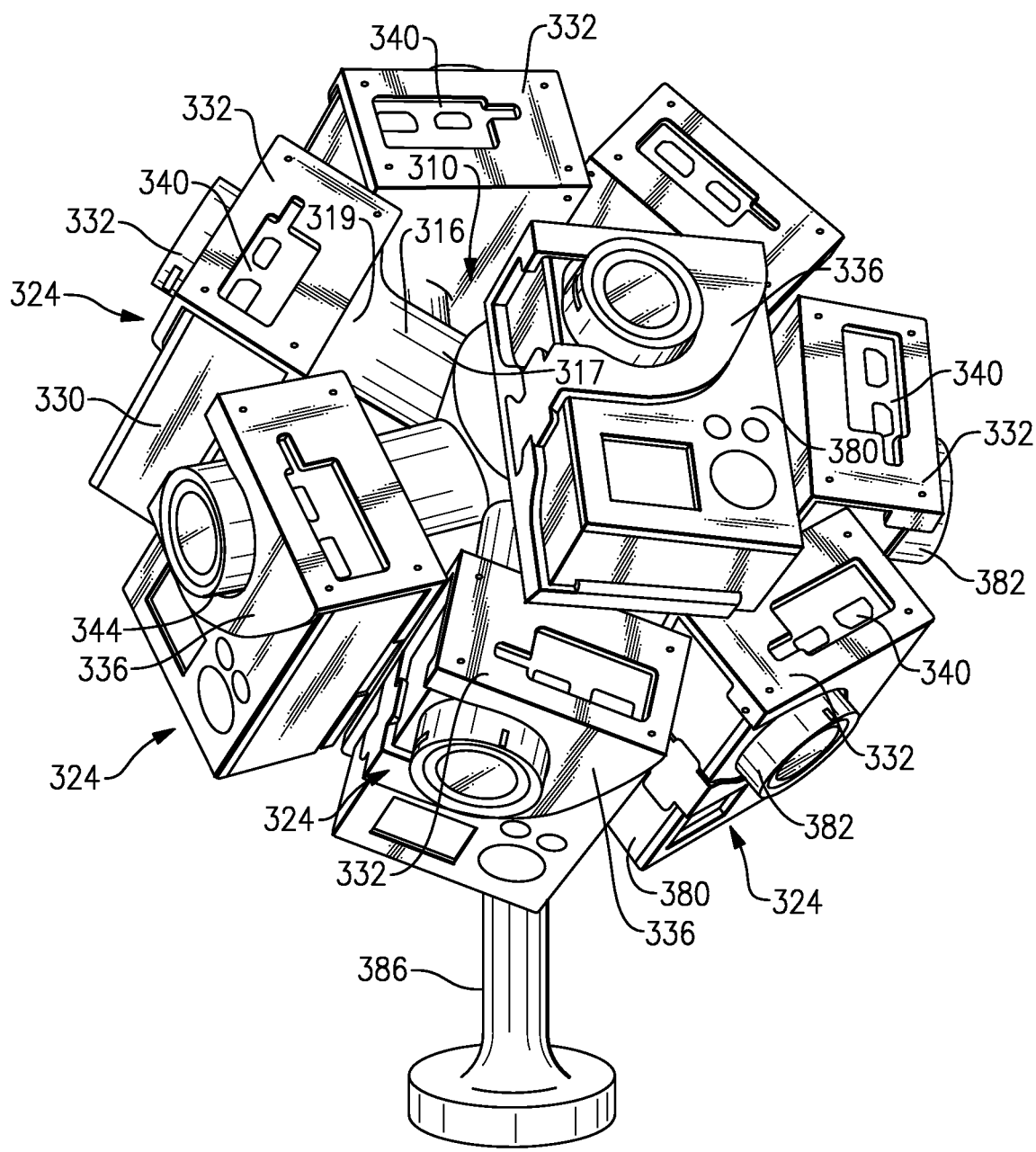
FIG. 3(e) is a top perspective view of an alternative camera holding assembly similar to that shown in FIGS. 3(a)-3(d) having additional number of cameras loaded therein.
Figure 3F:
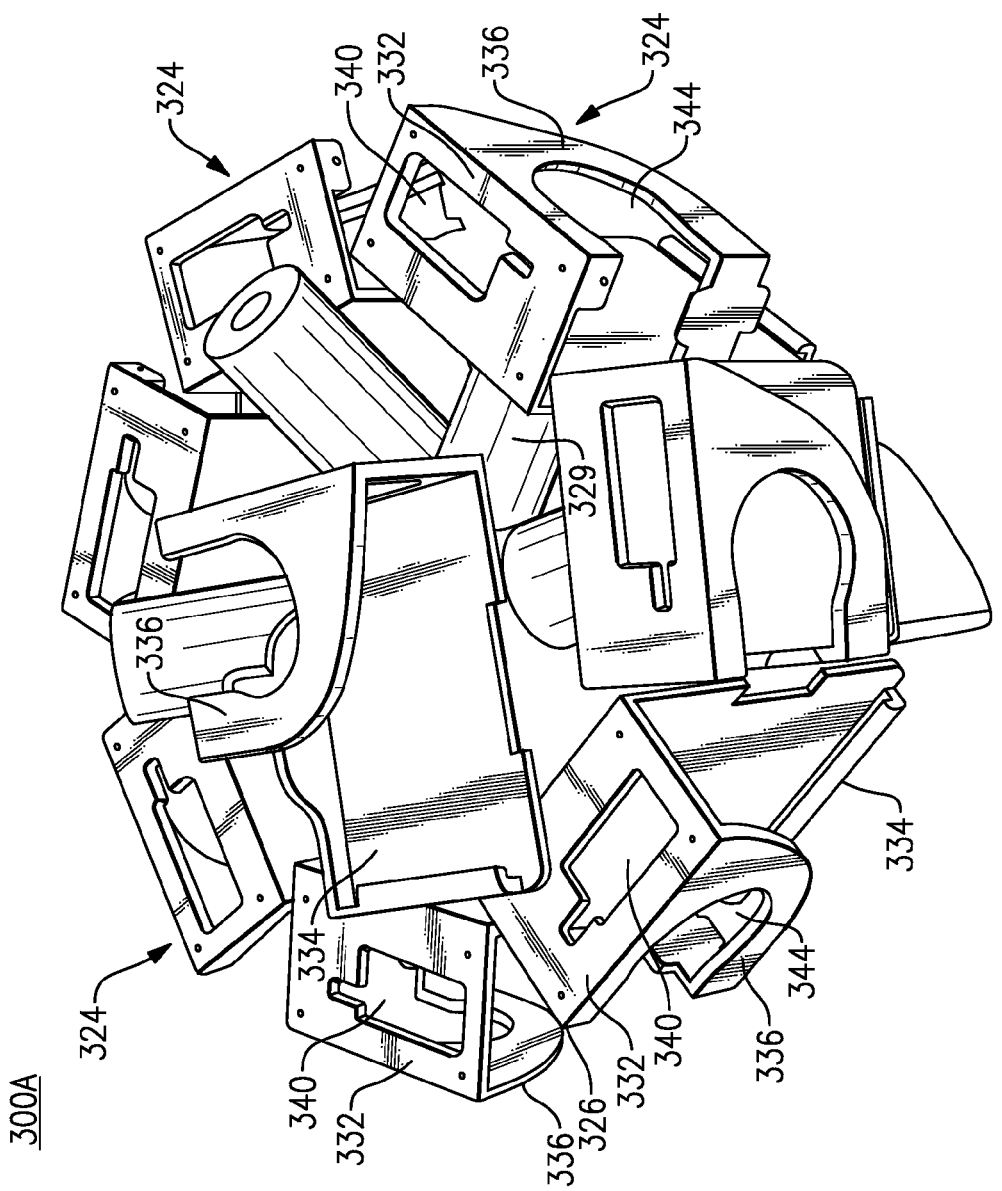
FIG. 3(f) is a top perspective view of another alternative camera holding assembly capable of retaining ten (10) cameras.

When attached and according to the embodiment of FIGS. 3(a)-3(d), five (5) of the camera receptacles 324 extend along a common (horizontal) plane in a substantially circular or circumferential manner. As noted, this latter parameter can easily be varied, as shown in FIGS. 3(e) and 3(f). The remaining two camera receptacles 324 are retained at opposing ends of the center axial column 312 wherein each of the defined camera receptacles 324 are maintained transversely to the primary axis of the corresponding radially extending arms 316 and/or the center axial column 312, respectively. The camera receptacles 324 are maintained at an identical radial distance from the center of the holding assembly 300, thereby enabling a composite spherical field of view for a plurality of cameras 380 that are installed releasably into defined enclosures as shown in FIG. 3(e). In this configuration, each of the cameras 380 are defined by a field of view of approximately 170 degrees. The inclusion of all cameras 380, as disclosed, provides an effective field of view which is 360 degrees spherically about the holding assembly 300 and enabling a full 360 degree by 180 degree full spherical image. The alternative embodiments shown in FIGS. 3(*e*) and 3(*f*) provide increased resolution due to the inclusion of additional (9 or 10) cameras. This increase in resolution can be dramatic, depending on the presentation mode of the resulting image output.

Figure 4E:
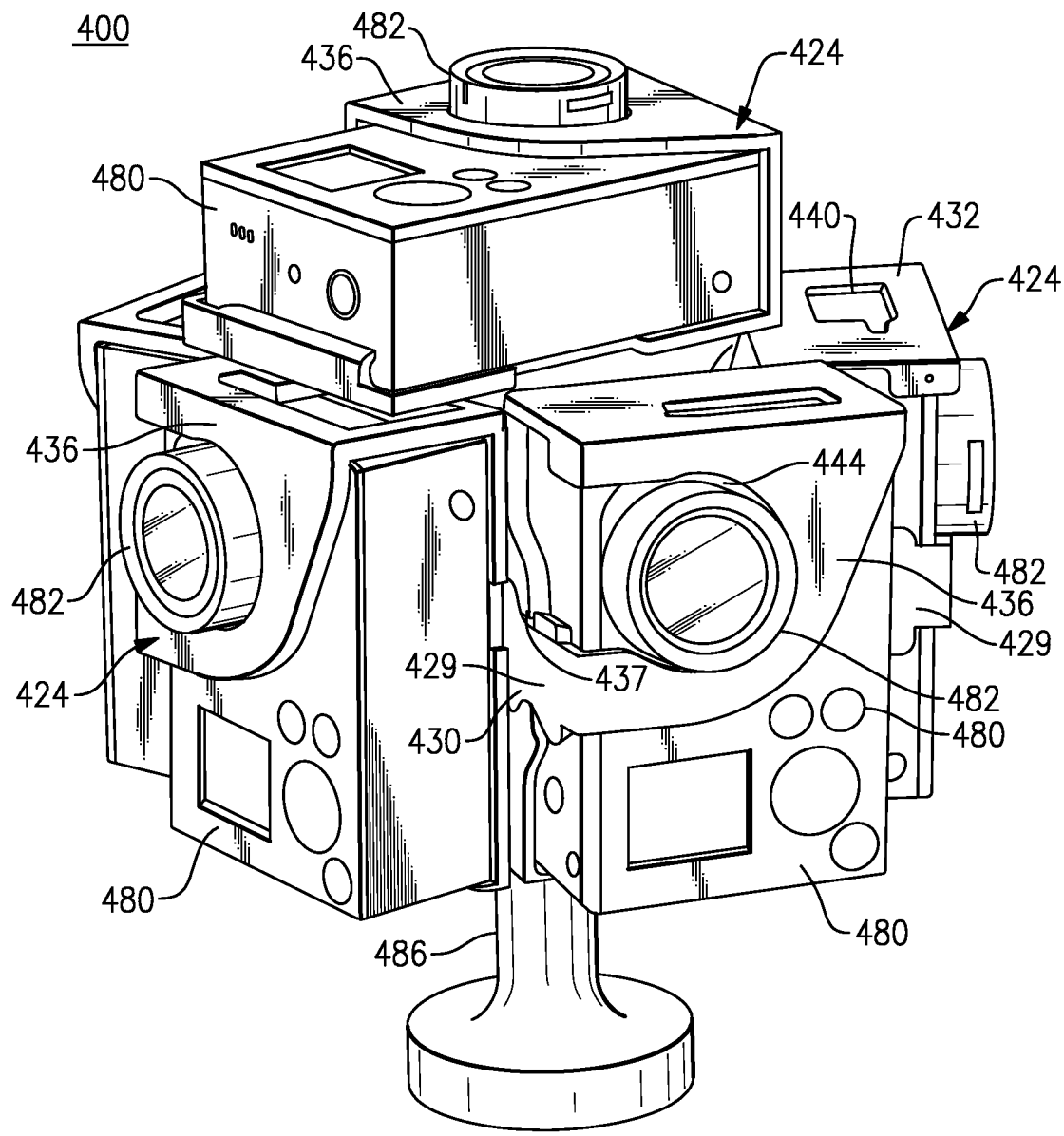
FIG. 4(e) is a side perspective view of the camera holding assembly of FIGS. 4(a)-4(d) having photographic cameras loaded therein.

Yet another variation of a camera holding assembly 400 is shown with reference to FIGS. 4(*a*)-4(*e*) in which a supporting fixture 410 (partially shown in FIG. 4(*d*)) includes a plurality of radially extending arms (not shown), as well as attachment posts 418 for engagement with supports 486, such as shown in FIG. 4(*e*) or other mounting apparatus. According to this version, four (4) camera receptacles 424 are supported by the radially extending arms at distal ends thereof about a common horizontal plane at evenly spaced positions (90 degrees), while two additional camera receptacles 424 are oppositely disposed at the top and bottom of the holding assembly 400, as shown. Each of the camera receptacles 424 according to this embodiment are defined similarly to the camera receptacles 124, FIG. 1(*a*), 224, FIGS. 2(*a*) and 324, FIG. 3(*a*), previously described and enable releasability and secure retention of a photographic camera.

More specifically, a photographic camera 480 such as a GoPro Hero, Hero2, Hero3 or other suitable camera, can be releasably secured within a camera receptacle 424 by releasing a flexible engagement latch 429 and more specifically the tab portion 430 thereof from a slot 437 adjacent an inner side wall 434 and bending the flexible flap-like section, including the outer side wall 436 outwardly. Each photographic camera 480 can then be positioned within the receptacle 424 by placing same in an open end 426 of a defined enclosure of the receptacle 424 and aligning the back side of the camera 480 with the inner side wall 434 between a top wall 432 and a parallel and correspondingly spaced lower edge protrusion 247. Once positioned, the outer side wall 436 can be placed over the top surface of the camera 480 with the lens barrel 482 of the camera 480 extending through a defined opening 444 in the outer side wall 436 and in which the engagement latch 429 can be reattached to the slot 437 in order to secure the receptacle 424.

Referring to FIGS. 5(*a*)-5(*g*), another embodiment of an exemplary holding assembly 500 comprises a plurality of camera receptacles 524 that extend outwardly from a center supporting member 510, shown more specifically in FIGS. 5(*b*) and 5(*g*). The supporting member 510 can include a plurality of arm portions 514, each arm portion having a distal end that either receives or is integrated with a camera receptacle 524. According to this embodiment, four (4) arm portions 514 project outwardly from a common horizontal plane while two (2) other arm portions 514 extend outwardly by the same distance above and below the defined plane, respectively, at opposed ends of the center supporting member 510. A proximal end of each extending arm portion 514 can be secured to projecting portions 516 of a camera receptacle 524 using an interference fit and/or fasteners (not shown). Each camera receptacle 524, according to this embodiment, is an open-ended rectangular structure that is transversely attached relative to the axis of the extending arm 516 to which the camera receptacle 524 is attached using an interference fit. Alternatively, the camera receptacles 524 can also be integral to a corresponding extending arm 516 or attached using other means. Each camera receptacle 524 according to this version is sized to accommodate a photographic camera 580 within a defined retaining cavity 532 using an interference fit, the camera 580 having a shape that substantially corresponds to that of the retaining cavity 532. The supporting member 510 further includes a plurality of attachment posts 519, to enable attachment of the holding assembly 500 to an object of interest, such as tripod or connecting rod 586, FIGS. 5(*g*) and 5(*h*).

According to this specific embodiment and as noted, a total of six (6) camera receptacles 524 are provided in which four (4) of the camera receptacles 524 are disposed along a common (horizontal) plane and the remaining two (2) camera receptacles 524 are oppositely disposed at the top and bottom of the center supporting member 510. As discussed previously, the number of receptacles can be suitably varied provided a 360 degree plane is established by the retained cameras. The camera receptacles 524 and the center supporting member 510 can each be made from a durable and flexible material, such as nylon or a thermoplastic polymer which can be molded or otherwise formed.

According to this specific embodiment, the retaining cavity 532 is rectangularly shaped to substantially correspond with the shape of a corresponding photographic camera 580. The retaining cavity 532 is further defined with a planar bottom surface (not shown in this view), as well as a set of four peripheral or lateral walls defining an enclosure. Each of the lateral walls includes a height dimension that is considerably smaller than the height dimension of the photographic camera 580 with the exception of one of the walls 550 that includes an upper lip portion 554 that is sized to engage the top surface of the camera 580 when placed into the retaining cavity 532.

Respective top and multiple side views according to FIGS. 5(*c*), 5(*d*) and 5(*e*) depict the relative positioning of photographic cameras 580 on the holding assembly 500 at the ends of arm portions 514 of a supporting member 510 for purposes of releasable retention, as well as capturing images that can be combined to create a composite 360 degree image. As should be noted, the cameras 580 are retained such that the lens barrels 582 of each camera 580 in the common plane are commonly aligned with one another and all of the retained cameras 580 are disposed outwardly by the same radial distance from the supporting member 510 in which the cameras are configured, when activated, to produce a 360 degree by 180 degree full spherical image.

Yet another version of a holding assembly is shown in FIGS. 6(*a*)-6(*f*). Referring to FIG. 6(*a*), the holding fixture 600 is defined by a supporting member 610. The supporting member 610 shown in FIG. 6(*a*) illustrates one version with a similar plastic molded version, similarly labeled, being depicted in FIG. 6(*b*). Each supporting member 610 includes projecting arm portions 616 having distal ends 617 that further include transverse mounting holes 618 that extend through a spaced pair of engagement end portions 619. A spaced set of attachment posts 613 are further provided that extend from the supporting member 610 for selective attachment to a mounting apparatus, such as connecting rod 686.

As shown in FIG. 6(*c*)-6(*e*), each of the engagement end portions 619 are configured to receive a corresponding receptacle 624 that includes a corresponding spaced set of engagement end portions 628, the latter also having a set of transverse mounting holes wherein the engagement end portions 619, 628 are engaged and secured using a threaded fastener that is inserted through the aligned transverse mounting holes 618. The receptacles 624 according to this version enable securement of fluidically sealed cases 660 that retain a photographic camera 680, such as a GoPro Hero model photographic camera wherein the receptacles are configured with engagement features that enable attachment to the rear side of a sealed case, such as those manufactured by GoPro. The cases or housings 660 are made from a plastic transparent material that is fluidically sealed.

Figure 6D:
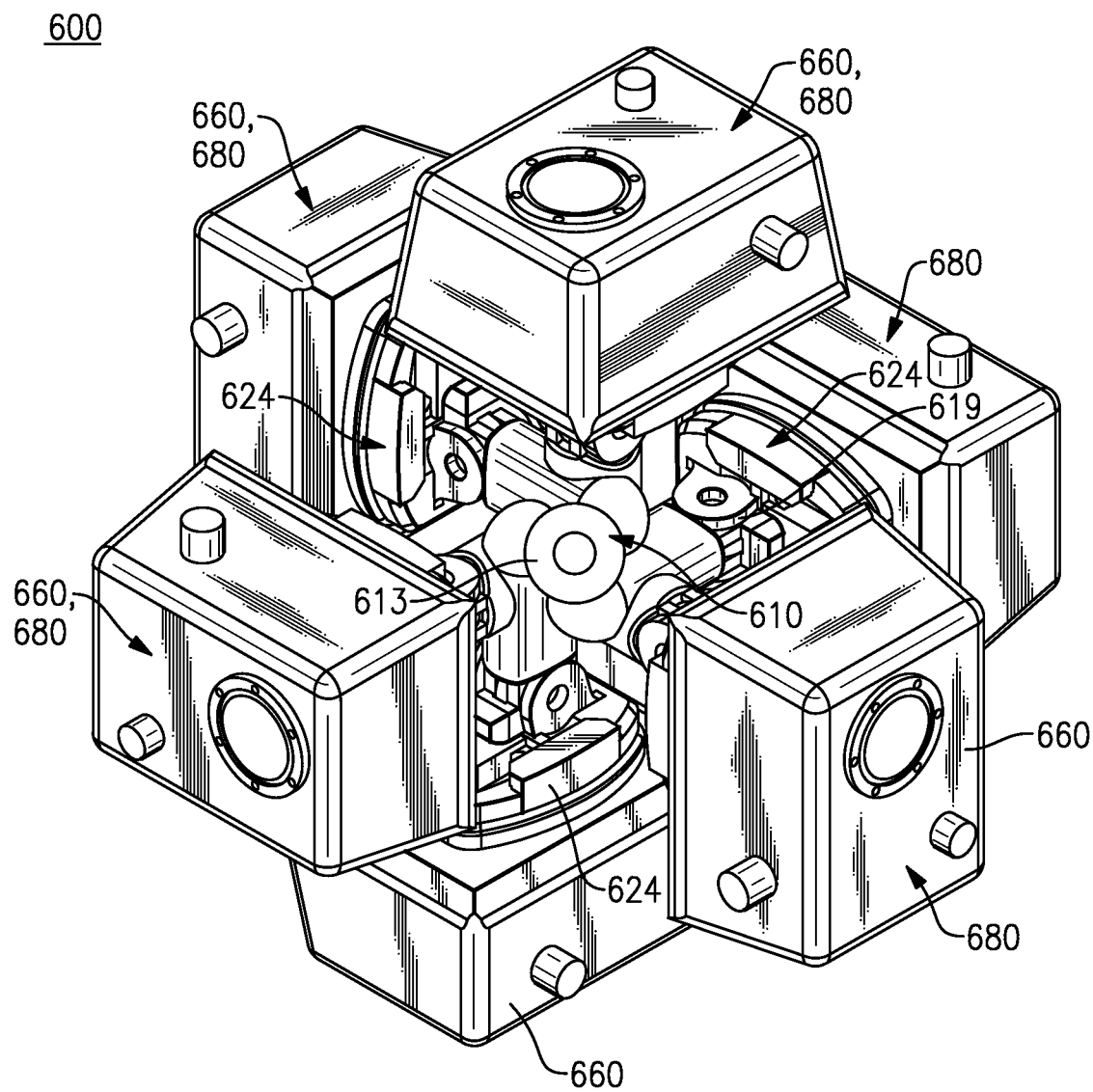
FIG. 6(d) is an assembled perspective view of camera holding assembly.
Figure 6E:
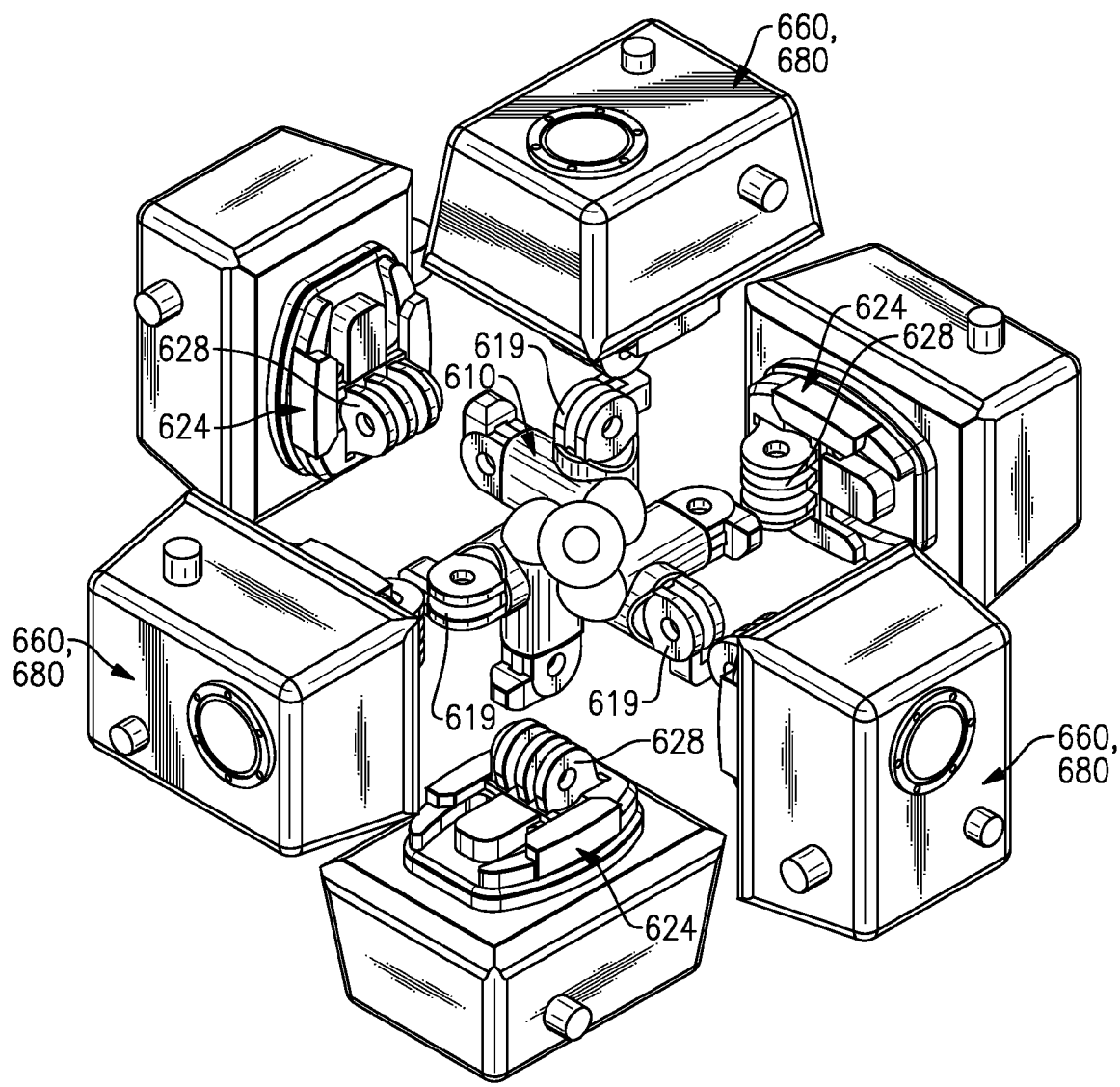
FIG. 6(e) is a partially exploded view of the camera holding assembly of FIG. 6(d)
Figure 6F:
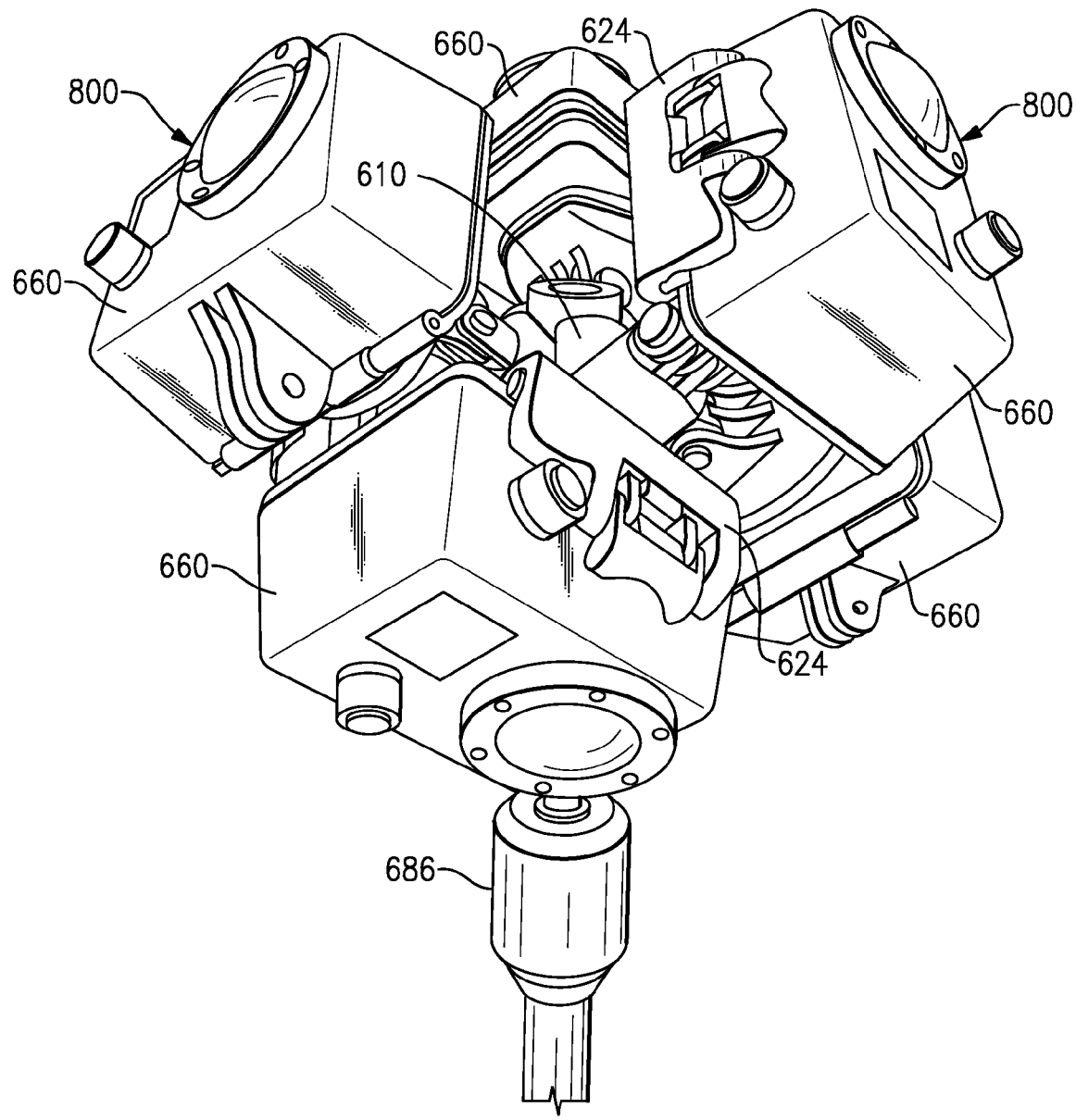
FIG. 6(f) is another assembled view of the camera holding assembly of FIGS. 6(d) and 6(e)

FIGS. 6(d)-6(f) further illustrate the connectivity of the photographic cameras to the supporting member 610 and in which six (6) cameras are supported according to the embodiments shown by engagement of the sealed cases 660 containing the cameras 680 with the receptacles 624 and in which the cases 660 are releasably attached. As shown herein, four (4) of the photographic cameras 680 are disposed along a common horizontal plane, while individual cameras 680 are further supported above and below the common plane, respectively, thereby defining a spherical field of view of 360 degrees using this holder assembly 600. FIG. 6(f) illustrates an underwater version that includes an adaptive element attached to each of the sealed cases 660, which is discussed in greater detail in a later portion of this disclosure.

Figure 6G:
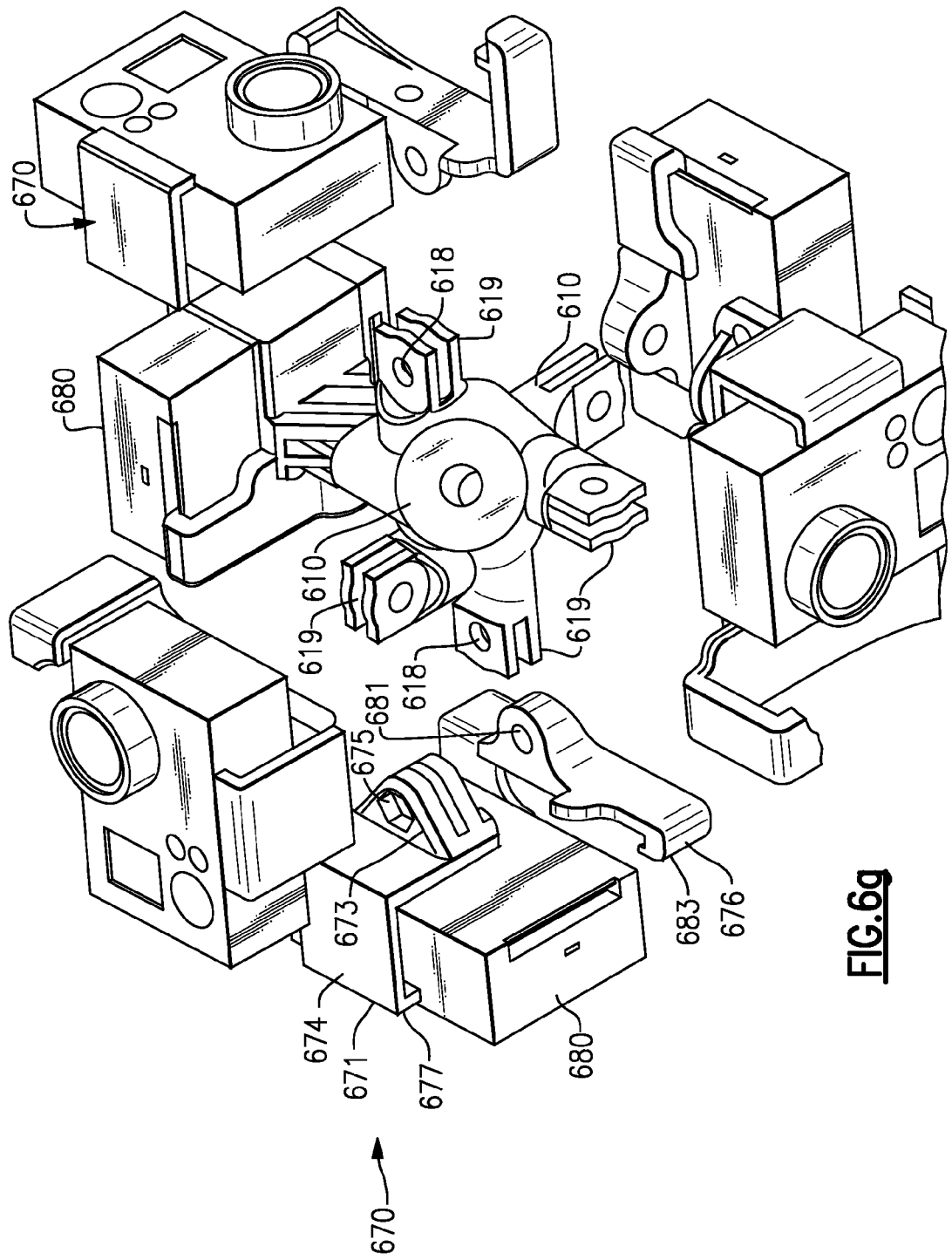
FIG. 6(g) is an alternative exploded assembly view of a camera holding assembly.

An alternative set of cameras are shown as attached directly without protective cases or housings according to FIG. 6(g). In this version, the supporting member 610 and the extending engagement end portions 619 are coupled to a receptacle 670 having a first part 671 that includes a corresponding set of spaced engagement end portions 673 configured to mesh with the spaced end portions 619 of each projecting end portion 619 when aligned and having a mounting hole 675. The end portions 673 depend downwardly from an upper surface 674 at one end that further includes a downwardly depending edge 677 at an opposite end of the upper surface 674. The upper surface 674 is provided with a width dimension that is sized to engage the corresponding width dimension of a supported camera 680 between the downwardly depending portions 673 and 677. A second part 676 of the receptacle 670 is defined by a projecting portion 679 having a mounting hole 681 and a planar front surface 683 for engaging the rear side of the camera 680. When assembled, the end portion 619 of one of the projecting arms 613 of the supporting member 610 is engaged with the engagement end portions 673 of the first part 671 of the receptacle 670. A threaded fastener (not shown in this view) is then engaged with the coaligned mounting holes 618, 675 of the meshed components, the threaded fastener having a sufficient length to further engage the mounting hole 681 of the second part 676 and secure the entire receptacle 670 to the supporting member 610. A camera 680 is then engaged releasably by way of an interference fit between the downwardly depending portions of the upper surface 674 of the first part 671 of the camera receptacle 670 and against the front planar surface of the second part 676 of the receptacle 670.

Figure 7A:
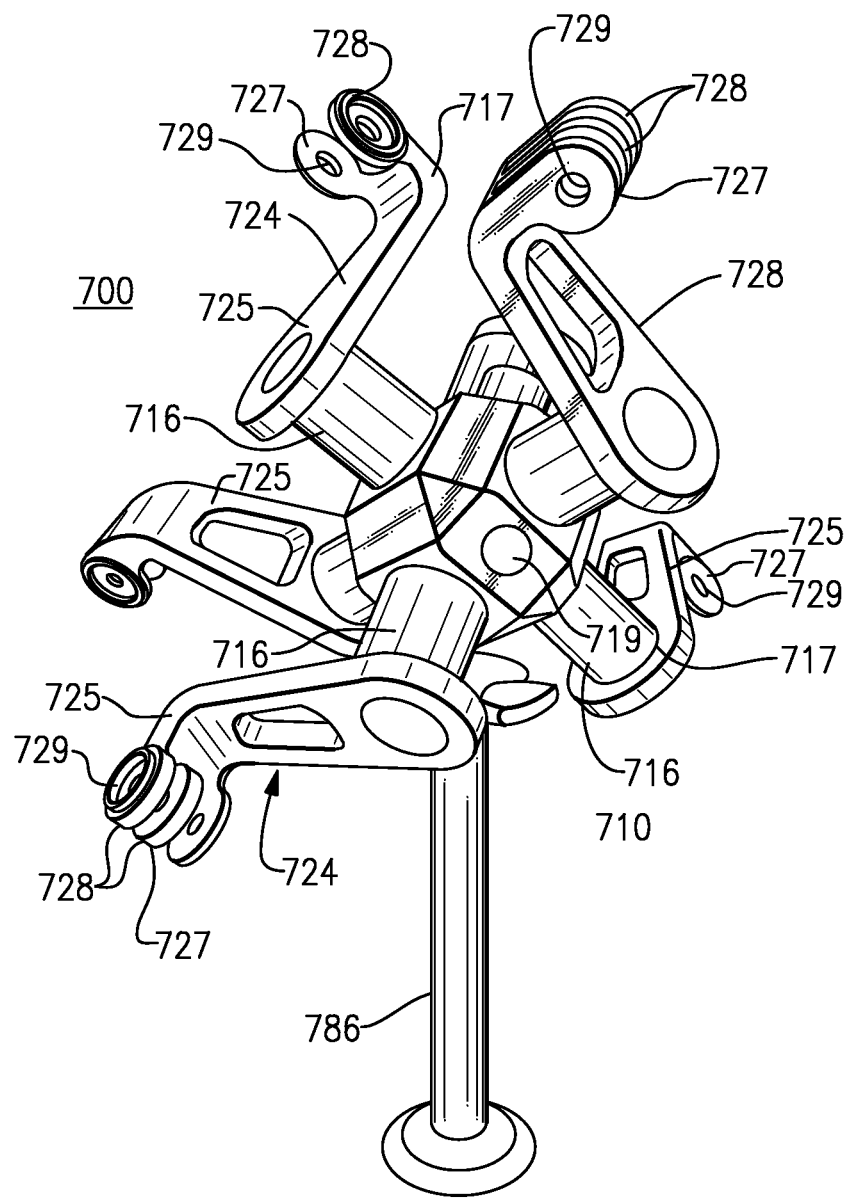
FIG. 7(a) is a perspective view of a portion of a camera holding assembly in accordance with another exemplary embodiment.
Figure 7B:
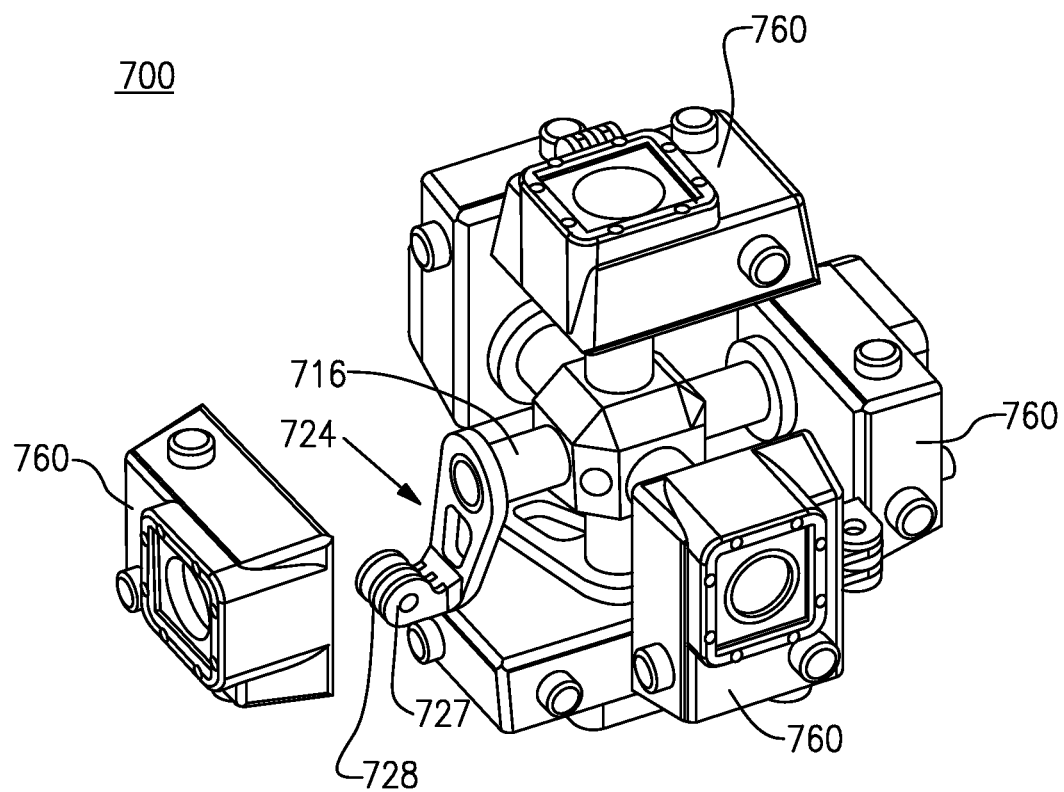
FIG. 7(b) is a partially assembled isometric view of the camera holding assembly of FIG. 7(a) with cameras attached thereto, one camera being shown as unassembled.

Yet another version of a holding fixture in accordance with the present invention is herein described with regard to FIGS. 7(a)-7(g). FIG. 7(a) illustrates the holding assembly 700 that is defined by a center supporting member 710 having a plurality of projecting end portions 716. The extending or distal ends 717 of the projecting end portions 716 include receptacles 724. In addition, a plurality of spaced openings 719 are further provided at predetermined peripheral portions of the center supporting member 710 that are sized for receiving a connecting rod 786 (partially shown) or other mounting apparatus. In the version shown, a total of six (6) projecting end portions 716 are provided, four (4) of which are provided on a common (horizontal) plane and wherein the remaining two (2) projecting end portions 716 are provided at opposing ends of the center supporting member 710 above and below the common plane.

The receptacles 724 according to this embodiment are defined by an arm 725 that extends transversely relative to the axis of the projecting arm portion 716. The arm 725 is cantilevered from the projecting end portion 716 and includes an outwardly projecting engagement end portion 727 having a set of parallel spaced plates 728 with an aligned mounting hole 729 extending therethrough.

Figure 7C:
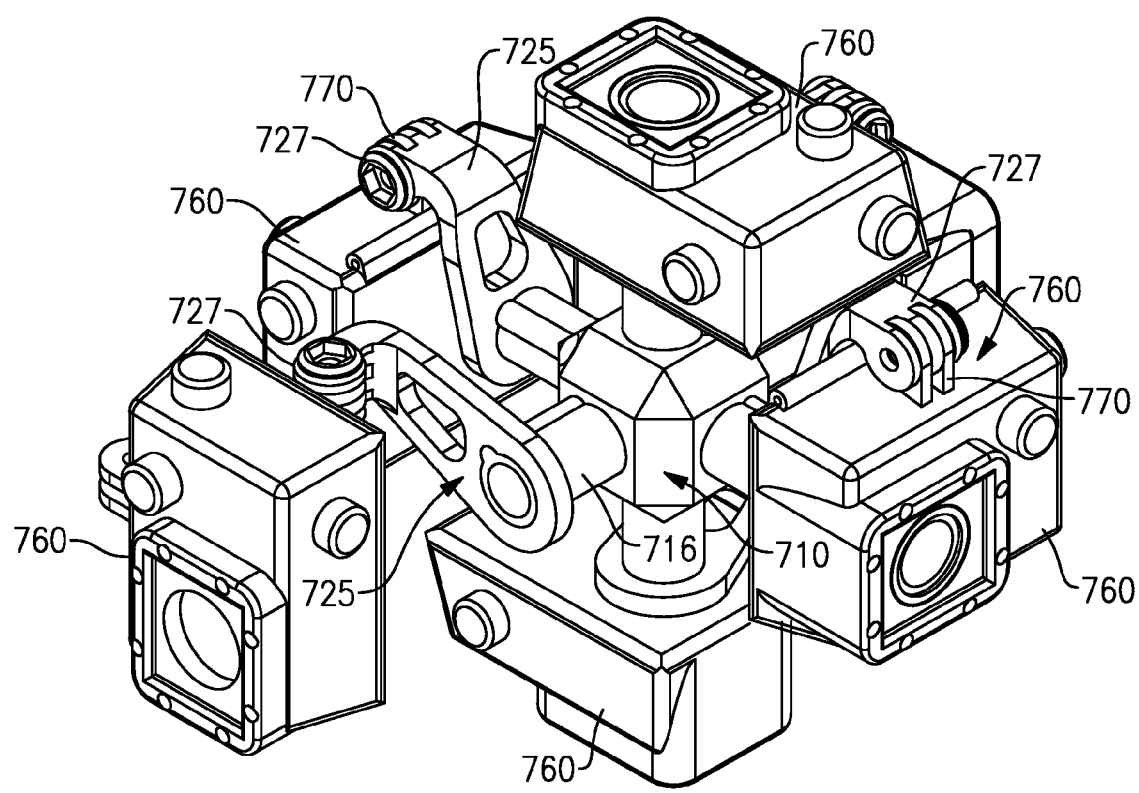
FIG. 7(c) is another partially assembled perspective view of the camera holding assembly of FIGS. 7(a) and 7(b)
Figure 7D:
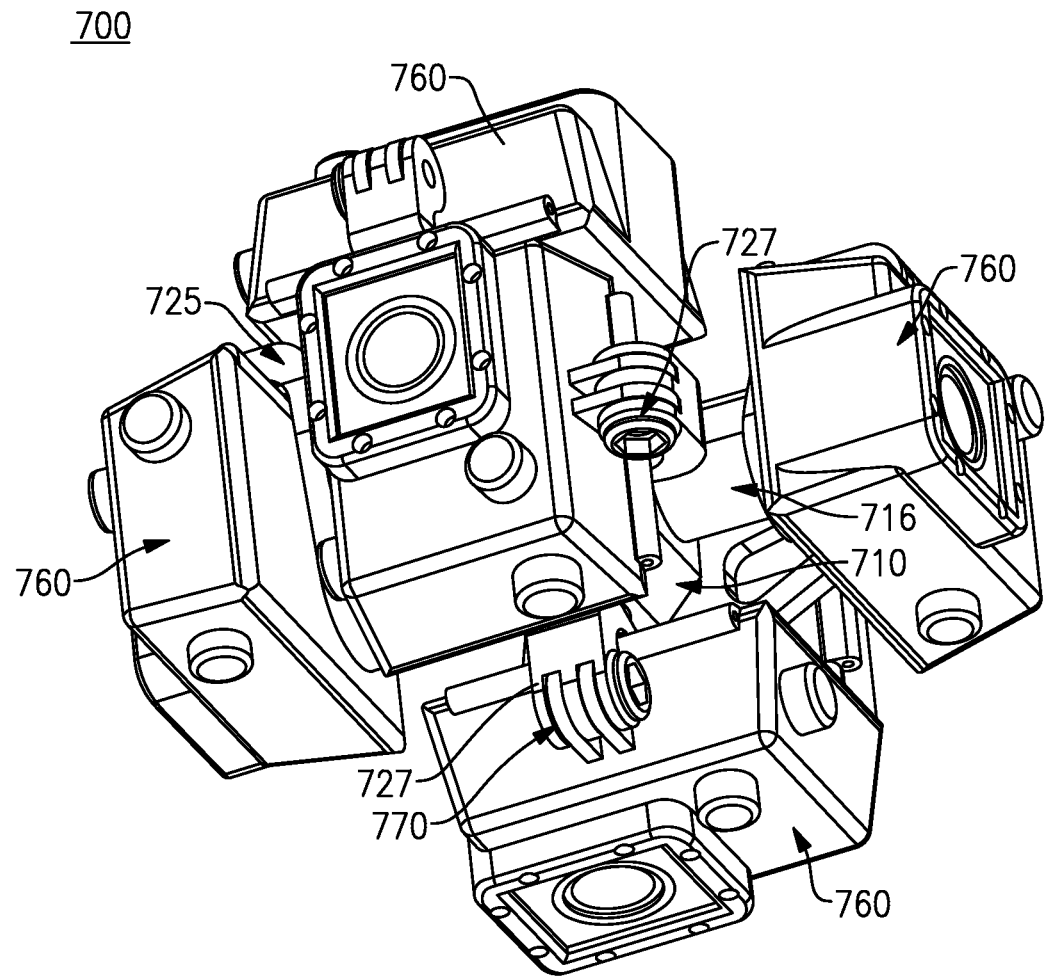
FIG. 7(d) is a rotated perspective view of the camera holding assembly of FIGS. 7(a)-7(c)
Figure 7E:
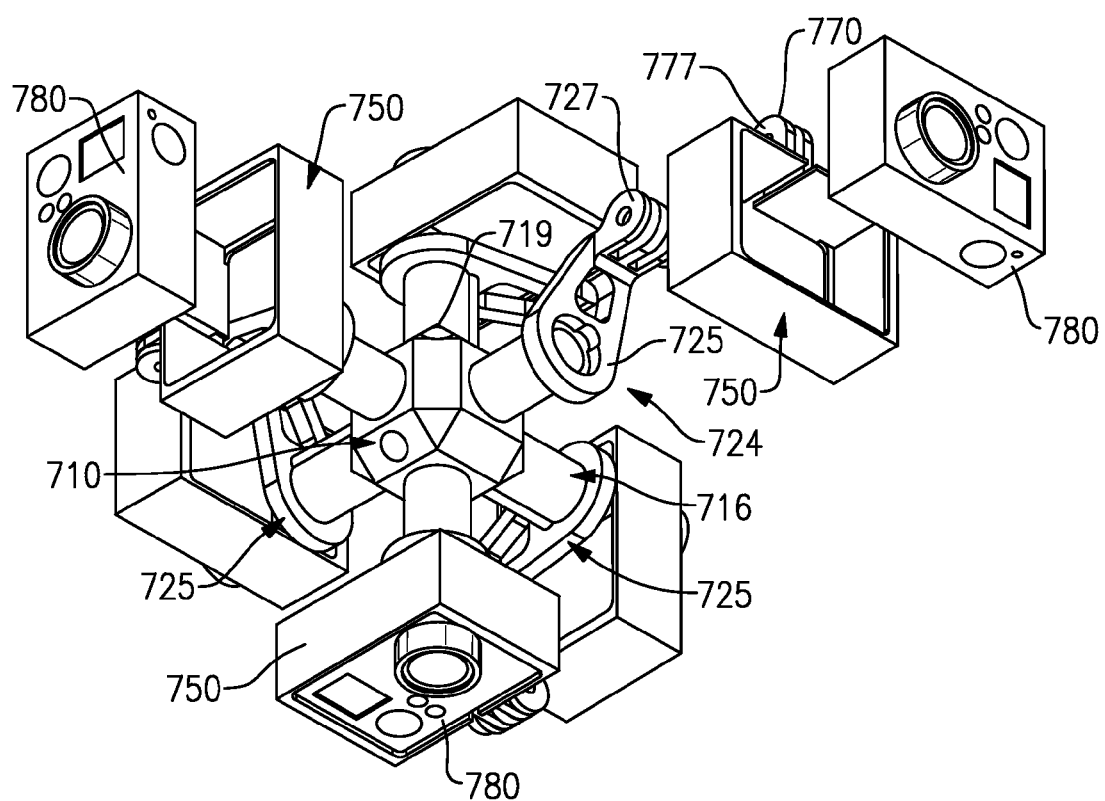
FIG. 7(e) is a partially assembled perspective view of the camera holding assembly of FIGS. 7(a)-7(d)
Figure 7F:
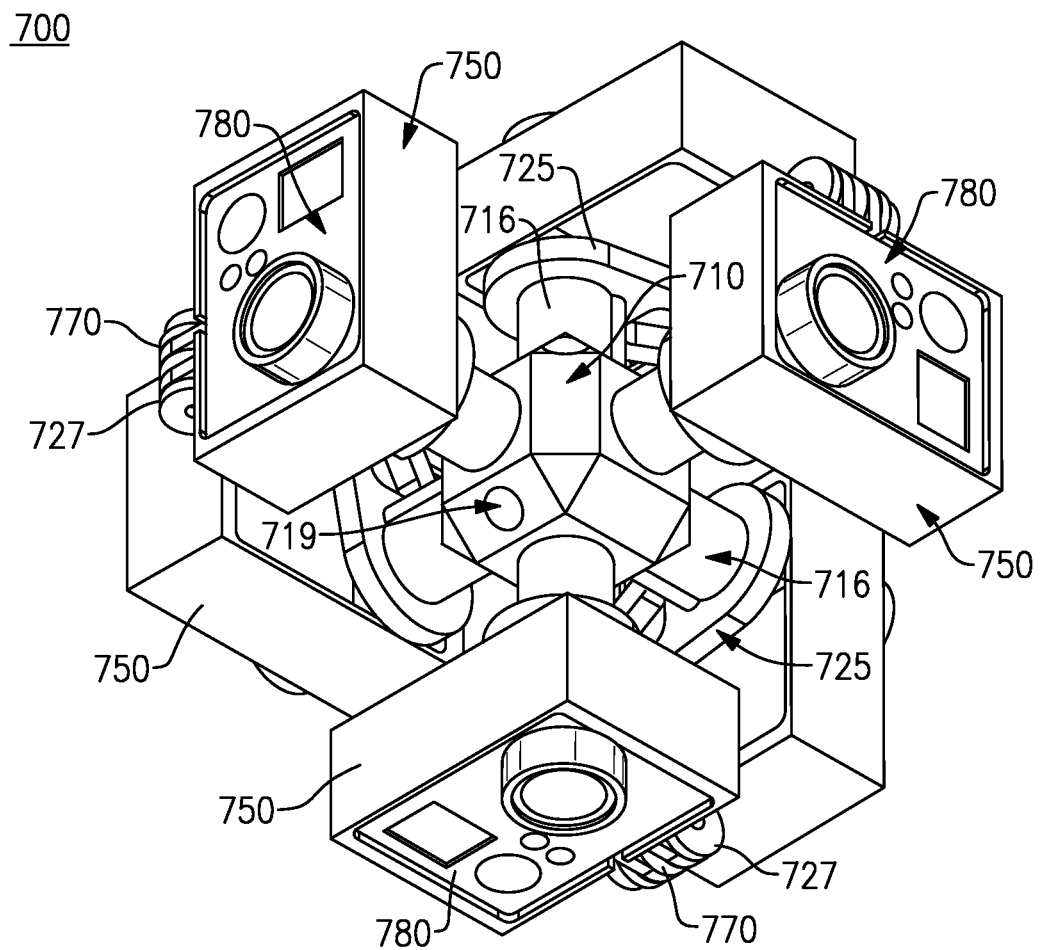
FIG. 7(f) is the assembled camera holding assembly of FIG. 7(e)
Figure 7G:
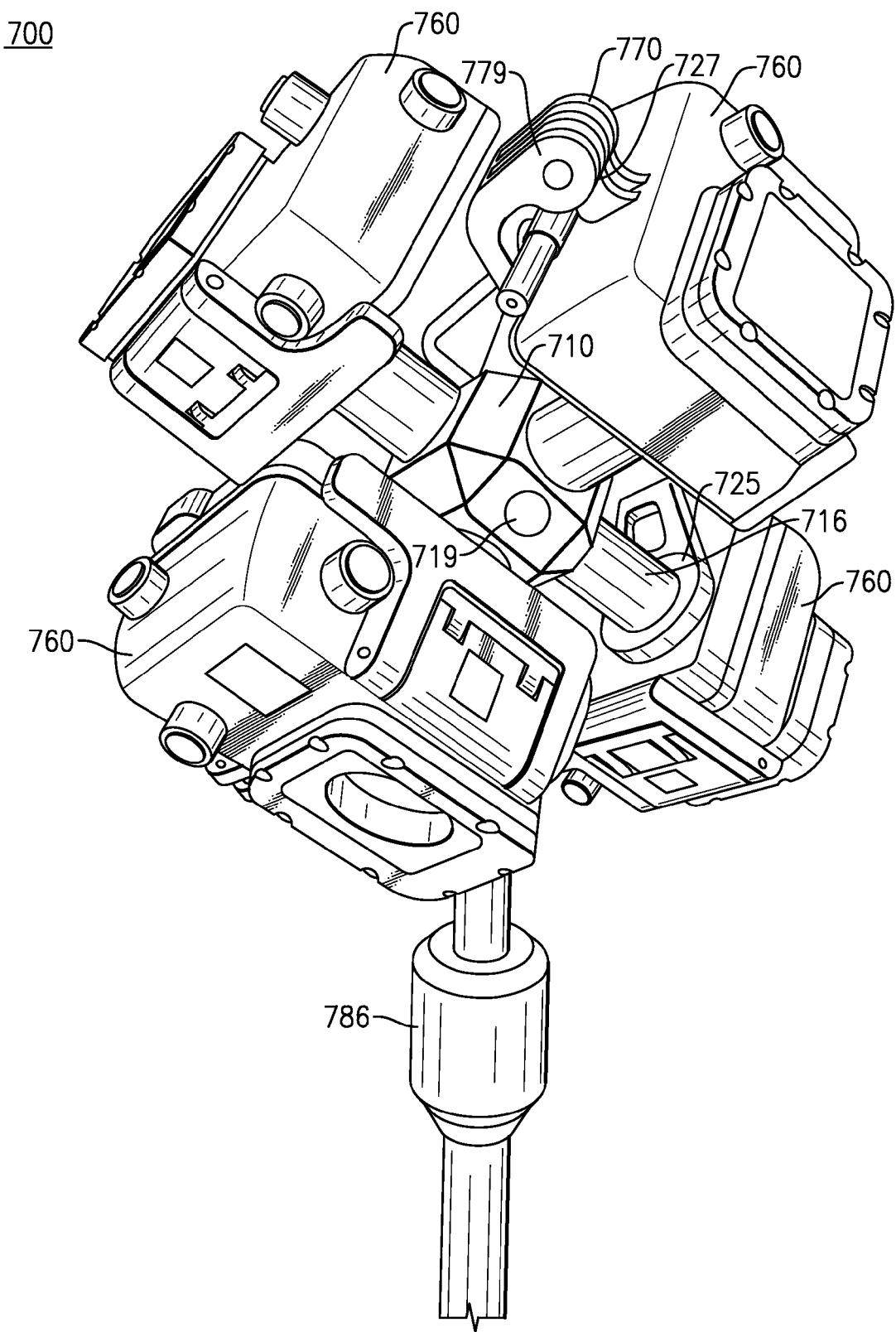
FIG. 7(g) is a perspective view of a camera holding assembly of FIG. 7(a) as used for supporting a plurality of cameras for use in a different environment.

As shown in FIGS. 7(b) through 7(g), the attachment of the receptacles 724 is more clearly shown relative to a set of photographic cameras 780 to be supported and retained in a fixed relationship. As in the prior embodiment and for purposes of this embodiment, the cameras 780 are enclosed in either a sealed case 760, as shown in FIGS. 7(c), 7(d) and 7(g), or alternatively within an open-ended enclosure 750 that forms an additional part of the receptacle 724, the latter version being shown in FIGS. 7(e) and 7(f). In each instance, the engagement end portion 727 of the arm 725 is configured to engage a corresponding end portion 770 of either the sealed case 760 or the enclosure 750, the engagement end portion 770 having a set of parallel spaced plates 774 and an aligned mounting hole 777 that receives the engagement end portion 727 and allows securement through the meshed components through the mounting holes 729, 777 using a threaded fastener 779, FIG. 7(g).

Figure 8A:
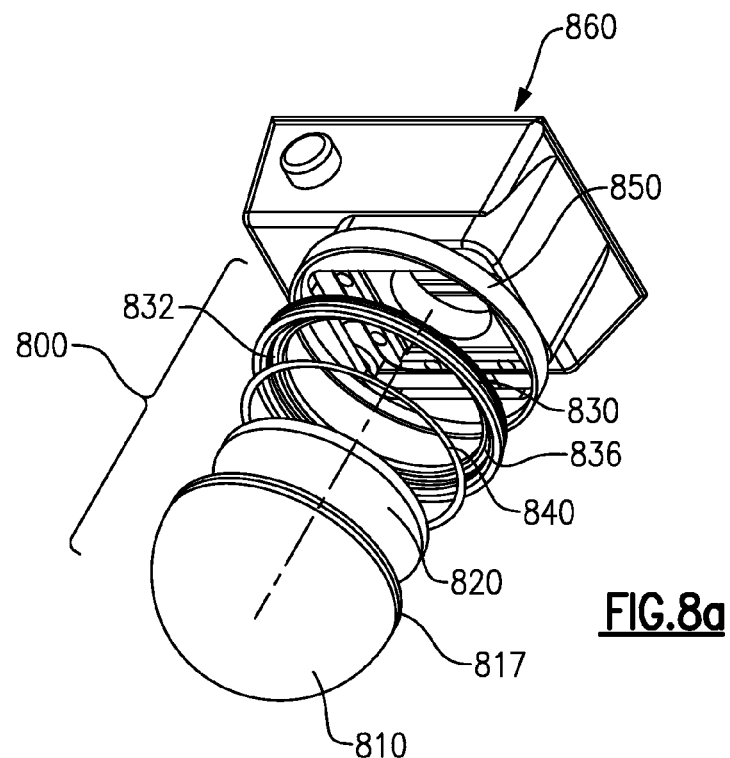
FIGS. 8(a) and 8(b) are exploded views of a dome converter as used with a photographic camera housing enabling a retained photographic camera in the housing to be used in an aquatic environment.
Figure 8B:
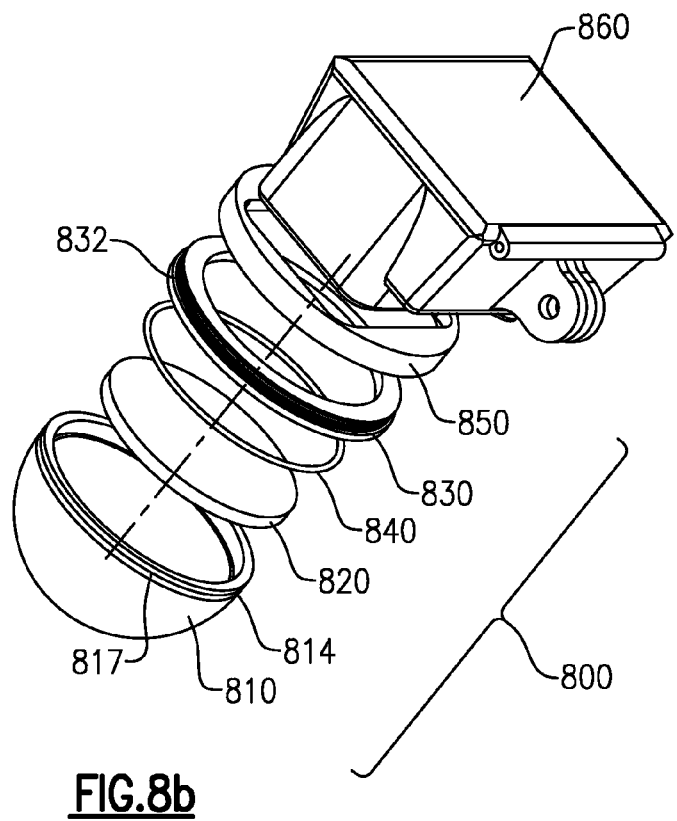

Various adaptive apparatus can be utilized in combination with the herein described holding assemblies, as previously discussed in regard to cameras previously shown in FIGS. 6 and 7 that are provided in a protective (e.g., sealed) case or housing. With reference to FIGS. 8(a) and 8(b), another form of adaptive apparatus permits use of a holding assembly in an aquatic environment. This latter adaptive apparatus is also referred to throughout as a "dome converter", whose primary purpose is to negate the refractive effects upon the field of view of each retained camera when a holding assembly is used underwater.

Figure 9:
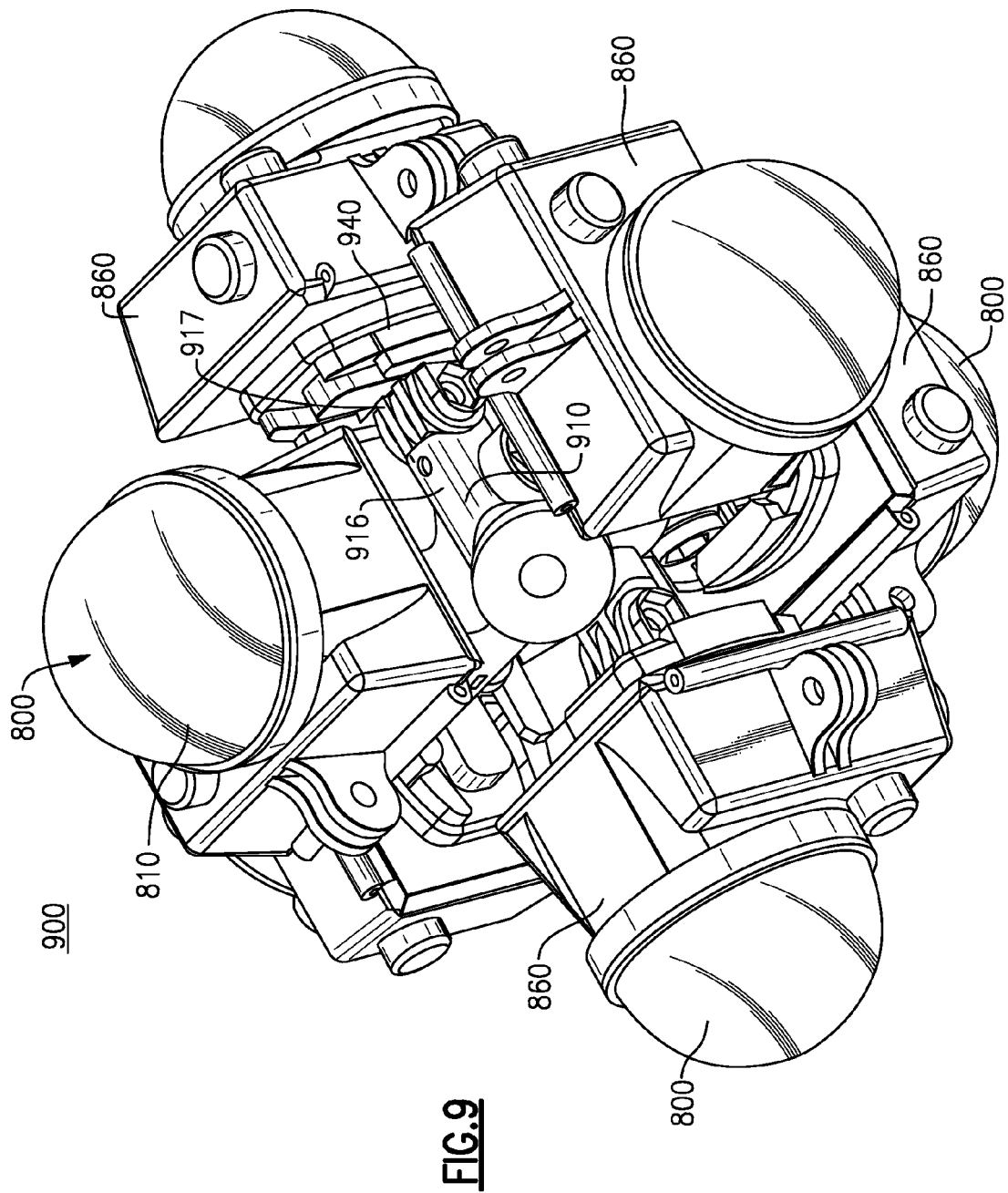
FIG. 9 is a perspective view of a camera holding assembly having a plurality of cameras that are adapted for aquatic use with the dome converters of FIGS. 8 (a) and 8(b)

As is known under Snell's Law, light is refracted when passing through different media, such as water. The effect of water can conceivably reduce the effective field of view by as much as 40 percent. The adaptive apparatus 800 is releasably coupled to a camera that is placed within a waterproof case or housing 860 and attached to a receptacle of a holding assembly 800, as shown in FIG. 9. The adaptive apparatus 800 includes an outer semi-spherical dome member 810 having a curvature of 180 degrees. The dome member 810 is made from a optically transparent material such as modeled optical glass, a polymer such as Pleixglas and the like.

Referring to FIGS. 8(a)-8(c), the adaptive apparatus 800 further includes an interchangeable filter 820, an outer filter housing 830 and a sealing member 840, such as an O-ring. The interchangeable filter 820 may be a clear glass or a suitable color filter. A user may use either clear or color filters depending on certain environments. The outer filter housing supports the dome member 810 and the interchangeable filter 820. The sealing member 840 seals the dome member 810 and the outer filter housing 830 in order to prevent the occurrence of leaks.

In accordance with this embodiment, an attachable housing adapter 850 may also be used to attach the dome converter 800 to the front of a camera housing 860. In certain embodiments, the attachable housing adapter 850 can be attached to the camera housing 860 using threads or by means of a snap-engagement. In embodiments such as shown in FIG. 9, the attachable housing adapter 850 may be configured for attachment to the front side of a sealed case or housing 860 retaining a photographic camera (not shown).

According to the present embodiment, the adaptive apparatus 800 includes a set of external threads 814 at the base of the dome member 810. These threads 814 are configured for threaded engagement with a corresponding set of threads 832 that are provided on an inner peripheral surface 836 provided within the outer filter housing 830. According to this embodiment and referring to FIG. 8(c), the outer filter housing 830 further includes a set of external threads 839 provided on an outer peripheral surface 838 for engaging internal threads 853 of the housing adapter 850.

The interchangeable filter 820 is a disk-like member that is inset within a groove 817 provided adjacent the base of the dome member 810 with the sealing member 840. Advantageously, the interchangeable filter 820 and the sealing member 840 are sized to fit within the groove 817 and assist in preventing external water pressure from collapsing the dome member 810, and thereby further increasing the effect of the sealing member 840.

Once the dome member 810 is threadingly attached to the outer filter housing 830, the outer filter housing 830 can then be threadingly attached according to this embodiment to the attachable housing adapter 850 after which the housing adapter 850 may then be attached to the front of the camera housing 860.

A plurality of adaptive apparatus 800 as herein described can be used in conjunction with a holding assembly, such as those previously described. Referring to FIG. 9, an adaptive apparatus 800 is attached to each of the camera housings 860 supported by a holding assembly 900 similar to those previously described and including a support member 910 that includes a plurality of projecting arm portions 916 having engagement end portions 917 that are further configured to engage corresponding end portions of a corresponding receptacle 940 attached thereto and wherein the receptacle is configured to engage the rear side of a camera housing 860. For purposes of this embodiment, the connectivity between the end portions of the supporting member and the receptacle and the receptacle with the camera housing is similar to that previously described with regard to FIGS. 6(a)-6(f). Each of the dome converters 800 are attached to the outward facing sides of the supported camera housings 860 in which four cameras are disposed along a common (horizontal) plane with cameras being respectively disposed above and below the defined plane, and enabling a 360 degree×180 degree full spherical composite image to be created of a scene of interest. The supporting member 910 further includes multiple attachment posts to permit a myriad of mounting arrangements.

In each of the herein described embodiments, the cameras can be easily removed from the receptacles of the holder assembly and used for other purposes. The connecting rods or other members disposed between the supporting member of the holding assembly and the supported cameras can suitably vary in length to permit the assembly to be used for expansion and/or a plurality of different photographic/video applications.

The invention may also include other mounting points other than just the snap-in receptacles, allowing the cameras to be removable/replaceable/upgradeable, and wherein the connecting rods between the camera and body of the holder assembly can be variable in length. Providing at least one and more preferably at least three (3) mounting points permits an operator to be hidden at different distances in the eventual (final) video due to camera viewing parallax.

Figure 10A:
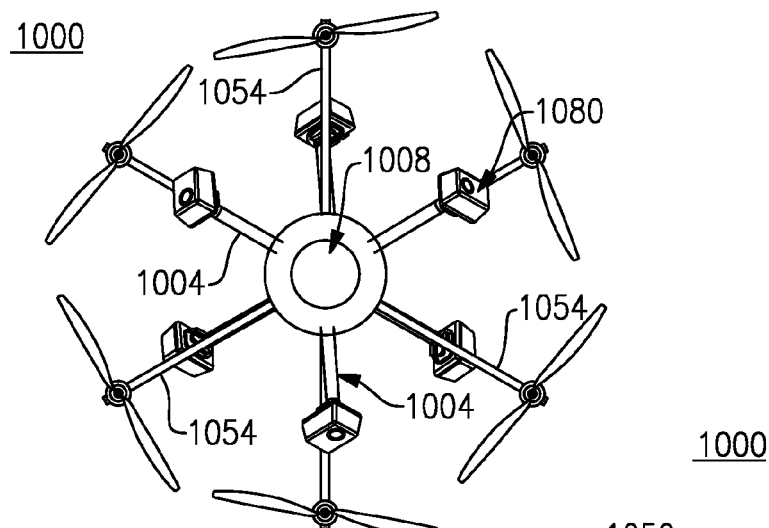
FIGS. 10(a), 10(b) and 10(c) are various views of an apparatus including a camera holding assembly in accordance with another example and more specifically relative to an apparatus that enables use in an aerial environment with a plurality of supported cameras.
Figure 10C:
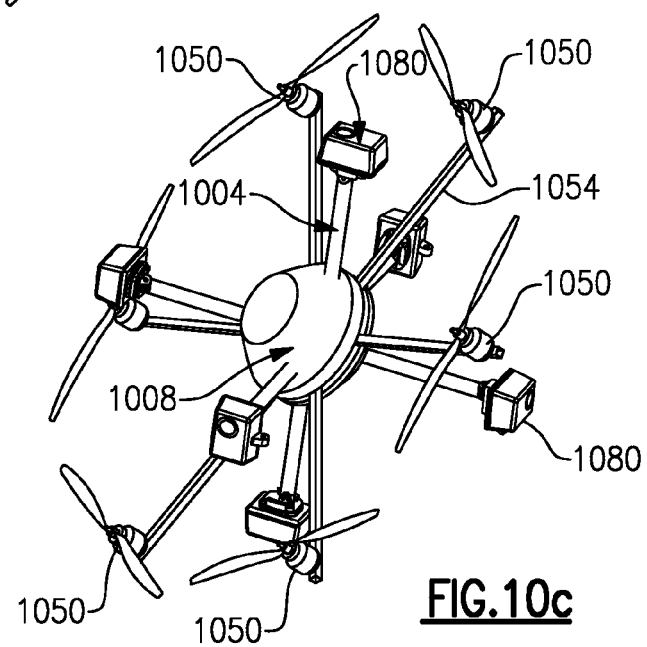
Figure 10B:
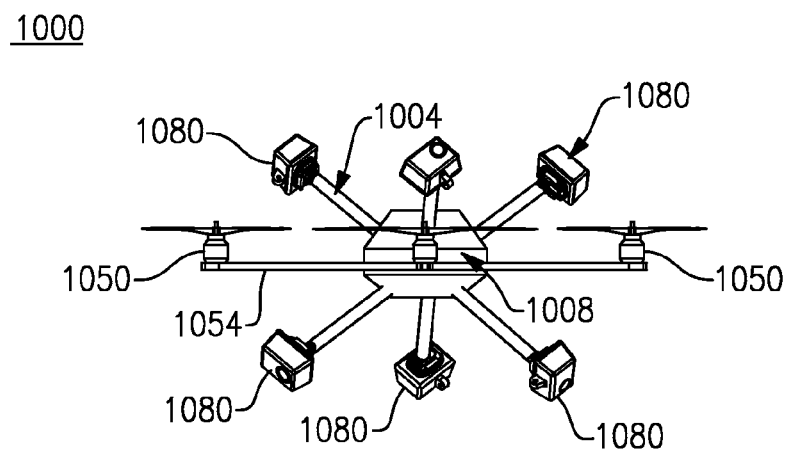
Figure 10D:
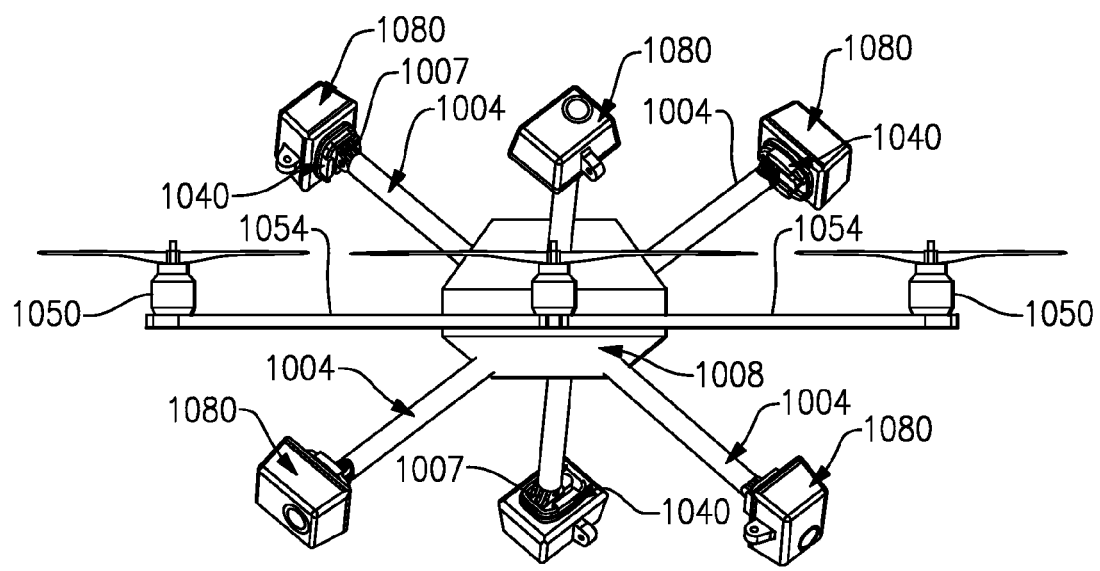
FIG. 10(d) is an enlarged view of the apparatus of FIG. 10(a)-10(c)
Figure 10E:
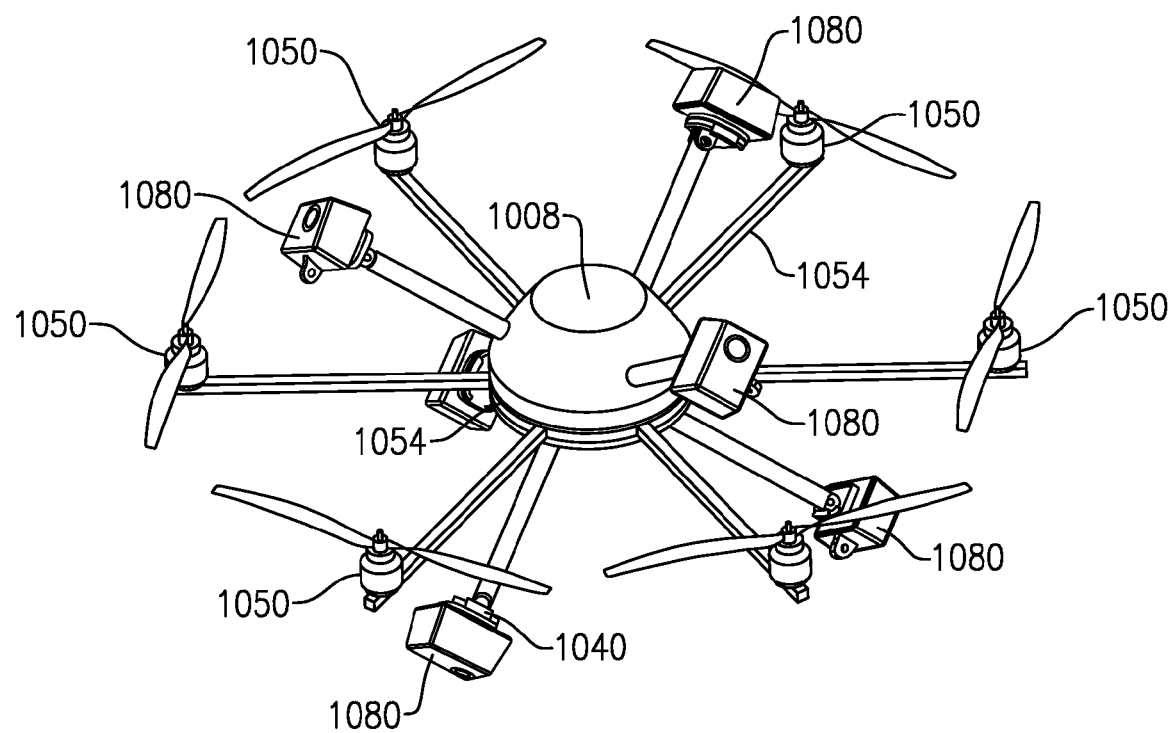
FIG. 10(e) is a perspective view of the apparatus of FIGS. 10(a)-10(d)

Reference is herein made to FIGS. 10(a)-10(d), which relates to a version in which at least one holding assembly can be used in an aerial environment. More specifically, an apparatus 1000 is provided that includes a plurality of arms 1004 extending outwardly from a center housing 1008. According to this version, the distal end of each extending arm 1004 receives a photographic camera housing 1080, such as those configured for retaining a GoPro Hero, Hero2, Hero3 or other suitable camera and as previously discussed herein. According to this specific embodiment, a total of six (6) camera housings 1080 are individually disposed at evenly spaced sixty (60) degree intervals about the center housing 1008. It will be readily understood that additional cameras could be added and that this embodiment is merely exemplary. The holding assembly 1000 in accordance with this embodiment further includes a plurality of rotor assemblies 1050 disposed along a common plane, as shown in FIG. 10(c) that are disposed in a circular pattern about the center housing 1008, each of the rotor assemblies 1050 being individually attached to the ends of connecting supports 1054 commonly extending from the center housing 1008. According to this version, a total of six (6) rotor assemblies 1050 are provided in a circumferential pattern about the center housing 1008.

The photographic cameras 1080 are angularly supported above and below the center housing 1008 and the rotor assemblies 1050 in which three (3) cameras shown herein in protective casings or housings 1080 are disposed at 120 degree intervals to one another above the rotor assemblies 1050 and an additional three (3) cameras, also provided in casings or housings 1080 are disposed below the rotor assemblies 1050. Each of the extending arms 1004 include an engagement end portion 1007 that is configured to engage a receptacle 1040 similar to that shown in FIG. 6(c), in which the receptacle 1040 is configured to engage the rear side of the protective and sealed camera housing 1080 retaining the photographic camera, such as GoPro Hero, Hero2, Hero3 or other suitable camera. In total, the camera housings 1080 of this assembly 1000 combine to define a full spherical 360 degree×180 degree field of view in the above-defined configuration. The herein described assembly 1000 can be used to capture images in an aerial environment wherein the output from each of the cameras disposed in the housings 1080 can be obtained and stitched to the images obtained by each of the remaining supported cameras 1080 to create a composite 360 degree by 180 degree full spherical image. In terms of its operation, the rotor assemblies 1050 and each of the retained cameras can be controlled wirelessly through commands made to the center housing 1008 via cabling (not shown) from the center housing 1008 to the supported cameras or by synching each of the cameras to a single wireless remote control (not shown).

Figure 11A:
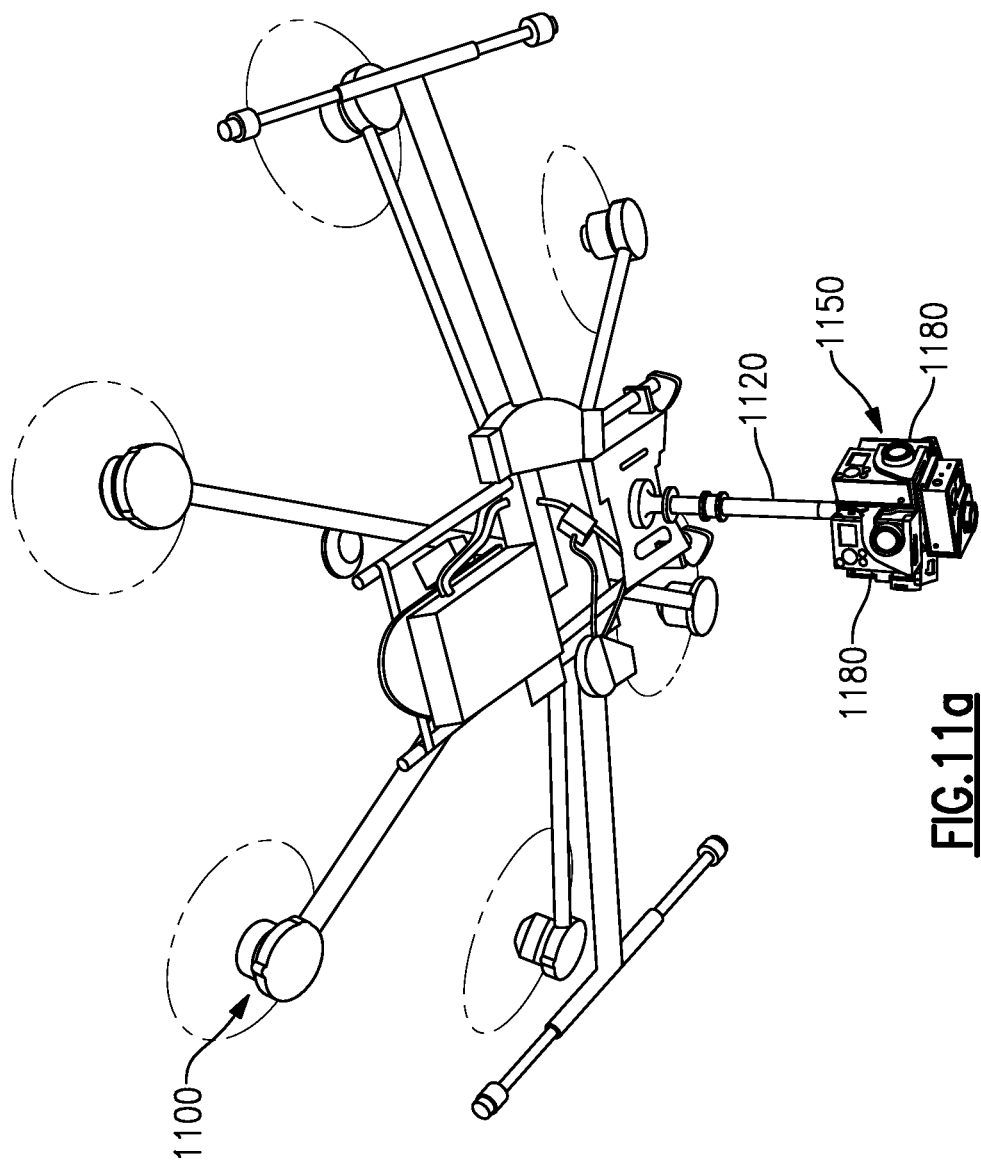
FIG. 11(a) is a bottom perspective view of a holding assembly used in another aerial enabling apparatus.
Figure 11B:
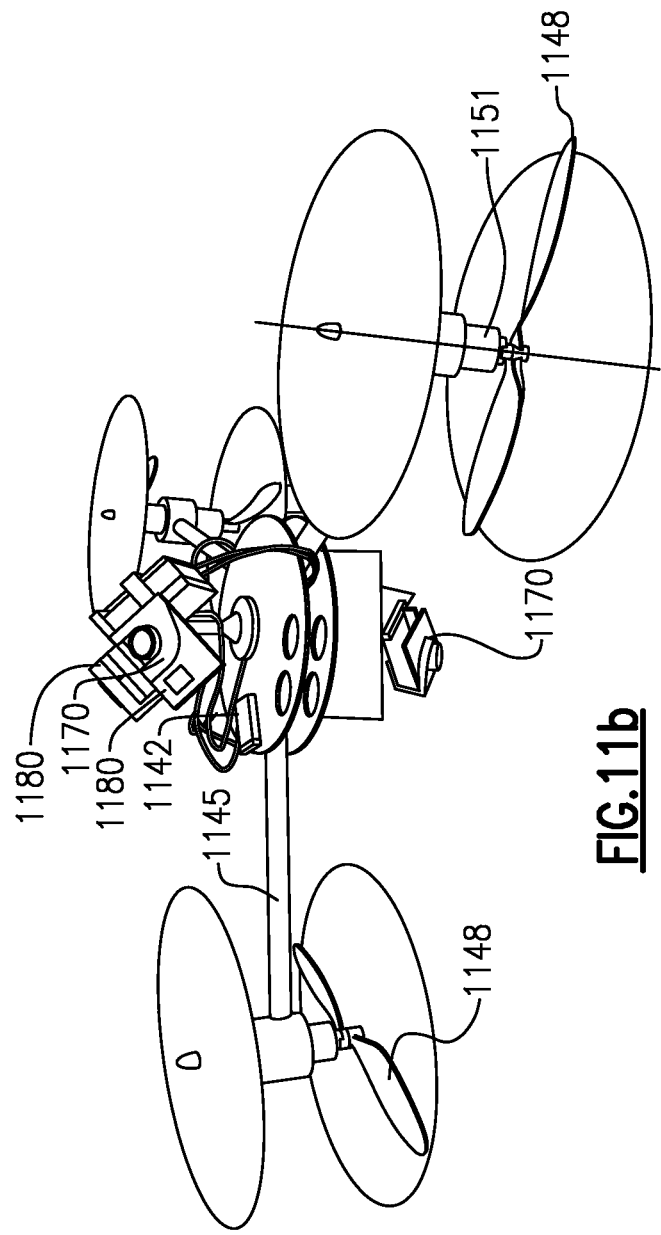

Alternative versions are shown in FIGS. 11(a)-11(c). In the embodiment of FIG. 11(a), a drone-like apparatus 1100 capable of flight includes a depending lower arm 1120 that retains a holding assembly 1150, similar to that depicted in FIGS. 2(a)-2(e), in which a 360 degree field of view can be achieved using a plurality of supported cameras 1180.

In the version shown in FIG. 11(b), a center housing 1142 is connected by arms 1145 to separate rotor assemblies 1148 disposed 120 degrees from one another on a common horizontal plane and attached using supports 1051. Respective camera holding assemblies 1170, similar to those shown in FIGS. 2(a)-2(d) are fixedly attached above and below this plane by connective rods (not shown) in which the cameras are all commonly retained within individually disposed receptacles. The cameras 1180 retained by the holding assemblies 1170 are disposed such that a full 360 degree view is achieved, but in which the rotor assemblies 1148 are positioned in "blind spots" that cannot be seen by the retained cameras 1180.

The version depicted in FIG. 11(c) includes a center housing 1168 that is connected by arms 1164 to corresponding rotor assemblies 1168. According to this specific embodiment, a total of four (4) rotor assemblies 1168 are disposed along a common plane, each equally spaced in 90 degree intervals in a circumferential manner about the center housing 1168. Respective holding assemblies 1170, similar to those previously discussed with reference to FIGS. 2(a)-2(d), are disposed on arms extending directly above and below the center housing 1168 and retain a plurality of cameras 1180.

The overall effect from video taken from the retained cameras 1180 in each of the above exemplary embodiments is that of an apparent levitated aerial scene. Other suitable configurations can further be utilized. The number of rotor assemblies, as supported in any assembly, can easily be varied depending on the application. The placement of the holding assemblies can also be varied depending, for example, on the number of rotor assemblies that are used and their relative distance from the center housing. For instance and as is apparent from the foregoing examples, the number of rotor assemblies can be easily varied.

As noted, the various designs of holding assemblies that can be provided in accordance with the plug and play concepts discussed herein is not limited to the above described examples. That is, a myriad of other variations are possible depending, for example, upon the image resolution that is desired and in which additional cameras can be disposed and supported in a number of ways.

Figure 12:
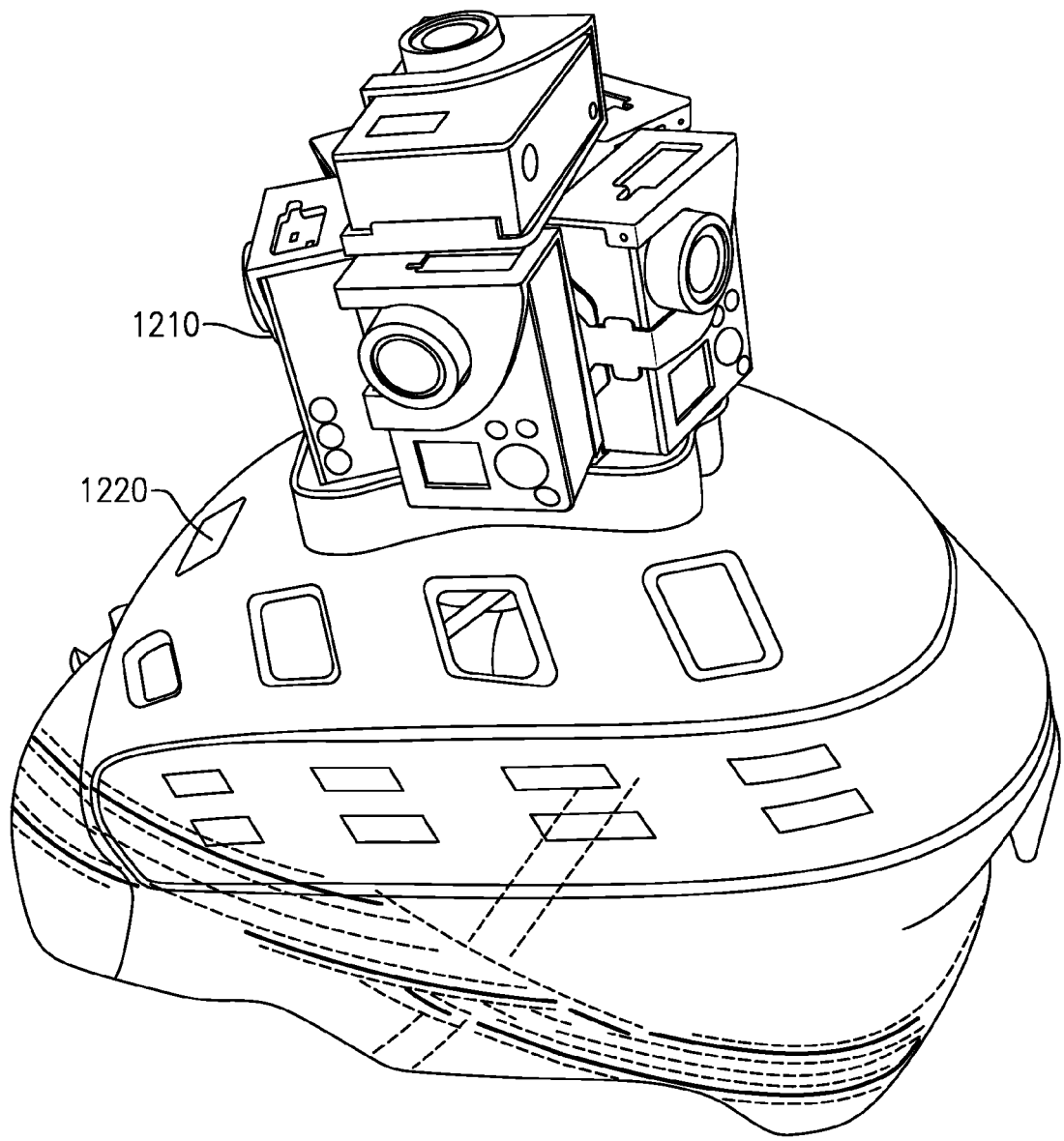
FIG. 12 depicts another use for a camera holding assembly having a plurality of supported photographic cameras as part of a head-worn apparatus.

In addition, the types of applications and mounting arrangement that the holding assemblies is also limitless. For example, a head-worn holding apparatus is depicted in FIG. 12 in which a holding assembly 1210, such as previously shown in FIG. 2(*a*) can be mounted to the top of a cycling helmet 1220. Other variations can easily be contemplated.

Figure 13:
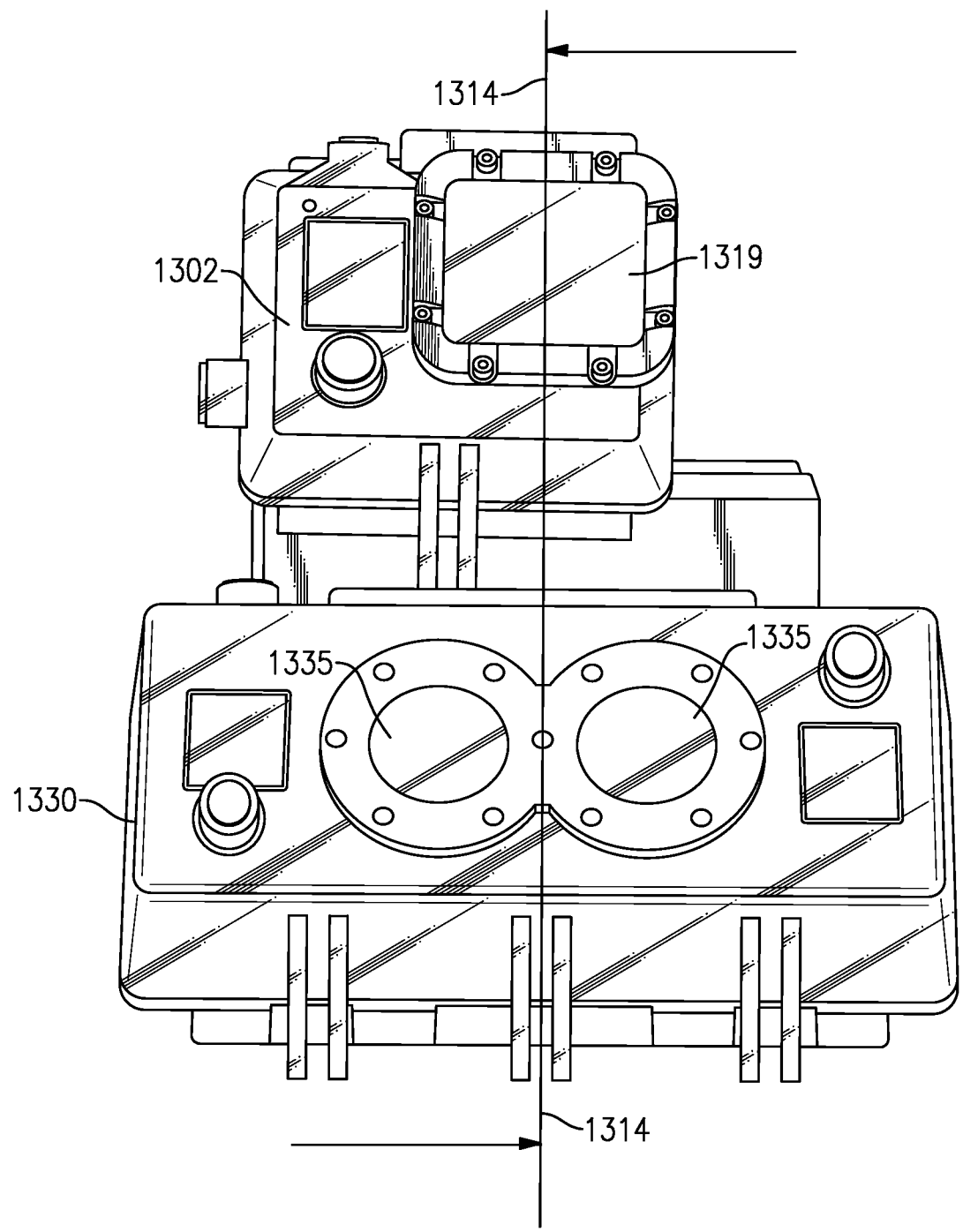
FIG. 13 is a front facing view comparing a single camera housing for use in a holding assembly with a housing configured to retain a pair of cameras in tandem and illustrating a stereoscopic effect of same.
Figure 14:
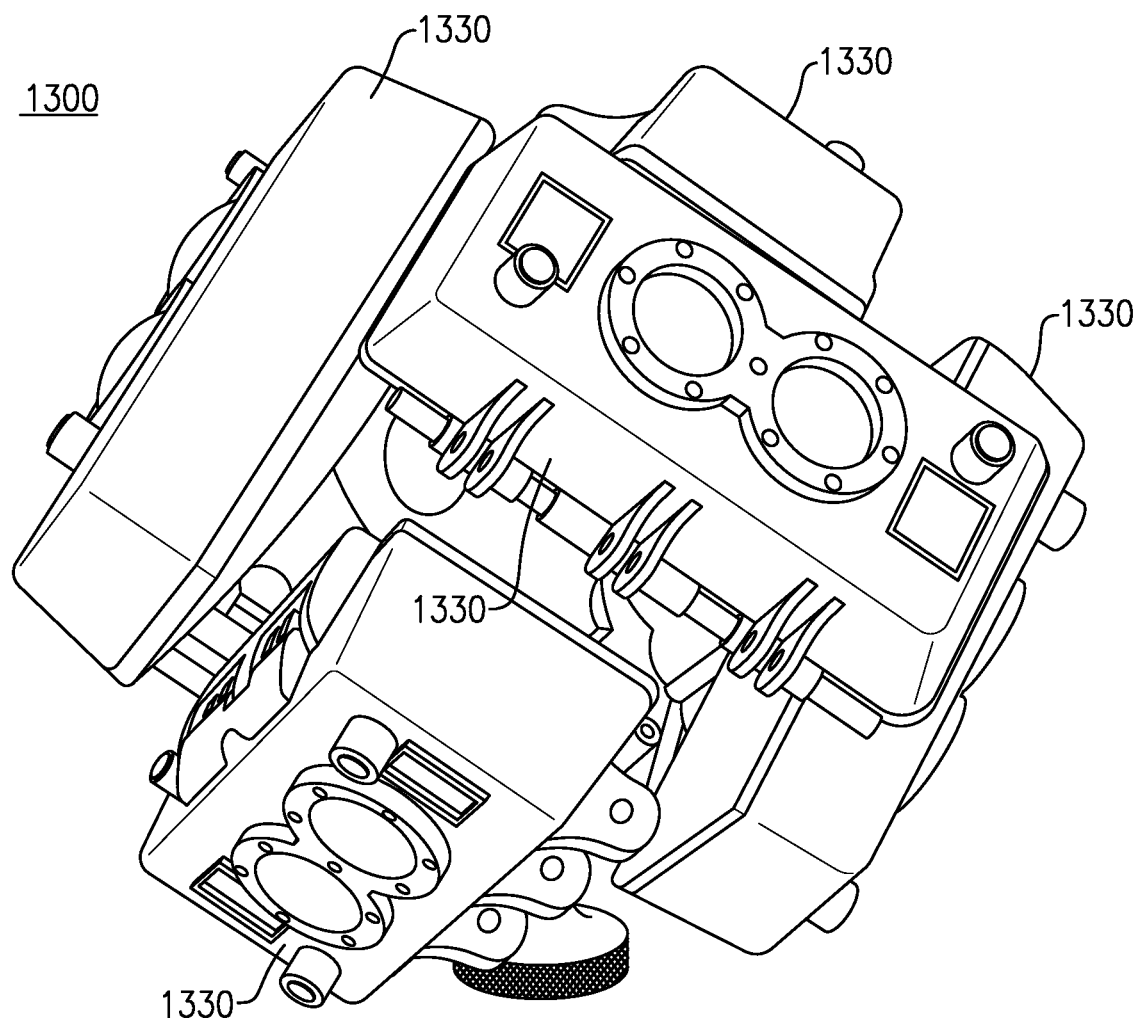
FIG. 14 depicts an exemplary camera holding arrangement that includes a plurality of tandem camera housings of FIG. 13 and enables 360 degree by 180 degree full spherical three dimensional imaging of a scene of interest.

According to other exemplary embodiments and referring to FIGS. 13-14, a stereoscopic imaging effect can be realized using the concepts described herein using a holding assembly, such as shown as 1300, FIG. 14. First and referring to FIG. 13, a comparative view is made between a camera housing 1302 in which the lens barrel as represented by the port 1319 would be aligned at the center line shown as 1314. A separate protective camera housing 1330 shown beneath the housing 1302 is designed such that the center line 1314 extends between a pair of tandem enclosures that are mirrored about the center line 1314 and in which the lens barrels that would be aligned with respective ports 1335 would be in direct proximity with one another about the center line 1314. As a result of this orientation, stereoscopic (left eye/right eye) imaging can result with an enhanced depth of field being produced.

The holding assembly 1300 includes a support member (not shown) having a plurality of radially extending arms, each of the arms having end engagement portions that are configured to fixedly retain protective camera housings 1330, as described above, in a preferred orientation. The configuration shown includes a total of 12 cameras in 6 housings, supported by the radially extending arms of the support member. According to this version, (4) four camera housings 1330 are disposed on a common (e.g., horizontal) plane with single and opposing tandem camera housings 1330 being disposed above and below the defined plane. As a result, a total of twelve (12) cameras are supported according to this embodiment, producing a combined set of images having a depth of field that creates 3-dimensional 360 degree by 180 degree full spherical images. It should be noted that the number of tandem camera housings or cameras provided in tandem can be varied.

Figure 15:
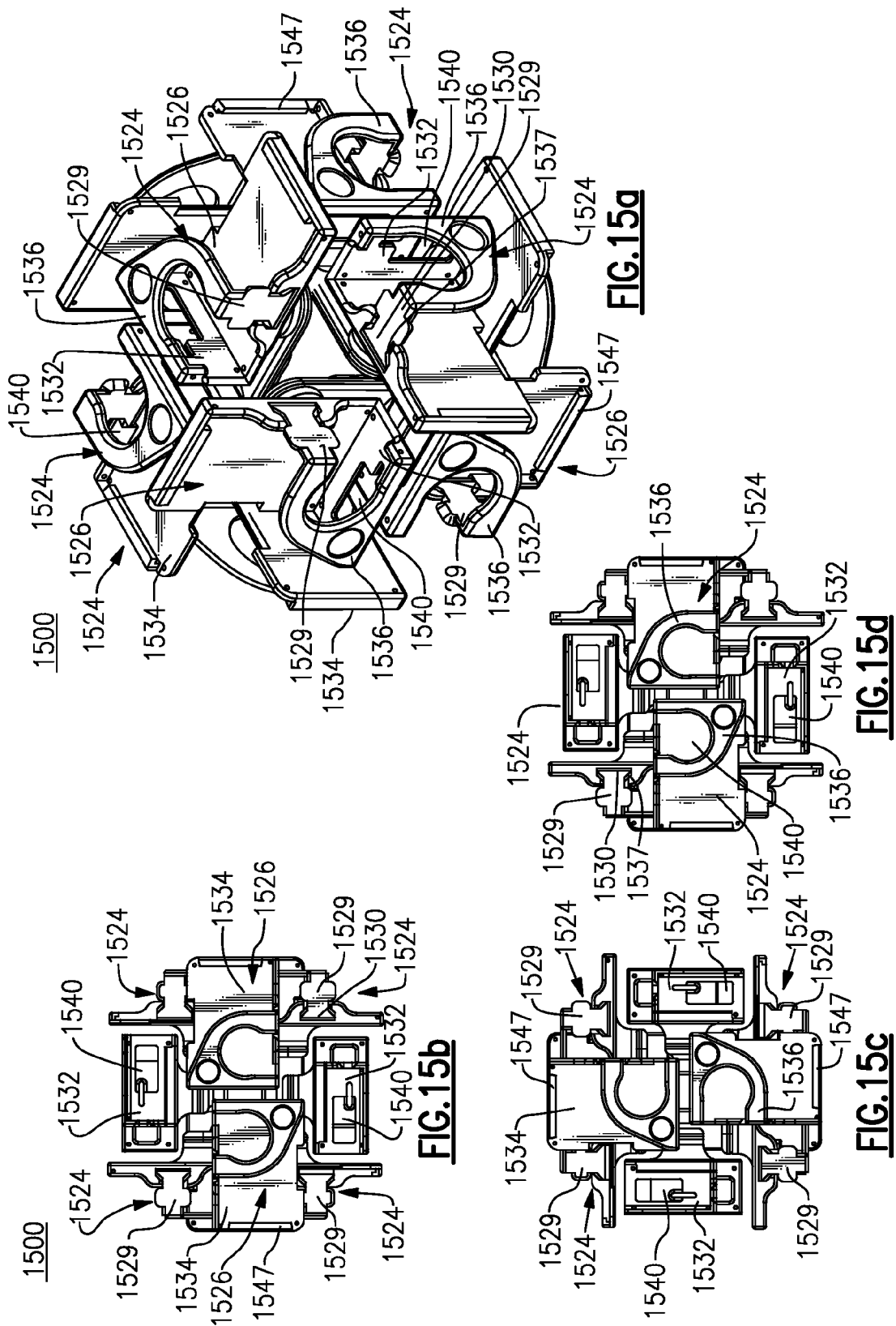
FIG. 15(a) is a front perspective view of an exemplary camera holding assembly that retains a plurality of photographic cameras and is configured for stereoscopic imaging.
FIG. 15(b) is a top plan view of the camera holding assembly of FIG. 15(a)
FIGS. 15(c) and (d) are side elevational views of the camera holding assembly of FIGS. 15(a) and 15(b)

According to another variation and with reference to FIGS. 15(*a*)-15(*d*), a holding assembly 1500 can be provided that retains individual cameras to provide the above-noted stereoscopic imaging effect. More specifically, the holding assembly 1500 can be entirely made from a durable lightweight material such as nylon or other flexible thermoplastic polymer as a one-piece assembly, the material having sufficient stiffness for enabling stable retention of a plurality of cameras as discussed in greater detail infra.

According to this embodiment, a plurality of camera receptacles 1524 are disposed. The receptacles 1524 are specifically arranged about respective sides of the holding assembly 1500 wherein each receptacle is defined by an open end 1526, a back wall 1532, an inner side wall 1534 and an outer side wall 1536 that is substantially parallel to the inner side wall 1534. Opposite the back wall 1532 and disposed against the inner side wall 1534 is an edge protrusion or stop 1547. In passing, it should be noted that the terms "back", "inner" and "outer" are for purposes of this embodiment and in accordance with the views as they appear. The specific features of each camera receptacle 1524 defines an enclosure having an interior that is sized to receive a photographic camera 180, FIG. 1(*e*). One specific camera that can be specifically used herein is a GoPro™ Hero3™ camera sold by Woodman Labs, Inc, which is capable of capturing still photographs or video and in which the camera's operation can be controlled remotely, including wirelessly.

An integral engagement latch 1529 depends laterally and inwardly from the end of the outer side wall 136 opposite the open end 1526 of the camera receptacle 1524. This engagement latch 1529 includes a depending tab portion 1530 having an outwardly tapering configuration at one end that releasably engages a slot 1537 provided adjacent the inner side wall 1534.

The outer side wall 136, according to this embodiment, is a partial wall section extending over only a portion of the length of the inner side wall which further includes an opening 1544. The back wall 1532 also includes a through opening 140.

Each of the receptacles 1536 are arranged in pairs according to this embodiment. More specifically, six (6) pairs of linearly disposed receptacles are provided along each of four lateral sides, a top side and a bottom side of the defined holding assembly 1500. In each formed pair, the back walls 1532 of each receptacle 1524 are aligned and adjacent to one another with the open ends 1526 being oppositely disposed. Each of the lateral side pairs according to FIG. 15(*a*) is disposed vertically and each of the top and bottom pairs are transversely disposed and in a horizontal configuration.

In terms of operation, the engagement latches 1529 of each receptacle are disengaged from the slots 1537 and the flap-like section including the outer side wall 1536 is pulled to open the defined enclosure. The cameras can then be placed into the receptacle through the open end 1526 and engaged between the back wall 1532, inner side wall 1534 and the edge protrusion 1547, the enclosure therein defined being sized for accommodating the camera. The outer side wall 1536 is then pulled over the front surface of the camera in which the opening 1540 is sized to accommodate the lens barrel 182, FIG. 1(*a*) of the camera. The engagement latch 1529 can then be reengaged with the slot 1537, thereby releasably securing the receptacle 1524. In this embodiment, a pair of cameras is retained such that the lens barrels of each camera is disposed in fairly close proximity akin to that shown by the tandem housing and center line 1314 of FIG. 13. A total of twelve cameras are retained wherein the tandem arrangement within the pairs of receptacles permits stereoscopic imaging over a 360 degree by 180 degree full spherical field of view and in which composite 3-D images can be obtained.

Figure 16:
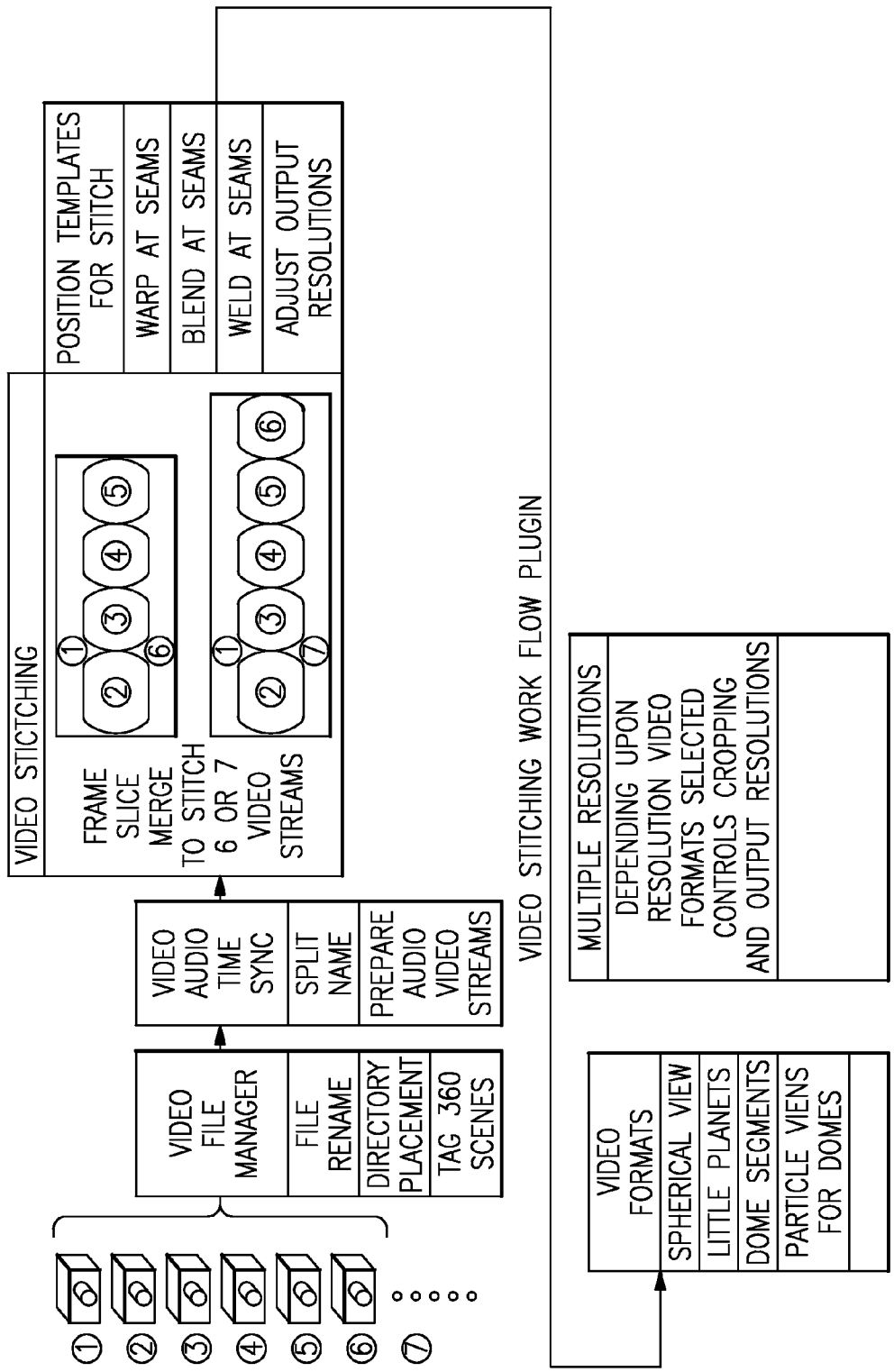
FIG. 16 is a work flow diagram relating to a process for obtaining a 360 degree image or video using the camera holding assemblies and in accordance with an exemplary embodiment.

Use of the herein described camera holding assemblies is described with reference to an exemplary work flow depicted in FIG. 16. More specifically, this workflow defines synchronization of a plurality of cameras that are retained within any of the holding assemblies previously described herein, as well as stitching of the various images (still or moving) that are captured by the retained cameras. According to this embodiment, the output of each of the retained cameras (N) in the holding assembly, such as fixture 100, FIG. 1(a), are removed, such as the camera's data cards, and in which each card is loaded into the memory of a computer. This stored output is linked to a video file manager which controls directory and filenames of the individual camera video files to a specific folder and filenames which coordinate to each camera. In this block after the file management is organized the (N) cameras are time synched together via sound or video motion. In this block using audio and or video motion, each video is matched to one another to an extra frame by frame match. Next and in this block, the various images are each tagged via the filename and opened within the given directory. The output of each camera is displayed separately and arranged based upon the (N) in a variety of different stitching conditions to manage the camera placements. Based upon the stitching patterns given the (N) number of cameras, the output is merged into a single 360 video file or multiple 360 photos. Each photos from the output represents each video frame taken from the input video. For example, if the video was shot at 48 frames per second, then the output will be 48 individual photos from (N) cameras merged into the final video via ordered image number sequencing. Video stitching is then conducted using software, for example that provided by Loop-In using a software package sold under the tradename of Video-Stitch. Other suitable software programs such as those marketed by Kolor can also be used, among others.

It should be understood, of course, that the foregoing relates merely to exemplary embodiments of the invention and that modifications may be made without departing from the spirit and scope of the invention as set forth in the following claims.

PARTS LIST FOR FIGS. 1(a)-16

100 holding assembly
110 supporting fixture or member
112 center axial column
116 radial or radially extending arms
117 proximal end
119 distal end
124 camera receptacle
126 open end
129 engagement latch
130 tab portion
132 top wall
134 inner side wall
136 outer side wall
137 slot
140 opening
144 opening
147 edge protrusion or stop
180 photographic camera
182 lens barrel, camera
190 support or rod
194 opening
200 holding assembly
210 supporting member
218 attachment posts
219 center opening
224 camera receptacle
226 open end
229 engagement latch
230 tab portion
232 top wall
234 inner side wall
236 outer side wall
237 slot
240 opening
244 opening
247 edge protrusion
300 holding assembly
310 supporting frame or portion
312 center axial column
316 radially extending arms
317 proximal end
318 attachment posts
319 distal end
320 center opening
324 camera receptacle
326 open end
329 engagement latch
330 tab portion
332 top wall
334 inner side wall
336 outer side wall
337 slot
340 opening
344 opening
347 edge protrusion
380 photographic camera
382 lens barrel
386 support
400 holding assembly
410 supporting member
424 camera receptacles
429 engagement latch
432 top wall
434 inner side wall
436 outer side wall
440 opening
442 opening
447 edge protrusion
480 photographic cameras
482 lens barrel
486 attachment posts
500 holding assembly
510 supporting member
514 arm portions
516 projecting portions
524 camera receptacles
532 retaining cavity
550 lateral wall
554 upper lip portion
580 photographic camera
586 connecting rod
600 holding assembly
610 supporting member
613 attachment posts
616 arm portions
617 distal ends
618 transverse mounting holes
619 engagement end portions
624 camera receptacles
630 retaining cavity
633 upper edge
660 sealed cases
670 receptacle
671 first part
673 downwardly depending portions
674 upper surface
675 mounting hole, first part
676 second part
677 downwardly depending edge 679 projecting portion
680 photographic camera
681 mounting hole
682 lens
683 planar front surface
686 connecting rod
700 holding assembly
710 center supporting member
716 projecting arm portions
717 distal ends
719 openings
724 camera receptacles
725 arm
727 engagement end portion
728 spaced plates
729 mounting hole
750 enclosure
760 sealed case
770 engagement end portion
777 mounting hole
779 threaded fastener
780 photographic camera
782 lens
786 connecting rod
800 adaptive apparatus (dome converter)
810 dome member
814 threads
817 groove
820 interchangeable filter
830 outer filter housing
832 threads, internal
836 inner peripheral surface
838 outer peripheral surface
839 external threads
840 sealing member
850 attachable housing adapter
853 threads, internal
860 camera housing
900 holding apparatus
910 supporting member, center
916 arm portions
917 engagement end portions
940 receptacles
1000 apparatus
1004 arms
1007 engagement end portions
1008 center housing
1040 receptacles
1050 rotor assemblies
1054 connecting supports
1080 photographic camera housings
1100 drone-like apparatus
1120 lower arm
1142 center housing
1145 arms
1148 rotor assemblies
1150 holding assemblies
1151 supports
1160 center housing
1164 connecting arms
1168 rotor assemblies
1170 holding assemblies
1180 photographic cameras
1200 helmet
1240 holding assembly
1280 photographic cameras
1300 holding assembly
1302 camera housing
1314 center line
1319 port
1330 camera housing
1335 ports
1500 camera holding assembly
1524 camera receptacle
1526 open end
1529 engagement latch
1530 tab portion
1532 top wall
1534 inner side wall
1536 outer side wall
1537 slot
1540 opening
1544 opening
1547 edge protrusion or stop It will be readily apparent that other variations and modifications are possible in addition to the numerous examples discussed herein that will be readily apparent in accordance with the following claims.

The invention claimed is:

1. A holding assembly configured to releasably retain a plurality of photographic cameras in a predetermined orientation, said holding assembly comprising:
a support including a support body having a plurality of support arms extending outwardly and radially from the support body; and
each of the support arms including a receptacle disposed thereon and in which a plurality of the receptacles are disposed radially about the exterior of said support body, each of said receptacles defining an open-ended enclosure having at least one latching feature for enabling a photographic camera to be releasably retained within the defined enclosure wherein the receptacles are oriented about said support such that each retained camera provides an overlapping field of view, the cameras being disposed on the support to create either a 360 degree by 180 degree full spherical composite image or a 360 degree composite image.

2. A holding assembly as recited in claim 1, further comprising at least one attachment feature configured for enabling the holding assembly to be secured to another object.

3. A holding assembly as recited in claim 2, further comprising at least three attachment features.

4. A holding assembly as recited in claim 2, wherein at least some of said camera receptacles are oriented about a common plane.

5. A holding assembly as recited in claim 1, in which a receptacle is retained at a distal end of each support arm.

6. A holding assembly as recited in claim 5, wherein the receptacles are each integral to a corresponding support arm.

7. A holding assembly as recited in claim 5, wherein each radially extending support arm includes an attachment member at a distal end for securing a receptacle thereto.

8. A holding assembly as recited in claim 1, including a plurality of camera receptacles disposed within a common spherical plane and at least one camera receptacle disposed above or below the common spherical plane.

9. A holding assembly as recited in claim 1, in which at least one radially extending support arm is configured to extend and retract from an initial position.

10. A holding assembly as recited in claim 9, wherein at least a portion of at least one of said plurality of radially extending support arms is configured to pivot.

11. A holding assembly as recited in claim 1, including at least one adaptive member attachable to a secured photographic camera to enable use underwater.

12. A holding assembly as recited in claim 11, wherein the at least one adaptive member includes a transparent dome coupled to the lens barrel of an attached photographic camera and in which the transparent dome corrects for refractive effects of surrounding water.

13. A holding assembly as recited in claim 11, wherein the at least one adaptive member includes at least one photographic filter.

14. A holding assembly as recited in claim 13, wherein the at least one adaptive member permits replacement of the at least one photographic filter.

15. A method for manufacture of a holding assembly that enables capture of 360 degree photographic or video images of a scene of interest, said method comprising:
  providing a support for said holding assembly comprising a center support body having a plurality of outwardly extending support arms, including a corresponding plurality of receptacles arranged on each extending support arm, each said receptacle defining an open-ended enclosure that is sized for releasably receiving at least one photographic camera body and in which each said receptacle is disposed in a specific angular or spherical orientation relative to each other to enable a 360 degree by 180 degree full spherical composite image or a 360 degree composite image to be created by the retained photographic cameras; and
  configuring each receptacle with a latching feature to enable a photographic camera body to be releasably secured within the support without requiring tools.

16. A method as recited in claim 15, in which a camera receptacle is disposed at the distal end of each support arm.

17. A method as recited in claim 16, wherein at least one of the outwardly extending support arms is configured to radially extend or contract relative to an initial position.

18. A method as recited in claim 16, wherein the camera receptacles are integral to the support.

19. A method as recited in claim 16, wherein the camera receptacles are attached to the distal end of each outwardly extending support arm.

20. A method as recited in claim 15, including the step of supporting a plurality of photographic cameras within a common spherical plane.

21. A method as recited in claim 15, including the step of enabling stereographic spherical images by enabling a pair of photographic cameras to be disposed in a side by side configuration within each enclosure of said support.

22. A system for creating 360 degree images of a scene of interest, the system comprising:
  a holding assembly configured to releasably retain a plurality of cameras in a predetermined orientation, the holding assembly comprising:
    a supporting frame defined by a center support and a plurality of support arms outwardly extending from the center support;
    a plurality of receptacles disposed about the exterior of the supporting frame, each of said receptacles provided on a corresponding support arm and defining a receiving cavity sized to accommodate a camera and including a latching feature for releasably and individually retaining a photographic camera within the receptacle and wherein the receptacles are oriented about said supporting frame such that each camera, when loaded into the receptacles provides an overlapping field of view, the cameras being disposed to create a 360 degree by 180 degree full spherical composite image or a 360 degree composite image.

23. A system as recited in claim 22, further comprising at least one attachment feature configured for enabling the holding assembly to be secured to another object.

24. A system as recited in claim 23, wherein the holding assembly includes at least three spaced attachment features.

25. A system as recited in claim 22, wherein each of the receptacles are integral to a corresponding outwardly extending support arm of the supporting frame.

26. A system as recited in claim 22, wherein the receptacles are secured to the outwardly extending support arms of the supporting frame using fasteners.

27. A system as recited in claim 22, wherein the holding assembly is manufactured from a durable molded plastic.

28. A system as recited in claim 22, wherein the holding assembly is manufactured from a flexible nylon.

29. A system as recited in claim 22, wherein the holding assembly retains multiple pairs of cameras in tandem to permit stereographic images to be created.

30. A holding fixture configured to retain a plurality of photographic cameras in a predetermined orientation, the holding fixture comprising:
  a support including a center support body and a plurality of support arms outwardly and radially extending from the support body; and
  a plurality of receptacles disposed about the exterior of the support and at the extending ends of each support arm, each of the receptacles defining an open-end enclosure sized for retaining a photographic camera and in which the receptacles are oriented about the support such that each retained photographic camera provides an overlapping field of view, the cameras being disposed such that a centerline of the lens barrel of each retained camera is configured to intersect at a common center apex to enable either a 360 degree by 180 degree full spherical composite image or a 360 degree composite image to be created.

31. The holding fixture as recited in claim 30, in which a plurality of receptacles are disposed in a common spherical plane.

32. The holding fixture as recited in claim 31, including at least one receptacle disposed above or below the common spherical plane.

33. The holding fixture as recited in claim 32, wherein the fixture includes at least four receptacles in the common spherical plane.

34. The holding fixture as recited in claim 30, wherein each receptacle includes a latching feature that allows a photographic camera to be releasably retained within and released from a receptacle.

35. The holding fixture as recited in claim 30, including at least one adaptive member attachable to a retained photographic camera to enable use underwater.

36. The holding fixture as recited in claim 35, wherein the at least one adaptive member includes a transparent dome coupled to the lens barrel of an attached photographic camera and in which the transparent dome corrects for refractive effects of surrounding water.

37. The holding fixture as recited in claim 30, in which the total number of receptacles disposed on the support is at least three.

* * * * *